US008165745B2

(12) United States Patent
Sakurai et al.

(10) Patent No.: US 8,165,745 B2
(45) Date of Patent: *Apr. 24, 2012

(54) VEHICLE CONTROL SYSTEM

(75) Inventors: Kohei Sakurai, Hitachi (JP); Yuichiro Morita, Hitachi (JP); Masatoshi Hoshino, Tsuchiura (JP); Yoshiaki Takahashi, Mito (JP); Kenichi Kurosawa, Hitachi (JP); Masahiro Matsubara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,594

(22) Filed: May 3, 2010

(65) Prior Publication Data

US 2010/0211258 A1  Aug. 19, 2010

Related U.S. Application Data

(63) Continuation of application No. 11/528,351, filed on Sep. 28, 2006, now Pat. No. 7,729,827.

(30) Foreign Application Priority Data

Oct. 3, 2005  (JP) ................................ 2005-289987
Sep. 26, 2006  (JP) ................................ 2006-260628

(51) Int. Cl.
*B60W 50/02* (2012.01)
(52) U.S. Cl. .................... 701/31.3; 701/29.1; 701/29.6; 701/29.7; 701/29.9; 701/32.7; 370/229; 370/239; 370/242; 370/245
(58) Field of Classification Search .................... 701/29, 701/20, 31, 32, 33, 34, 35; 370/229, 239, 370/242, 245
See application file for complete search history.

(56) References Cited

U.S. PATENT DOCUMENTS

| 6,012,004 | A | 1/2000 | Sugano et al. | |
|---|---|---|---|---|
| 6,151,306 | A * | 11/2000 | Ogasawara et al. | 370/242 |
| 6,434,698 | B1 * | 8/2002 | Maiolani et al. | 713/2 |
| 6,885,916 | B2 * | 4/2005 | Remboski et al. | 701/1 |
| 7,289,446 | B2 * | 10/2007 | Itoi | 370/235 |
| 7,430,261 | B2 * | 9/2008 | Forest et al. | 375/364 |
| 7,586,953 | B2 * | 9/2009 | Forest et al. | 370/503 |
| 2004/0062265 | A1 * | 4/2004 | Poledna | 370/442 |
| 2004/0081079 | A1 | 4/2004 | Forest et al. | |
| 2004/0081193 | A1 * | 4/2004 | Forest et al. | 370/458 |
| 2004/0255185 | A1 * | 12/2004 | Fujiyama et al. | 714/4 |
| 2005/0129038 | A1 | 6/2005 | Hall et al. | |
| 2005/0141565 | A1 * | 6/2005 | Forest et al. | 370/503 |

(Continued)

FOREIGN PATENT DOCUMENTS

DE  19753288 A1  6/1998

(Continued)

OTHER PUBLICATIONS

H. Kopetz, G. Bauer, "The Time-Triggered Architecture," Proceedings of the IEEE, vol. 91, No. 1, Jan. 2003, pp. 112-126.*

(Continued)

*Primary Examiner* — Thomas Black
*Assistant Examiner* — Peter D Nolan
(74) *Attorney, Agent, or Firm* — Crowell & Moring LLP

(57) ABSTRACT

In a vehicle control system in which a large number of ECUs operate in coordination via a network, each node has an intra-network node status determination section, other node's status decision transmitting/other nodes' status decision receiving section, and failed-node identification section. The nodes exchange decisions made by the intra-network node status evaluation section with other nodes and thereby identify failed node.

9 Claims, 49 Drawing Sheets

FOREIGN PATENT DOCUMENTS

| | | |
|---|---|---|
| JP | 2000-47894 A | 2/2000 |
| JP | 2005-191909 A | 7/2005 |
| JP | 2006-051922 A | 2/2006 |

OTHER PUBLICATIONS

TTTech, Time-Triggered Protocol TTP/C High-Level Specification Document, TTTech Computertecknik AG, 2002.*

Negley, Bruce "Getting Control Through CAN" Sensors, Oct. 2000. [Online]. Available: http://archives.sensorsmag.com/articles/1000/18/main.shtml.

Barr, Michael "Leveraging the 'NET" Embedded Systems Programming, Nov. 1999. [Online]. Available: https://www.embedded.com/1999/9911/9911connect.htm.

European Search report dated May 16, 2008 (Eight(8) pages).

* cited by examiner

FIG. 18

<TRANSMIT FRAME FROM NODE 1 IN COMMUNICATION CYCLE i+1> Sync1, S1

NODE STATUS DECISIONS / FAILURE NOTIFICATION SYNCHRONIZATION FLAG FIELD

| Field | Sub-field | Value |
|---|---|---|
| NODE 1 (OWN-NODE) STATUS | | 0x0 |
| NODE 2 STATUS | SERIAL NUMBER ERROR (E1) | 0 |
| | CHECK SUM ERROR (E2) | 0 |
| | CRC ERROR (E3) | 0 |
| | UNRECEIVED (E4) | 0 |
| NODE 3 STATUS | SERIAL NUMBER ERROR (E1) | 0 |
| | CHECK SUM ERROR (E2) | 0 |
| | CRC ERROR (E3) | 0 |
| | UNRECEIVED (E4) | 1 |
| NODE 4 STATUS | SERIAL NUMBER ERROR (E1) | 0 |
| | CHECK SUM ERROR (E2) | 0 |
| | CRC ERROR (E3) | 0 |
| | UNRECEIVED (E4) | 0 |
| NODE-1 FAILURE COUNTER | SERIAL NUMBER ERROR (E1_1) | 0 |
| | CHECK SUM ERROR (E2_1) | 0 |
| | CRC ERROR (E3_1) | 0 |
| | UNRECEIVED (E4_1) | 0 |
| NODE-2 FAILURE COUNTER | SERIAL NUMBER ERROR (E1_2) | 0 |
| | CHECK SUM ERROR (E2_2) | 0 |
| | CRC ERROR (E3_2) | 0 |
| | UNRECEIVED (E4_2) | 0 |
| NODE-3 FAILURE COUNTER | SERIAL NUMBER ERROR (E1_3) | 0 |
| | CHECK SUM ERROR (E2_3) | 0 |
| | CRC ERROR (E3_3) | 0 |
| | UNRECEIVED (E4_3) | 0 |
| NODE-4 FAILURE COUNTER | SERIAL NUMBER ERROR (E1_4) | 0 |
| | CHECK SUM ERROR (E2_4) | 0 |
| | CRC ERROR (E3_4) | 0 |
| | UNRECEIVED (E4_4) | 0 |

<TRANSMIT FRAME FROM NODE 1 IN COMMUNICATION CYCLE i+2> Sync1, S1

NODE STATUS DECISIONS / FAILURE NOTIFICATION SYNCHRONIZATION FLAG FIELD

| Field | Sub-field | Value |
|---|---|---|
| NODE 1 (OWN-NODE) STATUS | | 0x0 |
| NODE 2 STATUS | SERIAL NUMBER ERROR (E1) | 0 |
| | CHECK SUM ERROR (E2) | 0 |
| | CRC ERROR (E3) | 0 |
| | UNRECEIVED (E4) | 0 |
| NODE 3 STATUS | SERIAL NUMBER ERROR (E1) | 0 |
| | CHECK SUM ERROR (E2) | 0 |
| | CRC ERROR (E3) | 0 |
| | UNRECEIVED (E4) | 1 |
| NODE 4 STATUS | SERIAL NUMBER ERROR (E1) | 0 |
| | CHECK SUM ERROR (E2) | 0 |
| | CRC ERROR (E3) | 0 |
| | UNRECEIVED (E4) | 0 |
| NODE-1 FAILURE COUNTER | SERIAL NUMBER ERROR (E1_1) | 0 |
| | CHECK SUM ERROR (E2_1) | 0 |
| | CRC ERROR (E3_1) | 0 |
| | UNRECEIVED (E4_1) | 0 |
| NODE-2 FAILURE COUNTER | SERIAL NUMBER ERROR (E1_2) | 0 |
| | CHECK SUM ERROR (E2_2) | 0 |
| | CRC ERROR (E3_2) | 0 |
| | UNRECEIVED (E4_2) | 0 |
| NODE-3 FAILURE COUNTER | SERIAL NUMBER ERROR (E1_3) | 0 |
| | CHECK SUM ERROR (E2_3) | 0 |
| | CRC ERROR (E3_3) | 0 |
| | UNRECEIVED (E4_3) | 1 |
| NODE-4 FAILURE COUNTER | SERIAL NUMBER ERROR (E1_4) | 0 |
| | CHECK SUM ERROR (E2_4) | 0 |
| | CRC ERROR (E3_4) | 0 |
| | UNRECEIVED (E4_4) | 0 |

FIG. 33

| NODE STATUS EVALUATION RESULT | | | | FAILURE NOTIFICATION SYNCHRONIZATION FLAG FIELD | | | | CONTROL DATA |
|---|---|---|---|---|---|---|---|---|
| NODE A1 (OWN-NODE) STATUS | NODE A2 STATUS | NODE A3 STATUS | NODE A4 STATUS | NODE-A1 FAILURE COUNTER | NODE-A2 FAILURE COUNTER | NODE-A3 FAILURE COUNTER | NODE-A4 FAILURE COUNTER | |

SA1 — (left portion)
A1_2
Sync A1 — (middle portion)
DA1 — (right portion)

FIG. 40

| | COMMUNICATION CYCLE i | i+1 | •••• | i+n−1 | i+n | 2000 |
|---|---|---|---|---|---|---|
| NODE 1 | NODE 2 | NODE 3 | | NODE n | NODE 2 | |
| NODE 2 | NODE 3 | NODE 4 | | NODE 1 | NODE 3 | |
| ⋮ | | | | | | |
| NODE n | NODE 1 | NODE 2 | | NODE n-1 | NODE 1 | |

| | COMMUNICATION CYCLE i | i+1 | •••• | i+n−1 | i+n | 2010 |
|---|---|---|---|---|---|---|
| NODE 1 | NODE 2 / NODE 3 | NODE 3 / NODE 4 | | NODE n / NODE 2 | NODE 2 / NODE 3 | |
| NODE 2 | NODE 3 / NODE 4 | NODE 4 / NODE 5 | | NODE 1 / NODE 3 | NODE 3 / NODE 4 | |
| ⋮ | | | | | | |
| NODE n | NODE 1 / NODE 2 | NODE 2 / NODE 3 | | NODE n-1 / NODE 1 | NODE 1 / NODE 2 | |

FIG. 43

NODE ASSIGNED FOR ID1 — 2020

| COMMUNICATION CYCLE i | i+1 | i+2 | i+3 |
|---|---|---|---|
| NODE 1 | NODE 2 | NODE 3 | NODE 4 / NODE 2 | NODE 2 |
| NODE 2 | NODE 3 | NODE 4 ⚡ | NODE 1 ⚡ | NODE 3 |
| NODE 3 | NODE 4 | NODE 1 ⚡ | NODE 2 ⚡ / NODE 4 | NODE 4 |
| NODE 4 | NODE 1 | NODE 2 ⚡ / NODE 3 | NODE 3 ⚡ | NODE 1 |

( ⚡ NODE-1 FAILURE DETECTED IN MON )

SUBSTITUTED NODES — 2030

| COMMUNICATION CYCLE i | i+1 | i+2 | i+3 |
|---|---|---|---|
| NODE 1 | NODE 4 | NODE 2 | NODE 3 | NODE 4 |
| NODE 2 | NODE 1 | NODE 3 | NODE 4 | NODE 1 |
| NODE 3 | NODE 2 | NODE 4 | NODE 1 | NODE 2 |
| NODE 4 | NODE 3 | NODE 1 | NODE 2 | NODE 3 |

VEHICLE CONTROL SYSTEM

This application is a continuation of U.S. patent application Ser. No. 11/528,351, filed Sep. 28, 2006, the entire disclosure of which is incorporated herein by reference, which in turn claims priority under 35 U.S.C. §119 of prior Japanese application nos. 2005-289987, filed Oct. 3, 2005 and 2006-260628, filed Sep. 26, 2006.

BACKGROUND OF THE INVENTION

The present invention relates to a vehicle control system in which a plurality of electronic control units are connected via a network.

Recently, vehicle control systems which reflect accelerator pedal, steering wheel, braking pedal, and other operations performed by a driver in driving force, steering force, and braking force generating mechanisms by means of electronic control rather than mechanical coupling have been developed actively to improve driving comfort and safety. In such a system, a plurality of electronic control units (ECU) distributed over the vehicle perform coordinated operation by exchanging data via a network. When an ECU within the network develops a fault, it is essential for fail-safe purposes that the remaining normal ECUs identify the faulty ECU accurately and perform appropriate backup control depending on the faulty spot. Incidentally, ECUs connected to a network may be referred to as nodes hereinafter.

To solve the above problem, JP-A-2000-47894 describes a technique in which each node of a system monitors status of the other nodes in a network.

SUMMARY OF THE INVENTION

However, the above technique requires a special node (shared disk) for use to share monitoring information about operating state of a database application among the nodes. If the shared disk fails, it becomes impossible to continue monitoring for failed nodes in the system. Besides, the use of the shared disk may add to system costs.

The present invention has been made in view of the above circumstances and has an object to provide a vehicle control system which can identify any failed node in a network accurately without installing a special system-monitoring node.

To achieve the above object, the present invention provides a vehicle control system equipped with a plurality of nodes connected via a communication path, wherein each of the plurality of nodes: diagnoses status of other nodes; exchanges the diagnosed status of the other nodes with the other nodes; and determines the status of the other nodes based on diagnosed status of the other nodes and status of the other nodes acquired from the other nodes.

According to another aspect of the present invention, there is provided a vehicle control system equipped with a plurality of nodes connected via a communication path, wherein each of the plurality of nodes: receives results of diagnosis on status of the own node conducted by other nodes; and determines the status of the own node based on the received results of diagnosis.

According to another aspect of the present invention, there is provided a vehicle control system in which a plurality of nodes connected to a communication network transmit data via the communication network and thereby implement functions of a vehicle, wherein each of the plurality of nodes comprises: a node status evaluation section which evaluate node status including operating status of the own node and operating status of other nodes connected to the communication network; a status evaluation result transmitting/receiving section which transmits node evaluation result made by the own node to other nodes and receives node evaluation result made by other nodes; and a failed-node identification section which identifies any failed node in the communication network using the node evaluation result made by the own node and the node evaluation result made by the other nodes.

The present invention allows determinations such as described above to be made using a system composed of typical ECUs without the need to install a master node (server) which centrally controls node status determination of all nodes or a node (shared disk) which holds data to be shared. Thus, it makes it possible to identify any failed node accurately at low costs.

The present invention also makes it possible to check for faults which cannot be detected by network troubleshooting alone, including abnormal software processes (including failures in upper layers of the data link layer) which can occur even when communication are conducted normally.

When implementing such a failed-node monitoring function using middleware, a control application can acquire node status information using a predetermined API (Application Program Interface), and thus it is possible to improve development efficiency of control application software.

Other objects, features and advantages of the invention will become apparent from the following description of the embodiments of the invention taken in conjunction with the accompanying drawings.

BRIEF DESCRIPTION OF THE DRAWING

FIG. 18 is an explanatory diagram illustrating another example of the fault occurrence determination process;

FIG. 33 is a diagram showing a configuration example of a transmit frame A1_2 from node A1 in communication slot 7;

FIG. 40 is a diagram showing an example of changed schedule of nodes assigned for status determination;

FIG. 43 is a diagram showing an application example of the proxy status determination process;

DESCRIPTION OF THE EMBODIMENTS

An embodiment of a vehicle control system according to the present invention will be described below with reference to the drawings.

Example 1

Figure 1:
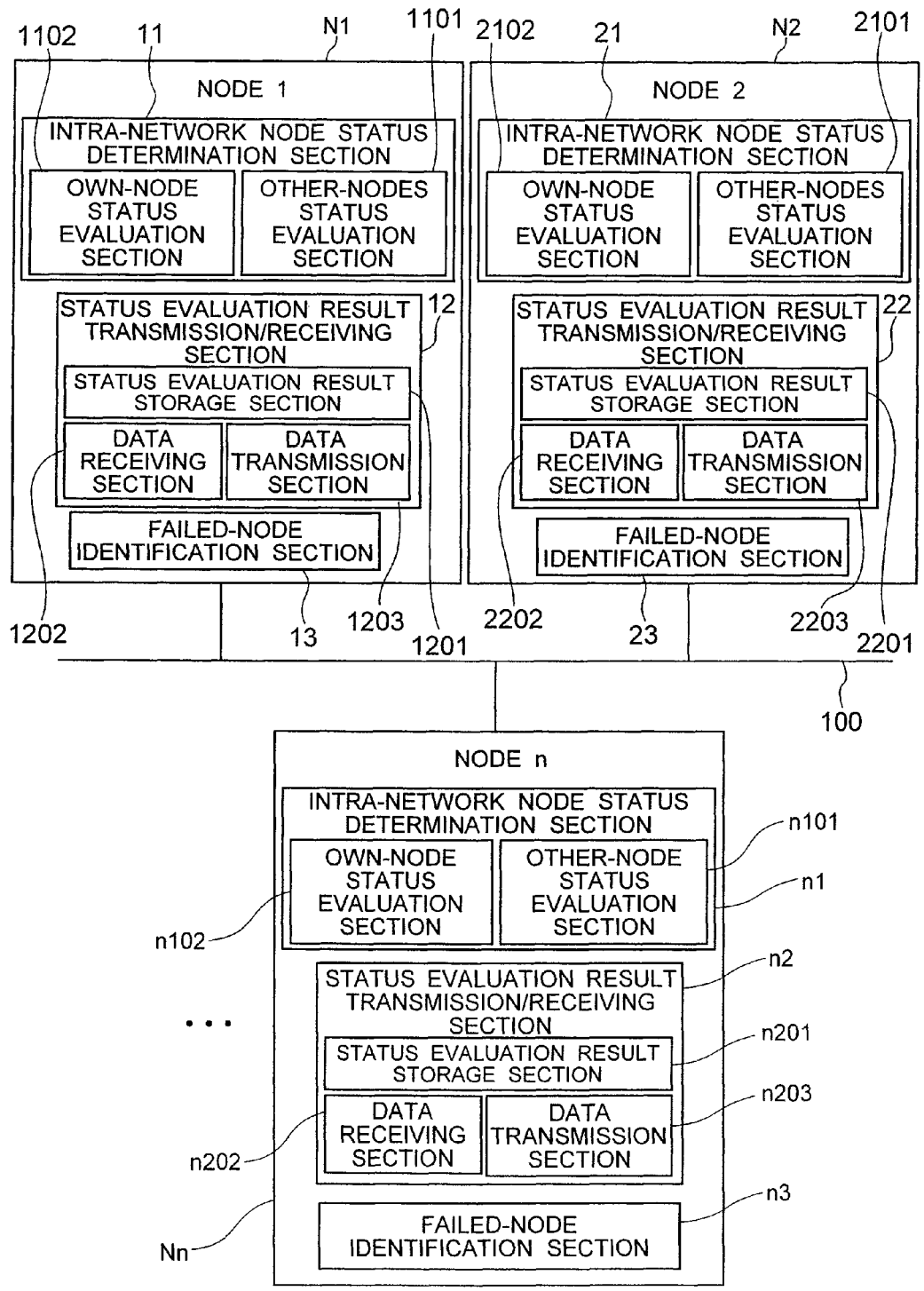
FIG. 1 is an explanatory diagram illustrating an outline of an example of a vehicle control system.

First, a basic configuration of the vehicle control system according to the present invention will be described with reference to FIGS. 1 to 4. As shown in FIG. 1, the vehicle control system according to the present invention consists of multiple nodes—namely, node 1 (N1), node 2 (N2), . . . , node n (Nn)—which are connected via a network 100. The nodes are processing units connected to a network and capable of communicating information via the network. Specifically, they include various electronic control units, actuator drivers, and sensors mounted on a vehicle. The network 100 is a communication network capable of multiplex communication as well as broadcasting which involves transmitting the same content simultaneously from a node to all the other nodes connected to the network.

Each node, N1, N2, . . . , or Nn (hereinafter referred to as Nx) has a node status determination section x1 (11, 21, . . . , or n1), status evaluation result transmitting/receiving section x2 (12, 22, . . . , or n2), and failed-node identification section x3 (13, 23, . . . , or n3), where character x is a node number (1, 2, . . . , n) and the same applies hereinafter.

The node status determination section x1 (11, 21, . . . , n1) has an own-node status evaluation section x102 (1102, 2102, . . . , n102) which determines the status of the given node itself and other-node status evaluation section x101 (1101, 2101, . . . , n101) which determines the status of the other nodes in the same network. The "own-node status" is a self-diagnostic result of the own node while the "other-node status" is status regarding whether or not data sent from each of the other nodes is correct as viewed by the judging node. For example, in order for node 1 to determine that the "other-node status" of node 2 is normal, hardware of node 2 must operate normally, arithmetic processing in node 2 must be performed normally, and communication from node 2 to node 1 must be conducted without error. Although details of methods for determining other-node status will be described later, it is conceivable, for example, to use a configuration in which all nodes broadcast by incrementing serial number data at every communication cycle. In that case, if the serial number data received from a node is not incremented, it can be determined that the "other-node status" of the node is abnormal. Also, in the examples described below, the node status of the entire network obtained by putting together the "own-node status" and "other-node status" will be referred to as "node status."

The status evaluation result transmitting/receiving section x2 (12, 22, . . . , n2) has a data transmission section x203 (1203, 2203, . . . , n203) which transmits the node status (node status determined by the own node) determined by the node status evaluation section x1 (11, 21, ..., n1) to the other nodes, reception processor x202 (1202, 2202, ..., n202) which receives node status determined by the other nodes, and status evaluation result storage section x201 (1201, 2201, ..., n201) which stores the node evaluation result made by the own node and node evaluation result made by the other nodes.

The failed-node identification section x3 (13, 23, ..., or n3) identifies a failed node based on the node evaluation result made by the own node as well as on the node evaluation result made by the other nodes and received by the status evaluation result transmitting/receiving section x2.

Figure 2:
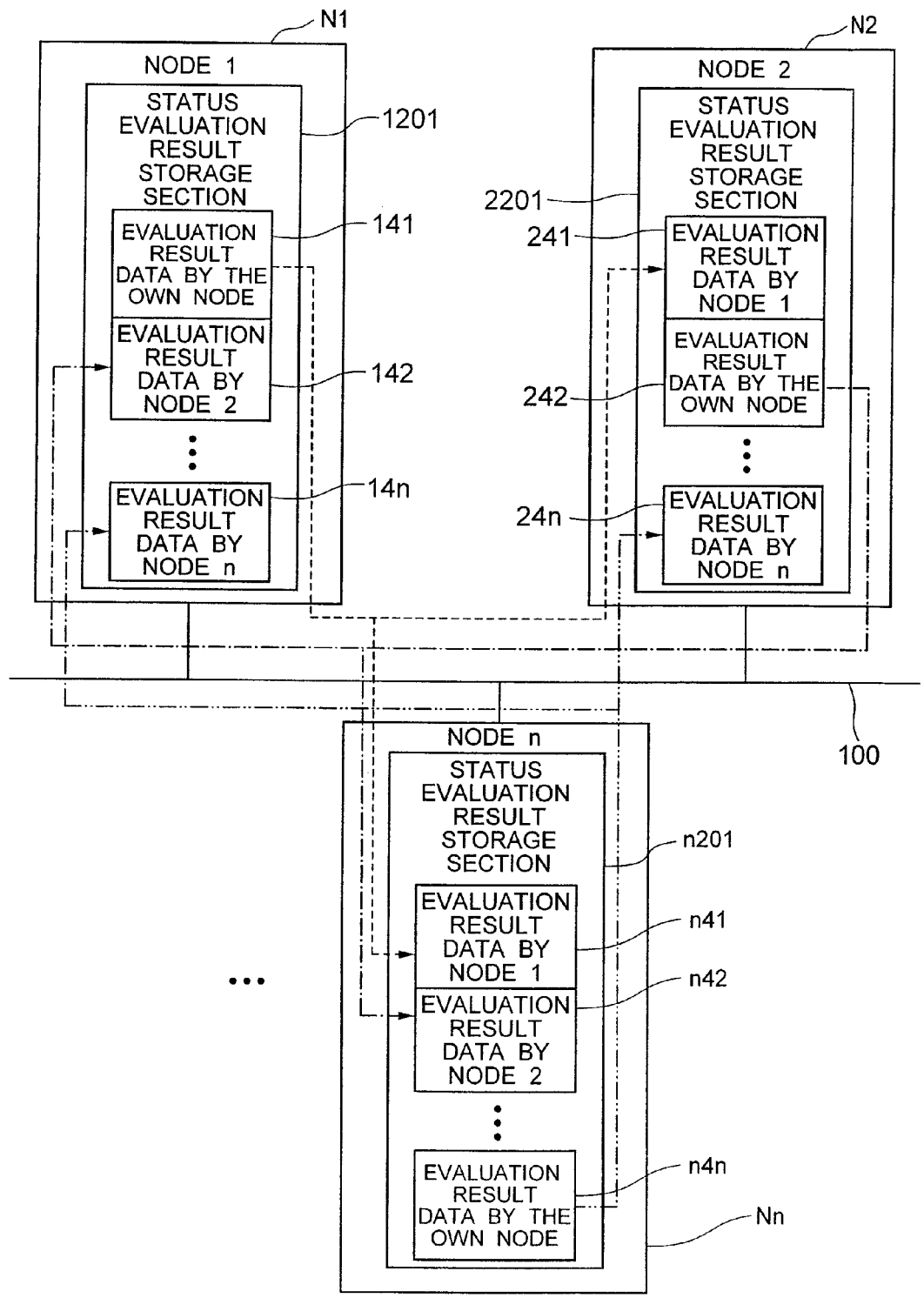
FIG. 2 is an explanatory diagram illustrating an example of a basic configuration of the vehicle control system.

Now, functions of the status evaluation result transmitting/receiving section x2 will be described with reference to FIG. 2. As shown in FIG. 2, the status evaluation result transmitting/receiving section x2 has the status evaluation result storage section x201 for use to store the node evaluation result made by the own node and node evaluation result received from the other nodes. For example, status decisions made by node 1 and stored in a buffer 141 in the status evaluation result storage section 1201 of node 1 are delivered to all the other nodes in the same network except node 1 via the network 100 and stored in buffers x41 (241, 341, ..., n41, in this case) in the status evaluation result storage sections x201 of the other nodes. The same applies to transmission and reception of status decisions conducted by nodes 2 to n.

Thus, the status evaluation result storage section x201 of each node has as many buffers as there are nodes (n nodes, in FIG. 2) in the same network. This makes it possible to store and compare node evaluation result from all the nodes and thereby determine whether status decisions from a specific node are reliable. For example, even if node 1 determines that node 2 is "out of order," if the other nodes (nodes 2 to n) determine that node 2 is "in good order," it may be determined that node 1 rather than node 2 is out of order.

Next, configuration of the node (N1, N2, ..., Nn) shown in FIG. 1 will be described with reference to FIG. 3. Although node 1 is cited in FIG. 3, the same configuration applies to all the nodes in the network. As described above, node 1 has the other-node status evaluation section 1101 and own-node status evaluation section 1102 which are components of the node status determination section 11; status evaluation result storage section 1201, reception processor 1202, and data transmission section 1203 which are components of the status evaluation result transmitting/receiving section 12; and failed-node identification section 13. Also, it has a network access section 16 and control logic execution section 17.

Figure 3:
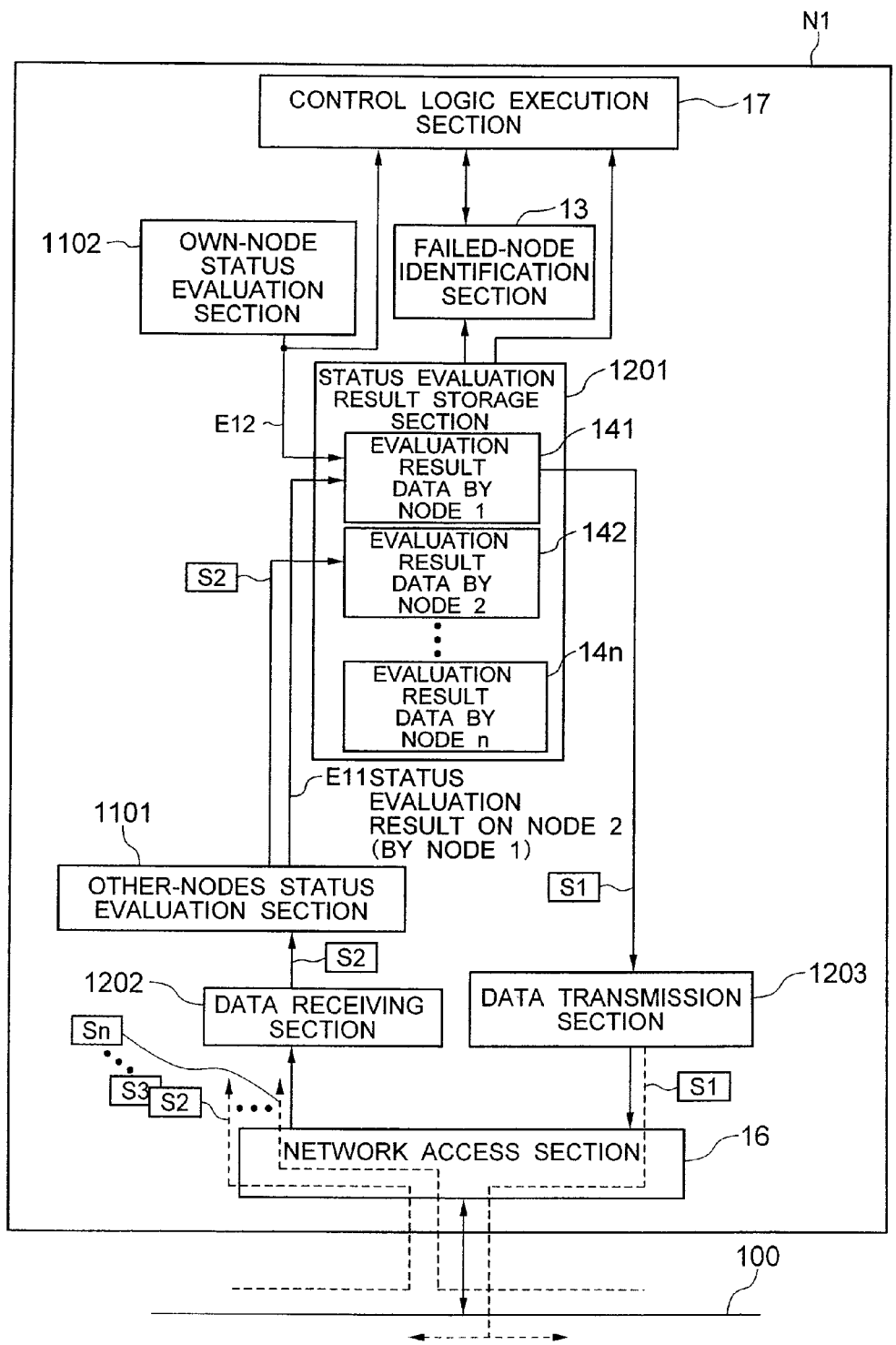
FIG. 3 is a block diagram showing an example of the basic configuration of the vehicle control system.

In FIG. 3, via the network access section 16, node 1 receives data transmitted, for example, from node 2. The transmit data from node 2 contains status decisions S2 made by node 2. The other-node status evaluation section 1101 checks integrity of data in the status decisions S2, thereby determines the status of node 2, and stores a decision E11 in the own node's status evaluation result storage buffer 141 of the status evaluation result storage section 1201. If there is nothing wrong with the data, the status decisions S2 (self-diagnostic result+decisions about nodes 1 and 3 to n) made by node 2 are stored in a status evaluation result storage buffer 142. Similarly, the other-node status evaluation section 1101 determines the status of nodes 3 to n and stores decisions E1n in the own node's status evaluation result storage buffer 141. If there is nothing wrong with the status of the nodes, the other-node status evaluation section 1101 saves the status decisions S3 to Sn from the other nodes in predetermined buffers 143 (not shown) to 14n.

The failed-node identification section 13 identifies a failed node based on the data stored in the buffers 141 to 14n and reports the result to the control logic execution section 17. The own-node status determination section 1102 stores self-diagnostic results E12 about a CPU, a memory, peripheral input/output circuits, and the like of node 1 itself in the own node's status evaluation result storage buffer 141. If the node controls sensors and actuators and diagnoses their status, E12 may contain not only the self-diagnostic results, but also diagnostic results of the sensors, actuators, and the like. The diagnostic results E12 are also reported to the control logic execution section 17. The data transmission section 1203 transmits status decisions S1 produced by the own node as a set of communication data.

Figure 4:
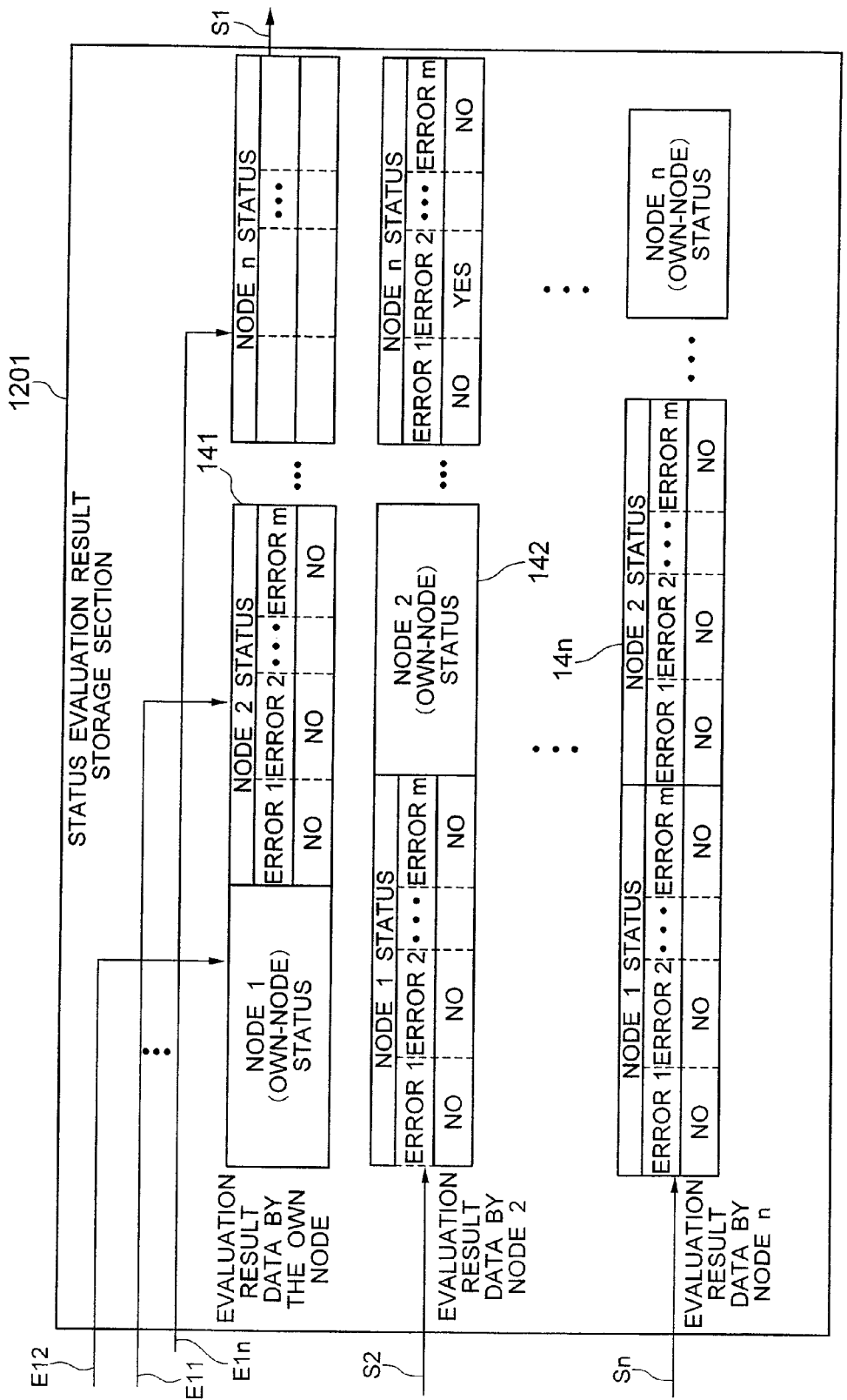
FIG. 4 is a block diagram showing a status evaluation result storage section.

A data structure of status decisions stored in the status evaluation buffers 141 to 14n is shown in FIG. 4. The status decisions are composed of status data on node 1 to node n. The status of each node is expressed in terms of the presence or absence of error (failure) 1 to error (failure) m (concrete examples of errors (failures) will be described later). Checks for each type of fault are made and decisions are stored in a predetermined region by the other-node status evaluation section x101, but decisions made by the own-node status evaluation section x102 are stored as described above, in the own-node status region. Incidentally, although decisions are expressed as either "Yes" or "No" in FIG. 4 for the sake of convenience, actually they are expressed by a numeric characters of predetermined bits.

An example of other-node status evaluation will be described with reference to FIGS. 5 and 6. Configuration in FIG. 5 includes a node failure check code appending section 18 in addition to the basic configuration of node 1 illustrated in FIG. 3. FIG. 6 shows details of operations in box R and box S in FIG. 5 by regarding node 2 as a transmitting end (S), and node 1 as a receiving end (R).

Figure 5:
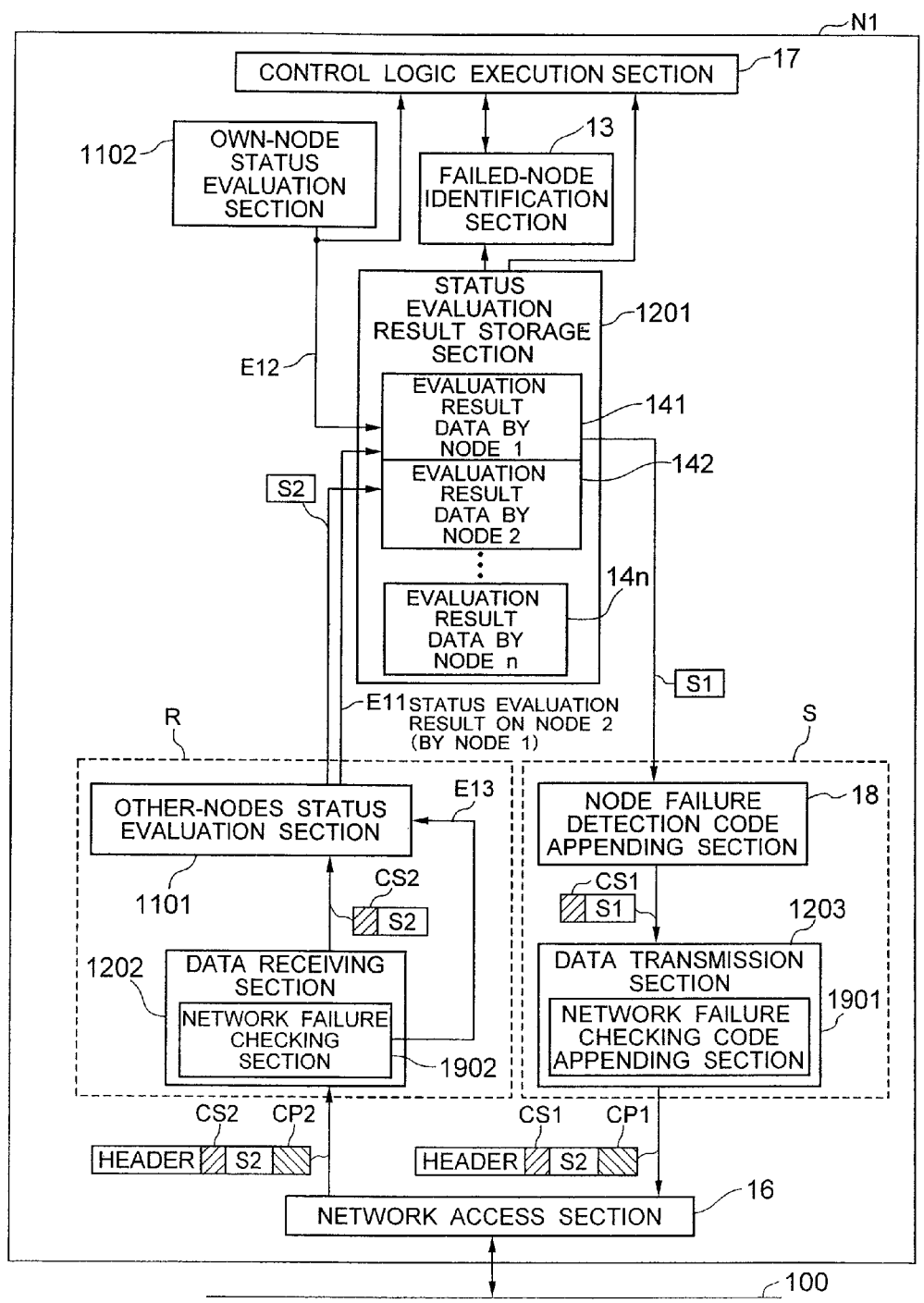
FIG. 5 is a block diagram related to an example of other-node status determination.
Figure 6:
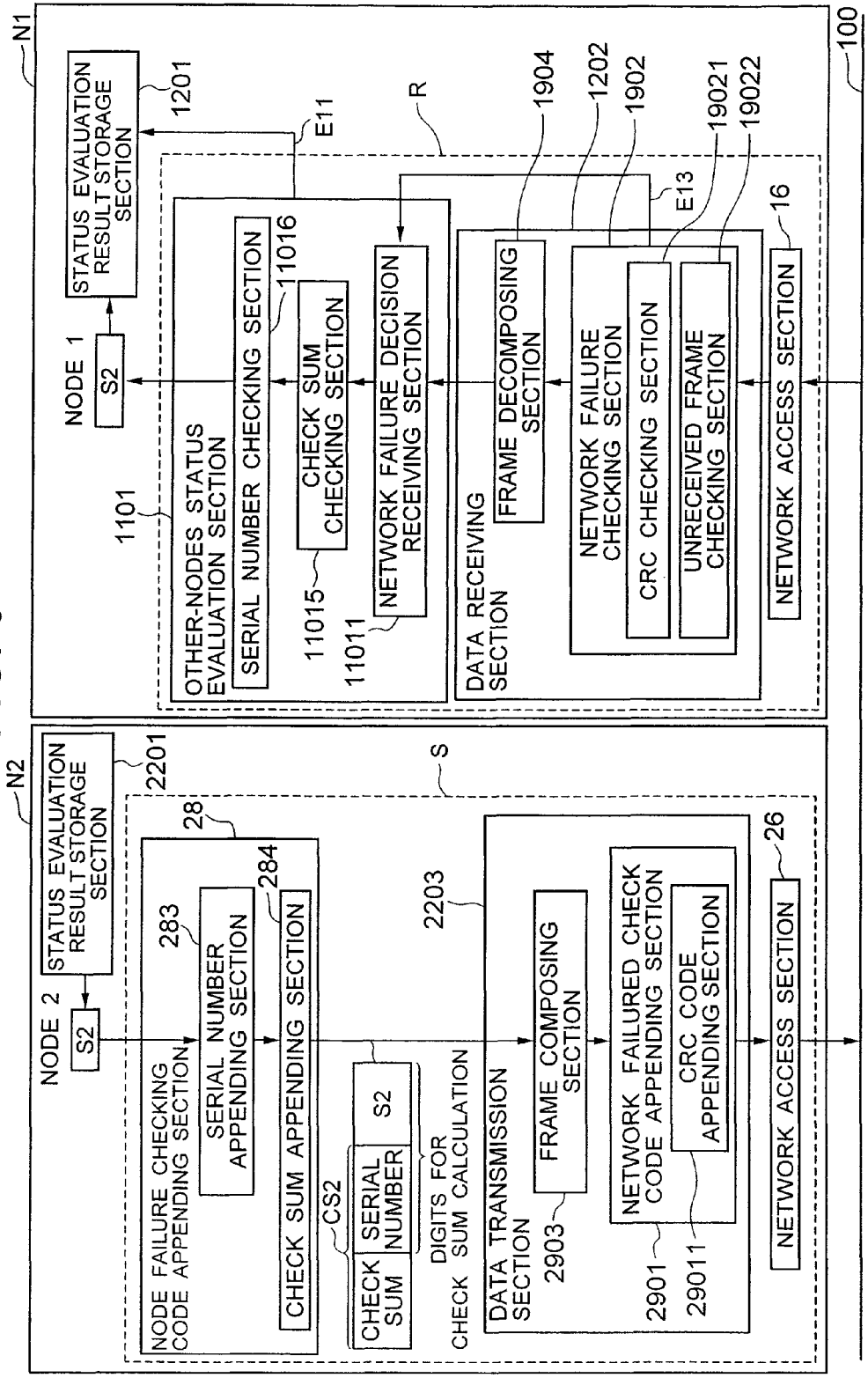
FIG. 6 is a block diagram related to an example of other-node status evaluation.

Referring to FIG. 5, the node failure check code appending section 18 appends a code CS1 to each of the status decisions S1 made by the own node, where the code CS1 will be used to detect faults of node 1 by the other nodes which receive the own node's status evaluation result S1. The data transmission section 1203 appends a header to the own node's status evaluation result S1 and makes a network failure check code appending section 1901 append a network failure check code CP1 for use to detect any fault occurring on the network 100 when the communication data is delivered to the other nodes.

For example, when receiving communication data from node 2, a network failure checking section 1902 of the reception processor 1202 determines, using the network fault detection code CP2 appended by the network failure check code appending section 2901 of node 2 and data part other than CP2, whether a data change such as a bit flip has not occurred on the network 100 during delivery of the communication data. The other-node status evaluation section 1101 checks node 2 for any fault using the code CS2 appended by the node failure check code appending section 28 of node 2 as well as S2 and stores a resulting decision E11 and a decision E13 from the network failure checking section 1902 in a region for status of node 2 in the own node's status evaluation buffer 141. Alternatively, the network failure checking section 1902 may store the decision by accessing the own node's status evaluation buffer 141 directly.

Details of the node failure check code appending section, other-node status evaluation section, data transmission section, and reception processor are shown in FIG. 6. FIG. 6 shows an example in which node 2 transmits data with fault detection code appended and node 1 receives the data and checks for any fault. The node failure check code appending section 28 has a serial number appending section 283 and a check sum appending section 284 for the status decisions S2 made by node 2. The serial number appending section 283 increments a serial number appended to data each time data is transmitted. The check sum appending section 284 finds a sum by totaling a serial number region and data region in bytes, bit-flips the sum, and appends the resulting value as a check sum. A frame processing section 2903 of the data transmission section 2203 performs communication protocol processing such as appendage of a header to S2 to which fault detection codes have been appended. Subsequently, a known CRC (cyclic redundancy check) code is appended (29011) to check whether communication data has not been corrupted on the network 100 due to a bit flip or the like.

Upon receiving the data from node 2, node 1 performs fault detection in the order opposite to the order in which fault detection codes are appended by node 2. In the network failure checking section 1902, an unreceived frame checking section 19022 and CRC checking section 19021 check for faults in the data link layer such as unreceived data or data corruption. Although not shown in the figure, faults at a communication protocol level such as synchronization errors and format errors are also detected by the network failure checking section 1902. If a fault is detected, the decision E13 is sent to a network failure decision receiving section 11011 of the other-node status evaluation section 1101. On the other hand, the other-node status evaluation section 1101 makes a check sum checking section 11015 and serial number checking section 11016 check integrity of the S2 data itself, and thereby determines the status of node 2. The check sum checking section 11015 finds a sum by totaling the serial number region and data region in bytes, bit-flips the sum, and checks whether the resulting value agrees with the check sum appended to the data by the check sum appending section of the transmitting end. Also, the serial number checking section 11016 checks whether the serial number appended to the current receive data is incremented from that of the previous receive data. If none of the checking sections detects a fault, S2 is stored in a predetermined region of the status evaluation result storage section 1201. If a fault is detected, no checking is performed at levels higher than the checking section which has detected the failure.

With the configuration according to this example, if check sum fails in node 1, it means that the data has changed due to a fault during data transfer at a level lower than the check sum appending section of node 2 or check sum checking section of node 1 or during processing by the data transmission section of node 2 or reception processor of node 1, and thus it is possible to detect the fault. Such a fault cannot be detected by conventional network failure checking sections alone.

Also, with the configuration according to this example, if a serial number error is detected in node 1, this means that the serial number was not able to be incremented in node 2 due to some fault or that a fault occurred during serial number checking in node 1. As described later, when the control logic execution section and node failure check code appending section are implemented as software, if, for example, vehicle control software in node 2 takes up all CPU resources due to an infinite loop or the like, the node failure check code appending software cannot increment the serial number, which allows the serial number checking section in node 1 to detect that a software fault has occurred in node 2.

When vehicle control software is failed, even though transmit data generated by the software is not updated, data stored in transmit buffer continues to be transmitted, causing the network failure checking section 1902 of the receiving node to determine that data is received normally. However, the configuration according to this example makes it possible to accurately monitor for even a failure condition in which processing in a specific node is in error although there is no network fault (failure in the data link layer).

As described above in detail, with the vehicle control system according to this example, not only the network failure checking section determines whether communication data is received successfully, but also the node failure check code appending section and other-node status determination section check the integrity of communication data itself, making it possible to produce node evaluation result including the presence or absence of faults such as faulty software operation in upper layers of the data link layer which cannot be detected by the network failure checking section alone. The node evaluation result are exchanged among nodes, making it possible to identify failed nodes accurately at low costs.

Figure 7:
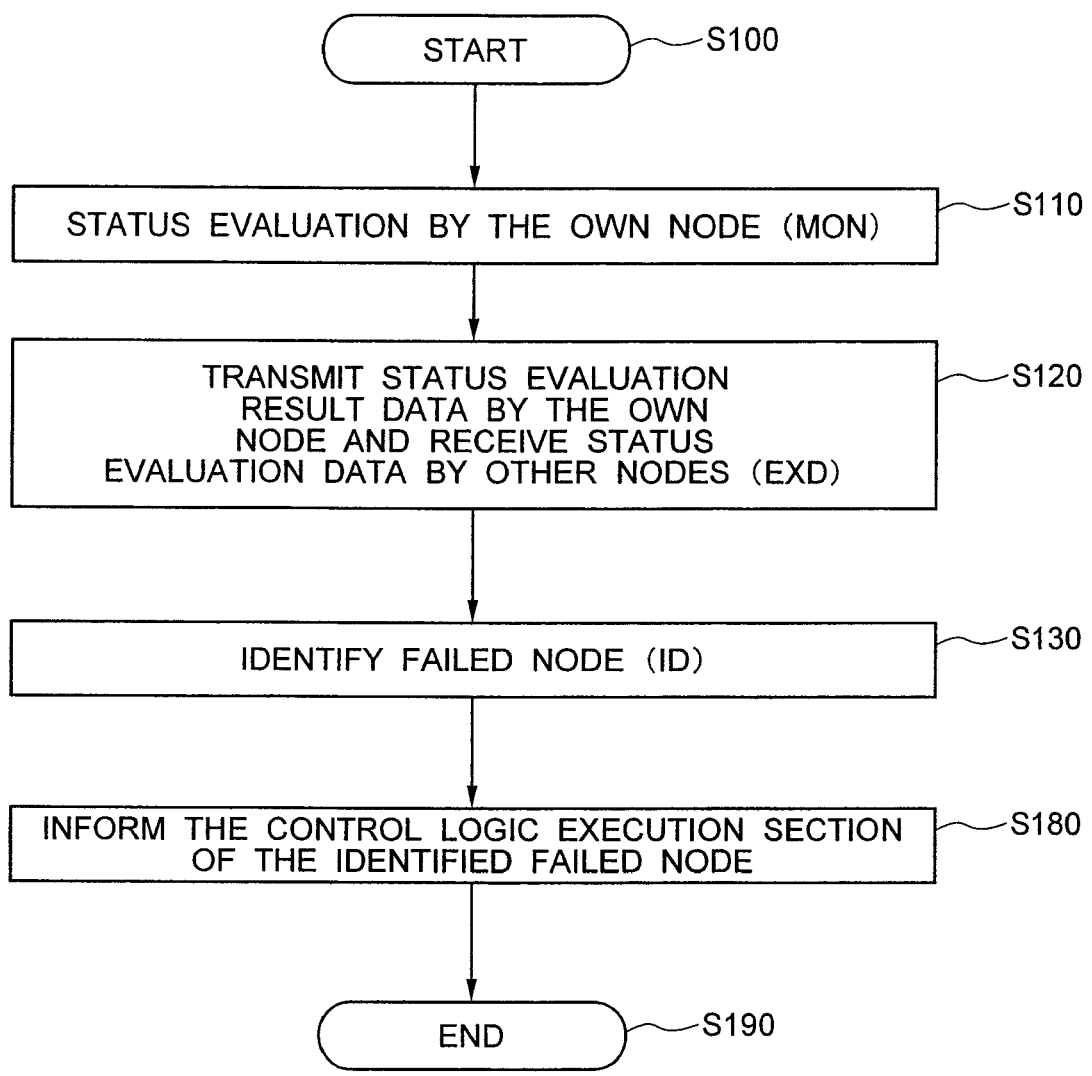
FIG. 7 is a flowchart related to an example of failed-node identification.

FIG. 7 shows a flowchart which implements a node status monitoring function. The processes of the flowchart are performed by each node.

In Step S100, processing is started. In Step S110, each node makes node status evaluation independently based on the presence or absence of various communication faults. The process in Step S110 is designated as MON. In Step S120, the evaluation made in Step S110 are transmitted (broadcasted) to the other nodes in the group. Also, each node receives node evaluation result made by the other nodes. The process in Step S120 is designated as EXD.

In Step S130, based on the status evaluation (MON results) made by itself and other nodes, each node establishes the presence or absence of each type of fault on a node by node basis. The process in Step S130 is designated as ID.

In Step S180, node fault information obtained in Step S130 is reported to various programs running on the nodes. This involves, for example, overwriting values in a specific storage area. The node fault information includes information about the presence or absence of each type of fault on a node by node basis. It indicates not only whether or not the nodes are faulty or abnormal, but also whether or not the nodes are normal or in good order. Possible programs running on the nodes include control logic, a node status display program, and a node status logger.

To report the node status information in Step S180, results of ID may be reported directly. Alternatively, they may be reported via a failure counter as described later. The processing is finished in Step S190.

Now, with reference to FIGS. 8 and 9, description will be given of an example of execution timings of processes performed by the node status evaluation section x1, transmitting section for the own node's status evaluation result and receiving section x2 for other nodes' status evaluation result, and failed-node identification section x3 described so far.

Figure 8:
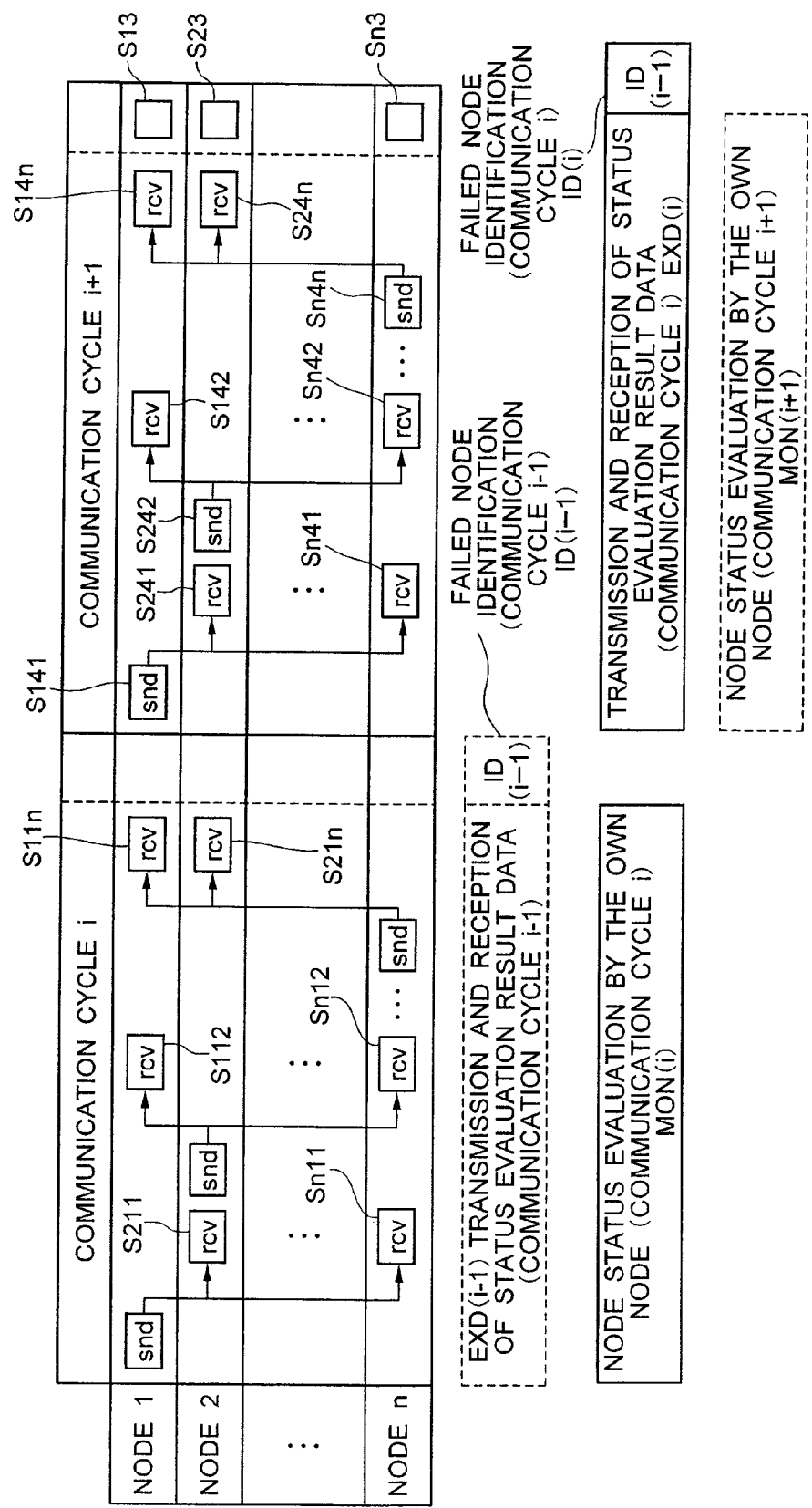
FIG. 8 is a timing chart showing transmission/reception timings in each node as well as execution timings of a series of processes related to failed-node identification.
Figure 9:
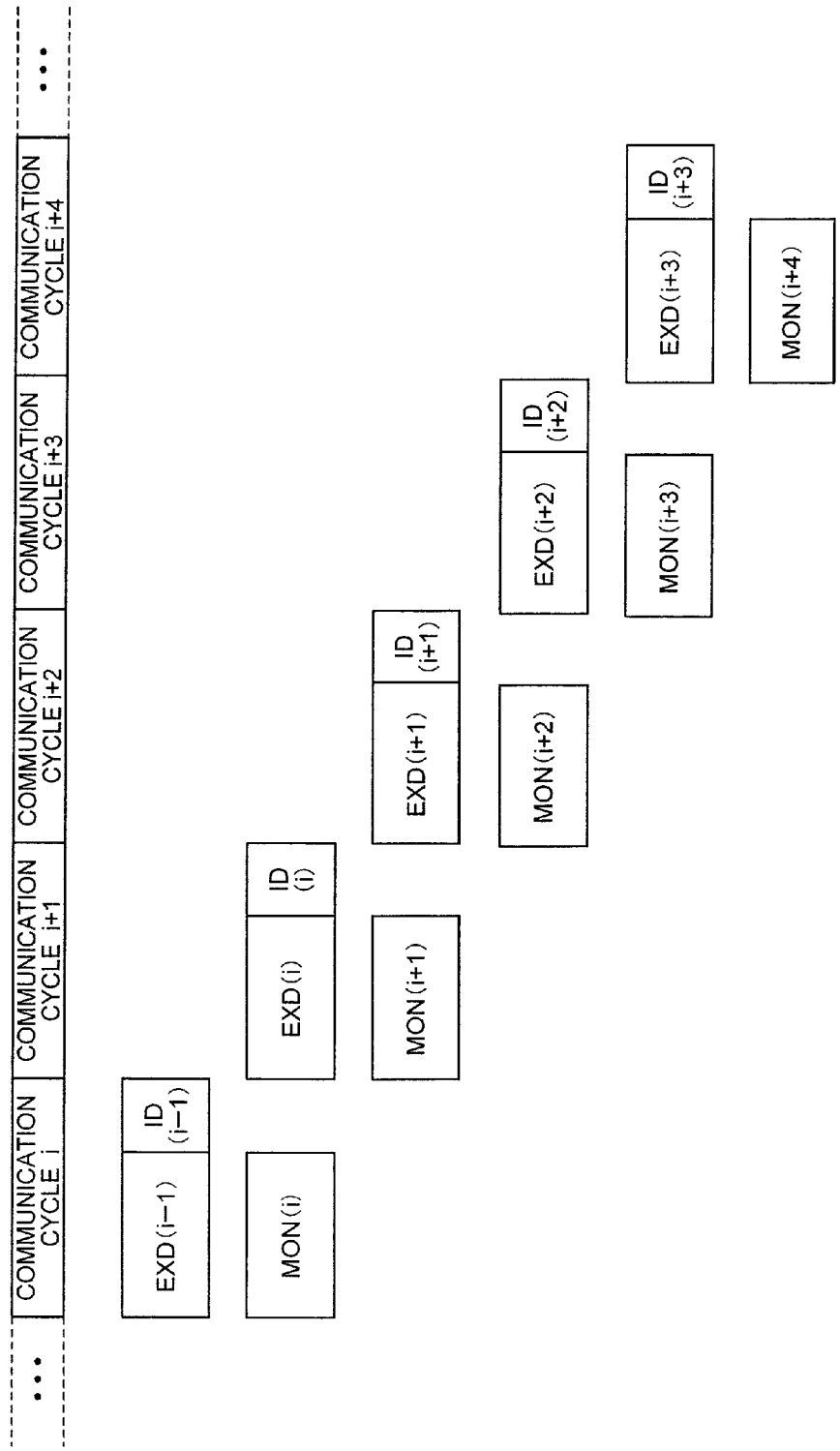
FIG. 9 is a timing chart showing execution timings of a series of processes related to failed-node identification.

FIG. 8 is a timing chart showing timings of transmission and reception to/from each node as well as the execution timings of the above processes. In one communication unit (hereinafter referred to as a communication cycle), node 1 to node n transmit data in turns and each node determines its own node status and the node status of all the other nodes. By repeating this communication cycle, it is possible to exchange and compare the node evaluation result about all the nodes made by individual nodes. This communication mode can be implemented using, for example, TTP, FlexRay, or other time-division multiplexing communication for vehicle control.

A method for displaying some of the repeated communication cycles will be described taking communication cycle i and communication cycle i+1 as an example.

In communication cycle i, each node performs a status determination process (MON(i)) to determine the status of the nodes in the network independently. First, node 1 transmits data in an snd process (sending process) with various fault detection codes (such as described above) appended, and then node 2 and subsequent nodes receive the data in rcv processes (receiving process) Sx11 (S211, S311, . . . , Sn11) and determine the status of node 1 by the method described above (see FIGS. 3 to 6). Next, node 2 transmits data in an snd process (sending process) with various fault detection codes (such as described above) appended, and then node 1 and nodes 3 to n receive the data in rcv processes (receiving process) Sx12 (S112, S312, . . . , Sn12) and determine the status of node 2 by the method described above (see FIGS. 3 to 6). Similarly, nodes 3 to n transmit data in turns, and the other nodes which receive the data, determine the status of the transmitting node. When the status evaluation process (MON (i)) in communication cycle i is finished, the status evaluation result storage section n201 of each node contains status evaluation result, made by the own node, about all the nodes in the network including the own nodes and other nodes. At this time, each node holds only the evaluation result made by the own node itself and, therefore, cannot be compared with an evaluation result by a other node. Consequently, even if a node finds a specific other node to be faulty, it is not possible to determine whether the other node is really faulty or the own node is making a misjudgment because the own node itself is failed.

Thus, in the next communication cycle i+1, own node's status evaluation result Sn held by the individual nodes are exchanged among the nodes, allowing each node to store both evaluation result made by itself and evaluation result made by all the other nodes.

First, node 1 sends, in an snd process S141, the node evaluation result S1 made by itself, and then nodes 2 to n receive the data in rcv processes Sx41 (S241, S341, . . . , Sn41). Similarly, in snd processes S242, . . . , Sn4n, nodes 2 to n send the node evaluation result Sn(i) made by themselves in communication cycle i.

Incidentally, as shown in FIG. 5, the transmit data is prepared by appending various fault detection codes Csn and the like to the decisions Sn made in communication cycle i. The receiving nodes receive the transmit data in the rcv processes Sx41, Sx42, . . . , Sx4n), determine the status of the transmitting nodes by analyzing the fault detection codes Csn, and store the decisions as own node's status decisions in communication cycle i. If the decisions are normal, the receiving nodes stores the status decisions Sn made by the other nodes (in communication cycle i) and contained in the transmit data.

This allows each node to exchange (EXD(i)) the node evaluation result Sn in communication cycle i and determine node status (MON(i+1)) by itself in communication cycle i+1.

When the exchange (EXD) of the node evaluation result Sn are finished, each node finally identifies any failed node in a process Sx3 using the status decisions made by the own node (in communication cycle i) as well as the status decisions Sn made by the other nodes (in communication cycle i) and received in communication cycle i+1. Algorithms for use to identify a failed node will be described later (FIGS. 10 to 14), but a majority rule may be used, for example. It is also conceivable to determine a node to be faulty if it is found faulty by not less than a predetermined number of nodes or not less than a predetermined proportion of nodes connected to the network.

In short, in the first half of a communication cycle, each node transmits node evaluation result made by the own node and receives node evaluation result made by the other nodes (status decision exchange: EXD), and in the second half, each node identifies any failed node (ID). Thus, according to this example, any fault detected in a communication cycle can be identified in the next communication cycle. As shown in FIG. 9, by repeating communication and determinations, in communication cycle i, the nodes exchange evaluation results produced in communication cycle i–1 (EXD(i–1)), determine node status (MON(i)) anew independently, and identify any failed node detected in communication cycle i–1 (ID(i–1)).

Preferably, the own-node evaluation result made by the own nodes themselves (e.g., a decision about node n made by node n itself) are not used in the identification of failed nodes. Specifically, it is preferable that decisions made by node 2 to node n are used in fault determination about node 1 and that evaluation results made by node 1 and nodes 3 to n are used in fault evaluation about node 2. This is because the accuracy of evaluation may be reduced if a own-node status decision made by any failed node is used in a majority decision, meaning the use of an abnormal decision in the majority decision.

However, it matters that each node should determine its own node status and send (broadcasts) it to other nodes even if the result is not used in a majority decision. This is because then application programs running on the node can select control logic and the like with the knowledge of whether or not the node is out of order.

Incidentally, although in the example described above, it is assumed for the sake of convenience that nodes 1 to n make transmissions in turns, the order in which the nodes transmit data does not matter as long as each node transmits its own decision Sn once in a communication cycle. There is no problem if the order is changed at every communication cycle.

Figure 10:
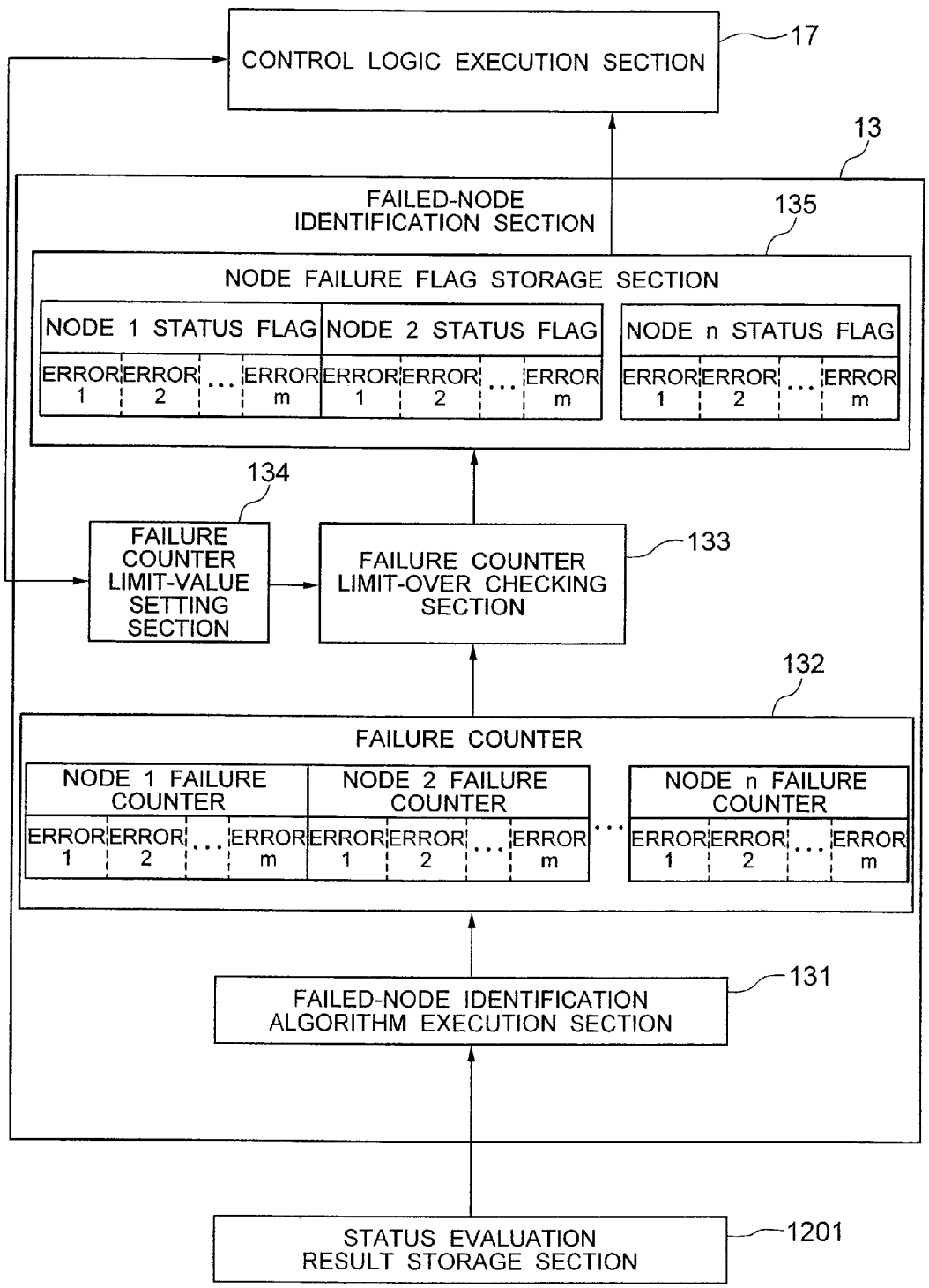
FIG. 10 is a block diagram showing a basic configuration of a failed-node identification section.

An example of the failed-node identification section x3 will be described in detail with reference to FIGS. 10 to 14. FIG. 10 shows a configuration of the failed-node identification section x3, which is assumed to belong to node 1 for convenience of explanation. The failed-node identification sections x3 (23, . . . , n3) of the other nodes 2 to n have the same configuration. The failed-node identification section 13 (of node 1) consists of a failed-node identification algorithm execution section 131, failure counter 132, failure counter limit-over checking section 133, failure counter limit-value setting section 134, and node failure flag storage section 135.

The failure counter limit-value setting section 134 and node failure flag storage section 135 are accessible from the control logic execution section 17. The failure-node identification algorithm execution section 131 identifies any failed node and the type of fault according to a predetermined algorithm (see FIGS. 11 and 12) and based on the own node's status decisions and other nodes' status decisions stored in the status evaluation result storage section 1201. Then it increments an appropriate counter in the failure counter 132. The failure counter limit-over checking section 133 determines whether each counter has reached a limit value set in the failure counter limit-over checking section 134 by the control logic execution section 17 and sets an appropriate node failure flag in the node failure flag storage section 135 for any counter which has reached the limit value. The control logic execution section 17 can know whether each node is failed by accessing the node failure flag storage section 135 and can switch control according to this information. Besides, the failure counter limit-over checking section 134 makes it possible to hide faults from the control logic execution section 17 until the limit value set by the control logic execution section 17, i.e., an acceptable fault detection time for the purpose of control, is reached.

Figure 11:
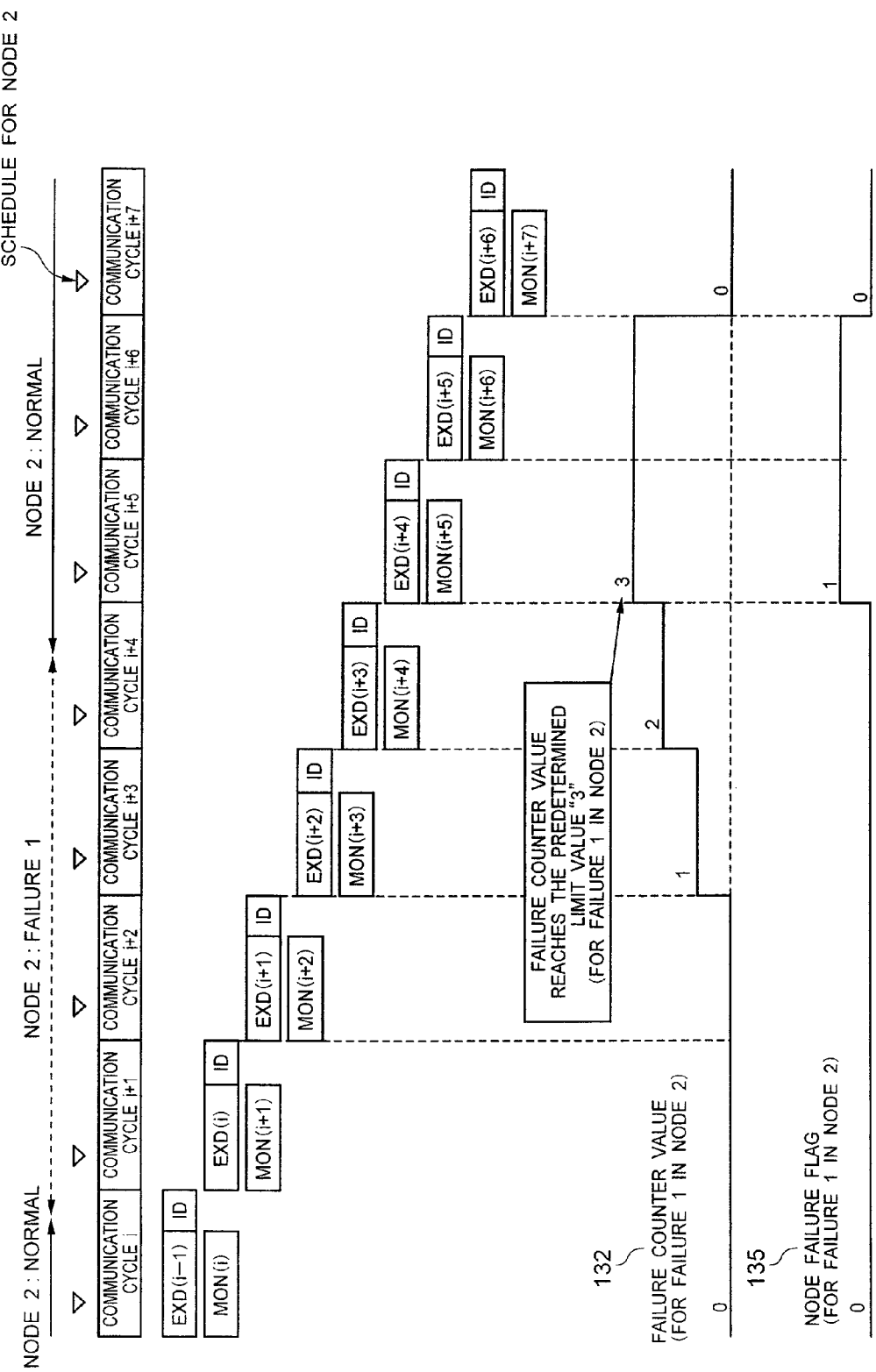
FIG. 11 is an explanatory diagram illustrating an example of operation of a failure counter.

FIG. 11 shows an example of operation of the failure counter 132. FIG. 11 shows a case in which fault 1 occurs in node 2 at a time later than send time at node 2 in communication cycle i and continues until after send time at node 2 in communication cycle i+4. It is assumed that the failure counter's limit value for fault 1 in node 2 is three. In communication cycle i+1, a fault detected in node 2 by the nodes other than node 2 is subjected to an EXD process in the first half of communication cycle i+2 and is confirmed in an ID process in the second half of communication cycle i+2, causing the appropriate counter to be incremented. The fault in node 2 is detected similarly in communication cycles i+2 and i+3, consequently the counter value reaches the limit value of three as a result of the ID process in communication cycle i+4, and thus the appropriate node failure flag is set. As long as the fault persists, the failure counter retains 3, and the node failure flag remains set. Subsequently, when the fault in node 2 is no longer detected in communication cycle i+5, the return of node 2 to a normal state is confirmed in the ID process in communication cycle i+6 and the appropriate failure counter and node failure flag are reset. The operation of the failure counter described so far is true to the other nodes, and thus the control logic execution sections x7 of all the nodes can switch control simultaneously upon occurrence of a fault in a node or return of the node to a normal state.

Figure 12:
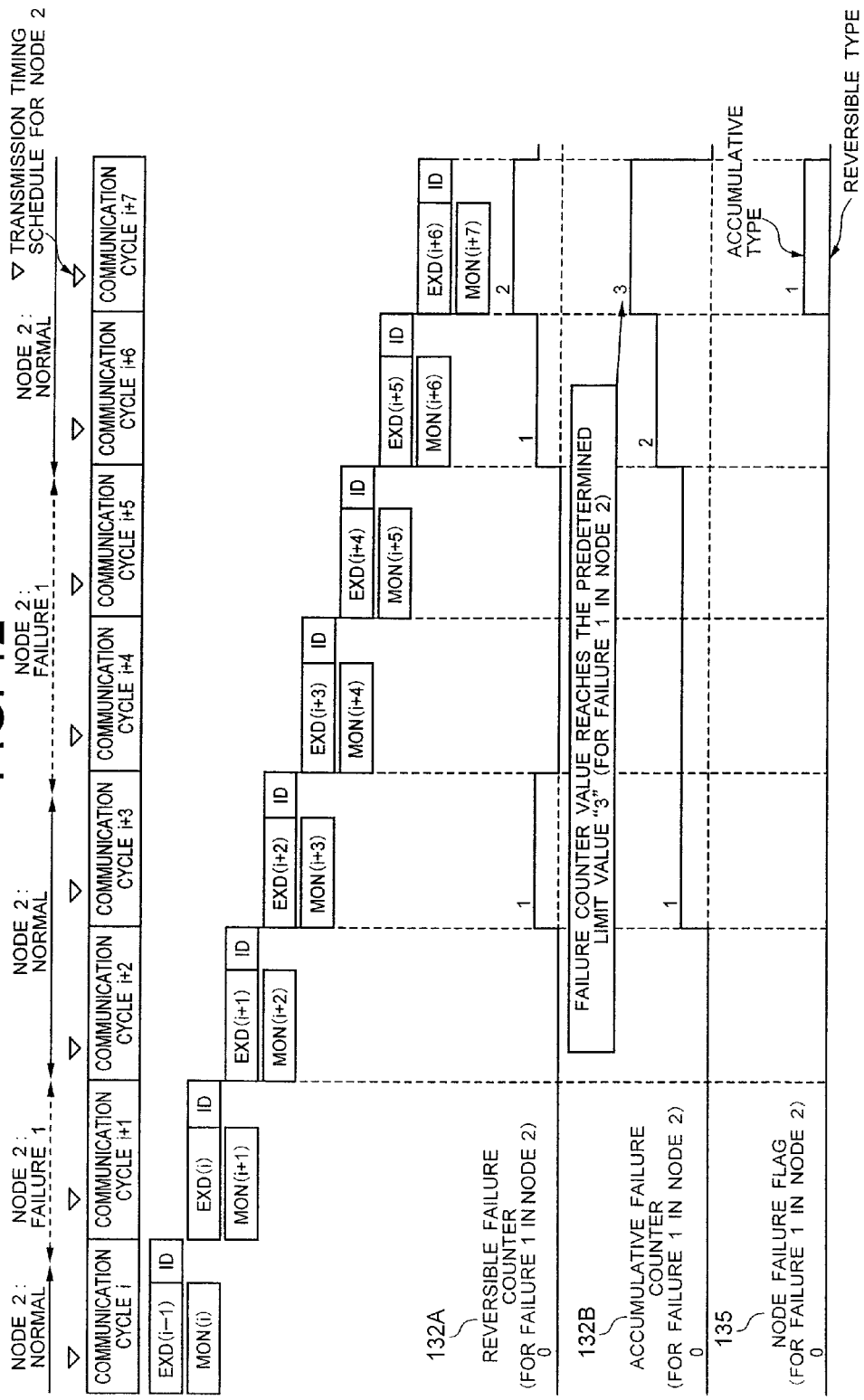
FIG. 12 is an explanatory diagram illustrating operation of an example of two types of failure counter.

FIG. 12 shows an example of two types of failure counter. Upon return to a normal state from a fault, a reversible failure counter 132A is decremented whereas an accumulative failure counter 132B retains its value without decrement. With the reversible failure counter 132A, since the counter value is decremented each time the node is determined to be normal in a communication cycle, even if counter value is temporarily increased due to the occurrence of a fault, once the fault is eliminated and the node status returns to normal, the counter value is reset to zero. Thus, the node failure flag is not set unless a fault persists for a certain period of time. This makes it possible to hide some errors from the control logic execution section. Such errors include CRC data errors which can occur with a certain probability according to the nature of a communication line, but do not affect execution of control logic because they occur with a low frequency.

On the other hand, with the accumulative failure counter 132B, the counter value is not decremented even if the node returns to normal, and increases each time the node is determined to be abnormal. Thus, this counter is useful in detecting an intermittent fault attributable to a half fit or bad contact of a harness connector. Incidentally, the control logic execution section may be allowed to select the type of failure counter according to the type of control.

Figure 13:
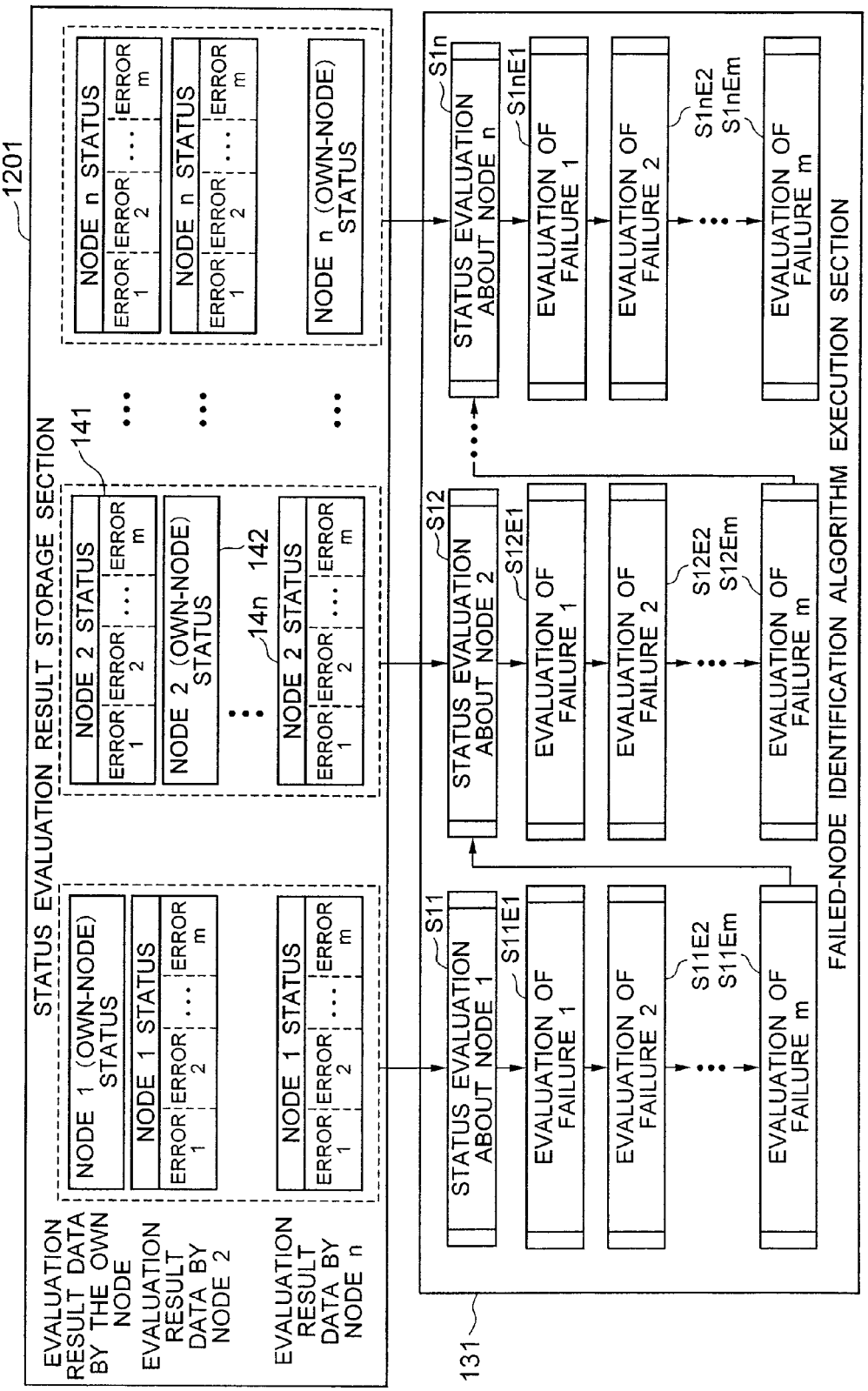
FIG. 13 is a process flowchart of a failed-node identification algorithm execution section.

FIG. 13 shows a flow of processing performed by the failed-node identification algorithm execution section 131. Although the processing by the failed-node identification algorithm execution section 131 in node 1 is cited for the sake of convenience, the same applies to processing in the other nodes.

The failed-node identification algorithm execution section 131 determines the node status of node 1 to node n in sequence. During a fault determination process Six for node x, the failed-node identification algorithm execution section 131 reads status evaluation result about node x made by all the nodes excluding node x out of the status evaluation data storage section 1201. However, it does not use the status decisions made by nodes in which a fault has been detected. In the fault evaluation process Six for node x, a fault occurrence evaluation process S1$x$E1, S1$x$E2, ..., or S1$x$Em is performed for each fault using the status evaluation results read out.

Figure 14:
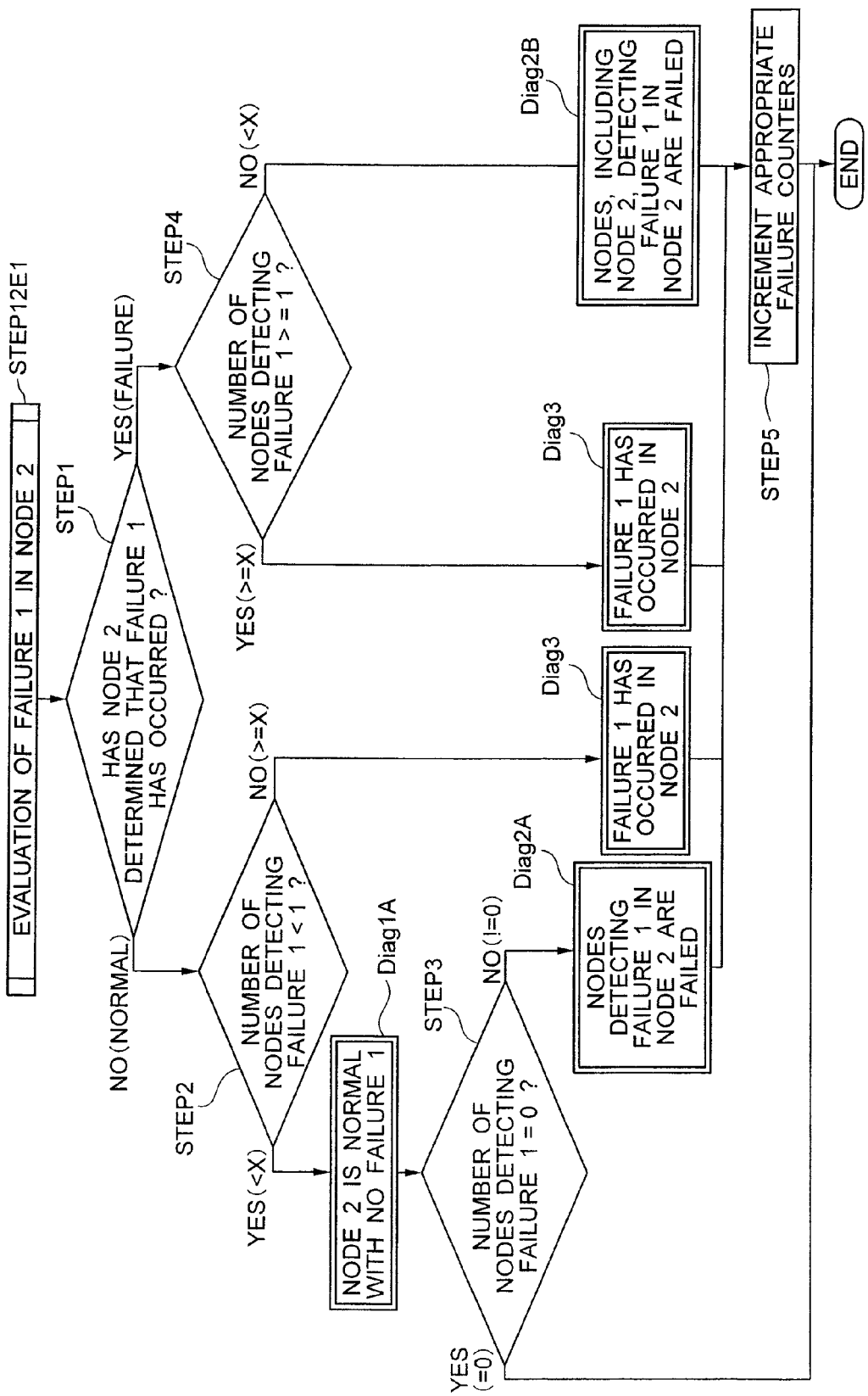
FIG. 14 is flowchart related to an example of a fault occurrence determination process.

FIG. 14 shows an example of flow of the fault occurrence determination process. Although Step 12E1 for determination of fault 1 in node 2 is cited, the processing flow in FIG. 14 applies to all the fault occurrence determination processes. Step 12E1 for determination of fault 1 in node 2 begins with checking in Step 1 whether node 2 has determined that fault 1 has occurred, with reference the status decisions made by node 2 itself. If node 2 has determined that fault 1 has not occurred, meaning that node 2 is normal, the flow goes to Step 2 to determine whether the number of other nodes which determine that fault 1 has occurred is smaller than a diagnostic threshold X set by the control logic execution section, i.e., whether a majority of nodes determine that node 2 is normal. If the number is smaller, the failed-node identification algorithm execution section 131 gives diagnosis Diag1 that fault 1 has not occurred in node 2 and that node 2 is normal. In Step 3, it is determined whether there is any node which has determined erroneously that fault 1 has occurred. If there is, the failed-node identification algorithm execution section 131 gives diagnosis Diag2A that node which has determined that fault 1 has occurred in node 2 is failed. If it is found in Step 3 that there is no node which has made an erroneous determination, Step 12E1 for determination of fault 1 in node 2 is finished and the flow goes to Step 12E2 for determination of fault 2 in node 2. On the other hand, if it is found in Step 2 that the number of other nodes which determine that fault 1 has occurred is equal to or larger than the diagnostic threshold X, the failed-node identification algorithm execution section 131 gives diagnosis Diag3 that fault 1 has occurred in node 2.

If it is found in Step 1 that node 2 has determined that fault 1 has occurred in node 2, the flow goes to Step 4 to determine whether the number of other nodes which determine that fault 1 has occurred is equal to or larger than the diagnostic threshold X, i.e., whether the number of other nodes which agree with node 2 is equal to or larger than the diagnostic threshold X. If it is equal to or larger than the diagnostic threshold X, diagnosis Diag3 is given as when fault 1 has occurred in node 2. If it is found in Step 4 that the number of other nodes which determine that fault 1 has occurred is smaller than the diagnostic threshold X, meaning that the number of other nodes which agree with node 2 is smaller, the failed-node identification algorithm execution section 131 gives diagnosis Diag2B that the nodes—including node 2, which have determined that fault 1 has occurred in node 2 are faulty. This compares with diagnosis Diag2A made in Step 3 that minority nodes which do not agree with the majority is failed. When the failed nodes and type of fault are identified, i.e., in the case of diagnoses Diag2A, Diag2B, and Diag3, the appropriate failure counters are incremented in Step 5 to end Step 12E1 for determination of fault 1 in node 2.

Incidentally, if programs running on the nodes are immediately informed that there are faults when diagnosis Diag2A, Diag2B, or Diag3 is made, Step 5 may be omitted.

According to this example, the diagnostic threshold X can be set depending on how far the control logic execution section can allow multi-faults of nodes in the system it controls. For example, in a system in which the total number of nodes is n, if the diagnostic threshold is set to X=n−2, up to two failed nodes can be identified by the remaining normal nodes. Also, with the algorithm according to this example, when a node is determined to be normal by the node itself, even if a majority of nodes determine the node to be abnormal, putting the node in the minority (No in Step 2), the node does not determine that it is failed unlike the diagnosis Diag2B.

Figure 15:
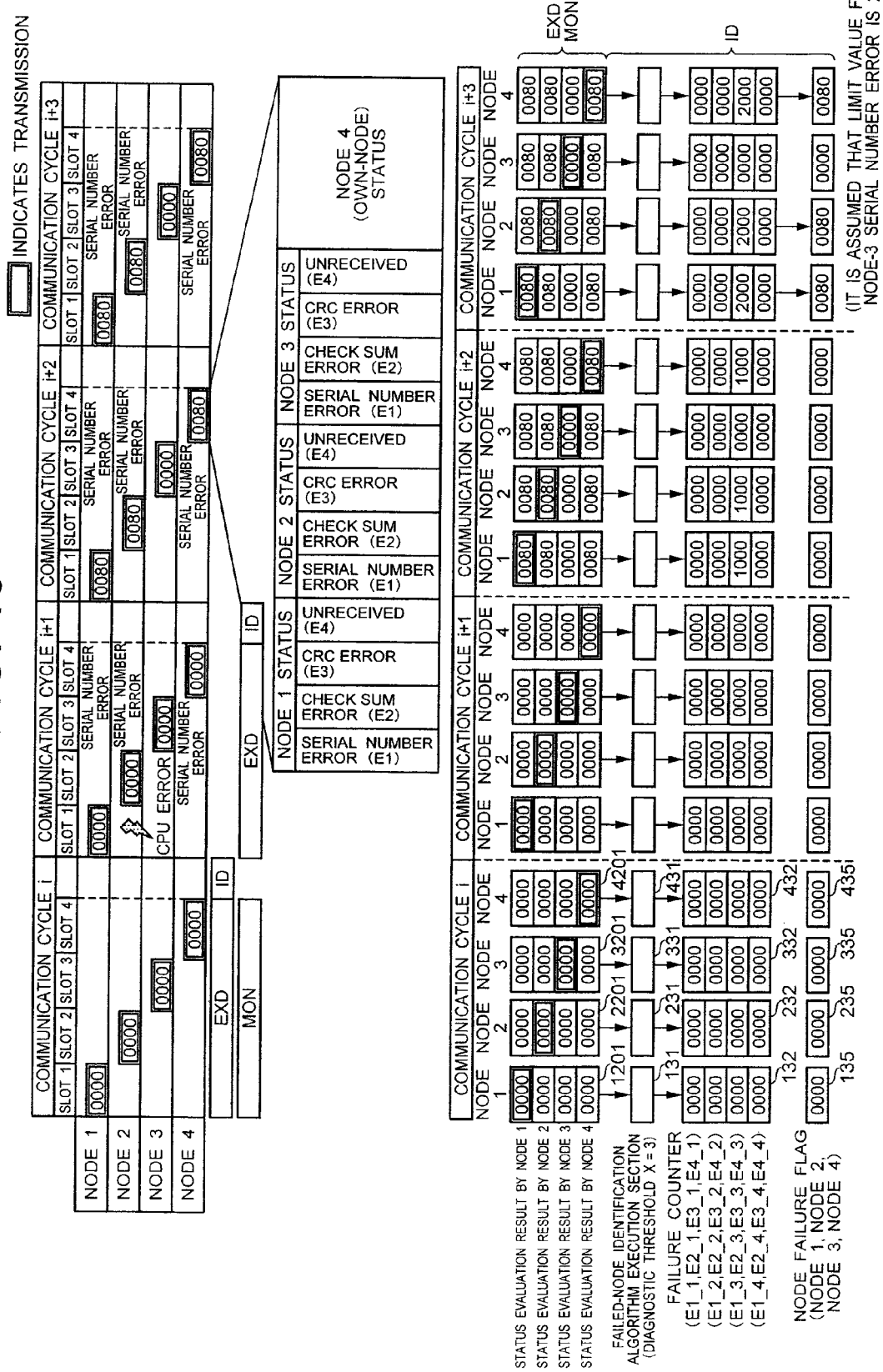
FIG. 15 is an explanatory diagram illustrating operation of a vehicle control system according to an example of the present invention.
Figure 16:
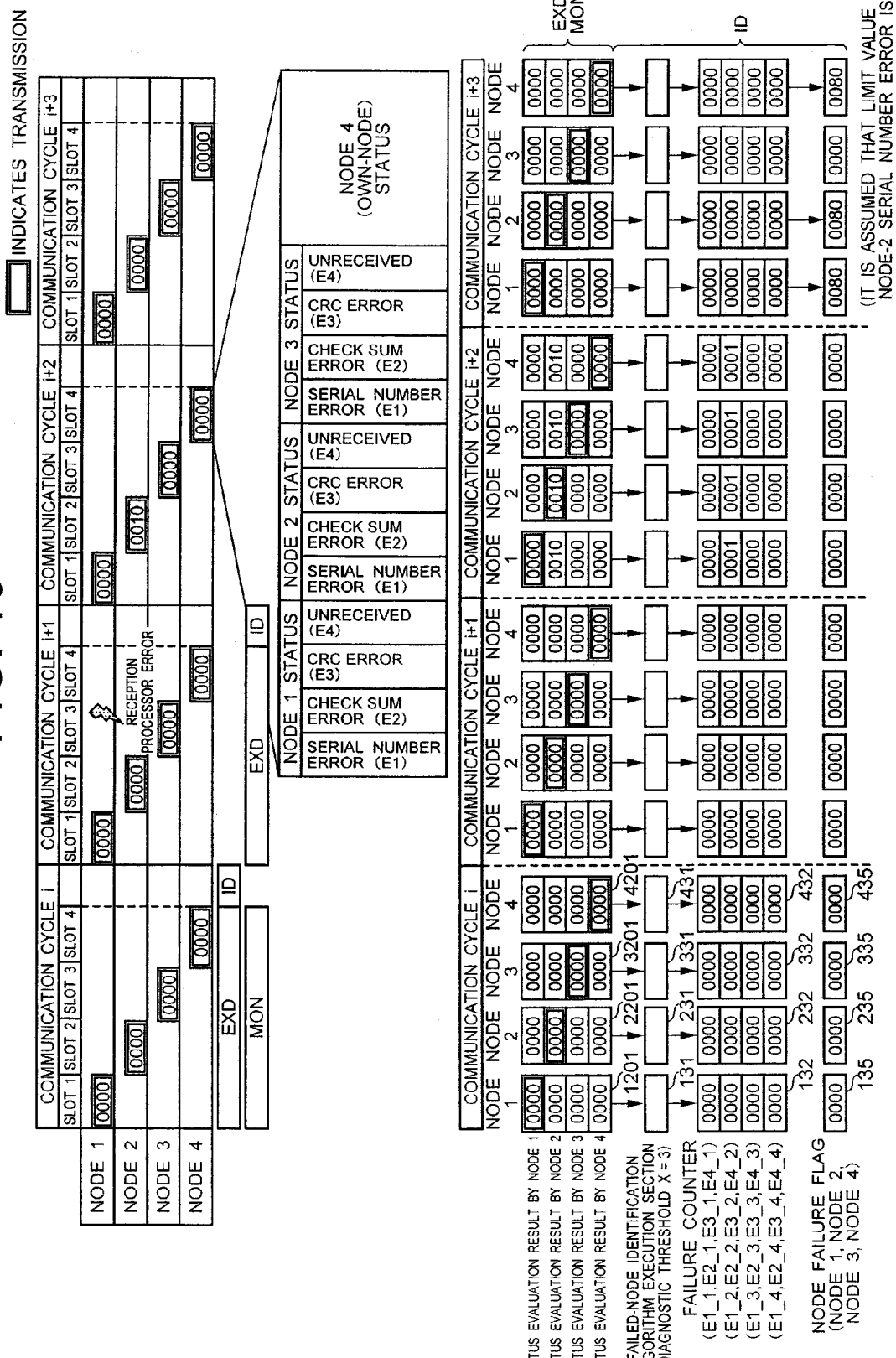
FIG. 16 is an explanatory diagram illustrating operation of a vehicle control system according to an example of the present invention.

FIGS. 15 and 16 show two examples by putting together the examples of individual components described so far. They show transmit timing and transmit data from each node; timing chart of fault occurrences; and changes in the status evaluation result storage section x201, failure counter x32, and node failure flag x35 of each node on the occurrence of faults.

Double lines are drawn around transmit data. Only status decisions are shown as the transmit data for the sake of simplicity, but it is assumed that actually control data is transmitted together with the status decisions. It is assumed that the number of nodes in the network is 4, that the diagnostic threshold X set by the control logic execution section for the failed-node identification algorithm execution section x31 is 3, and that the limit value of the failure counter is 2. The status of each node is expressed in terms of the presence or absence of four types of fault: Serial Number Error (E1), Check Sum Error (E2), CRC Error (E3), and Frame Unreceived (E4). Incidentally, according to this example, it is assumed that the own-node status decision of each node is 0, meaning that each node has determined itself to be normal.

In FIG. 15, it is assumed that a CPU fault occurs in node 3 during time slot 1 of communication cycle i+1, causing software to malfunction. Node 3 is supposed to transmit, during slot 3, the status decision made in communication cycle i, but the node failure check code appending section 38 cannot increment the serial number due to the CPU fault. Consequently, upon receiving the status decision from node 3, the other nodes detects that the serial number is not incremented and determines that a serial number error has occurred in node 3. At this time, however, even if the fault of node 3 is detected, each detecting node cannot identify accurately whether it is a fault of node 3 or misjudgment of its own because the determination is made by the detecting node alone. Thus, in the next communication cycle i+2, nodes 1, 2, and 4 transmit their own status decisions 0080 (which indicate the serial number error in node 3). In the second half of communication cycle i+2, each node executes the failed-node identification algorithm shown in FIG. 14 using the status decisions made by nodes 1, 2, and 4. Consequently, the serial number error in node 3 is confirmed and nodes 1, 2, and 4 increments the failure counter E13. Since the fault in node 3 persists in communication cycle i+2 and later, the failure counter E13 is incremented similarly in communication cycle i+3. Consequently, the failure counter value reaches the limit value and the appropriate node failure flag is set.

In FIG. 16, it is assumed that during time slot 3 in communication cycle i+1, a fault occurs in the receiving section of node 2. Since node 2 cannot receive data from node 3 in communication cycle i+1, it determines that a fault has occurred in node 3 and transmits a status decision 0010 (transmit data unreceived from node 3) made by itself. However, nodes 1 and 4 receive data from node 3 properly and transmit a status decision. Consequently, in the process of determining the fault of unreceived transmit data in node 3, it is confirmed that a fault has occurred in node 2, and the failure counter E4_2 is incremented. Node 2 also learns from the status decision made by the other nodes that a fault has occurred in node 2 itself, and increments its own failure counter E4_2. Node 2 returns to normal in communication cycle i+2, and thus the counter value is reset to 0 in communication cycle i+3 in the case of a reversible failure counter.

In the configuration of the transmit data (frames) shown in FIG. 15, four types of fault—Serial Number Error (E1), Check Sum Error (E2), CRC Error (E3), and Frame Unreceived (E4)—are shown as types of node status and failure counter. In a system which employs duplexed networks to improve reliability, it is conceivable to classify faults on a network by network basis, such as Frame Unreceived in Network 1 (E1), Frame Error in Network 1 (E3), Frame Unreceived in Network 2 (E3), and Frame Error in Network 2 (E4). The frame error here means that a received frame contains an error defined by a communication protocol such as a format error, CRC error, serial number error, or check sum error.

In FIGS. 15 and 16, since the failure counters are incremented simultaneously in the nodes, node failure flags are set simultaneously and the fault is reported to control applications. However, failure counter values may not coincide completely among the nodes and the timing to report the fault to the control applications may vary among the nodes. The control applications perform backup control based on a fault notification, and the timing to change from normal control to backup control will vary from node to node, which may make it impossible to perform backup control properly. For example, if some transient error occurs during processing by the failed-node identification section in a certain node, the failure counter cannot be incremented or decremented properly and its value will deviated from the failure counter values in the other nodes. In the case of a halfway reset, the failure counter is initialized to 0.

Figure 17:
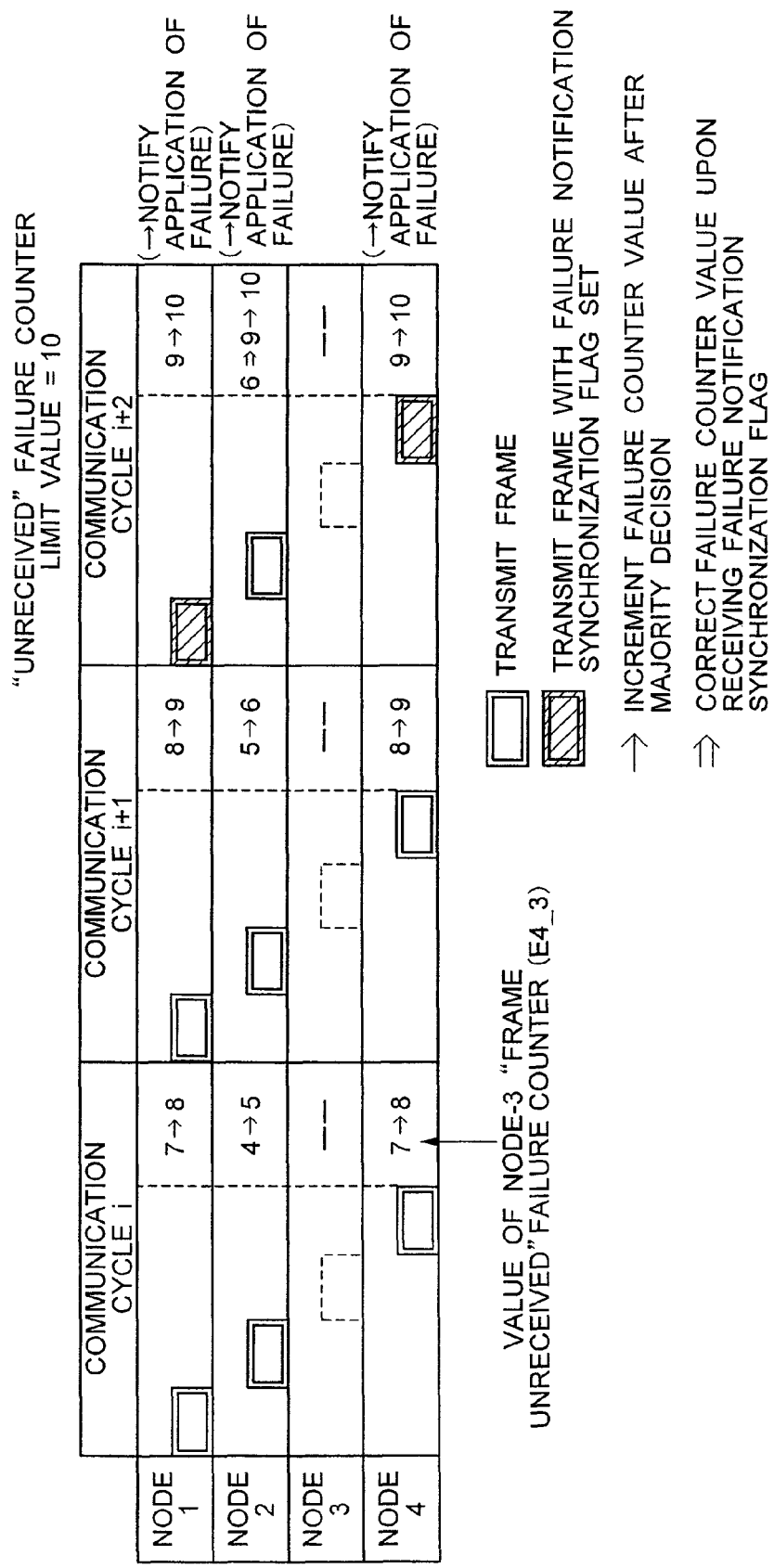
FIG. 17 is an explanatory diagram illustrating another example of the fault occurrence determination process.

FIG. 17 shows an example in which a fault can be reported simultaneously to applications even if failure counter values do not coincide among nodes for reasons such as described above. In FIG. 17, it is assumed that when node 3 cannot transmit frames due to a fault, the other nodes identify the "Frame Unreceived from node 3" fault by means of the failed-node identification algorithm as described above and increment a failure counter E4_3 which indicates the "Frame Unreceived from node 3" fault, but that the failure counter E4_3 in node 2 does not agree with those in nodes 1 and 4. According to this example, it is assumed that the limit value of the "Unreceived" failure counter is 10.

The failure counters E4_3 in nodes 1 and 4 are set to 9, the limit value minus 1, after the failed-node identification process in communication cycle i+1. In the next communication cycle i+1, i.e., in the communication cycle in which the failure counters reach the limit value, the two nodes transmit a frame containing a fault notification synchronization flag (hereinafter such a frame will be referred to as a fault notification synchronization frame). By receiving the frame, node 2 corrects the failure counter value to 9, the limit value minus 1, before the failed-node identification process. Thus, according to this example, even if failure counter values do not coincide among nodes, the timings of fault notifications to the control applications can be synchronized among all the normal nodes.

An example of transmit frame configuration (in the case of node 1) used to implement the above function is shown in FIG. 18. The transmit frame consists of the node evaluation result S1 described above and a fault notification synchronization flag field Sync1. The fault notification synchronization flag field Sync1 consists of whether the counter value of the failure counter in each node has reached "the limit value—1" (1) or not (0). In the example in FIG. 17, in communication cycle i+2, nodes 1 and 4 transmit a frame with a bit set in the node-3 "Frame Unreceived" failure counter E4_3 of the fault notification synchronization flag field Sync1 as shown in FIG. 18.

If the failure counter values are brought into agreement by constantly exchanging the failure counter values themselves, it is necessary to transmit an amount of communication data equal to the bit count of the failure counter×the number of error factors×the number of nodes. Actually, however, there is no need to constantly bring the failure counter values into agreement among nodes and it needs only to synchronize the timings of fault notifications to the control applications as in the case of this example. In this example, the timings of fault notifications to the control applications can be synchronized among the nodes using only a small amount of communication data, which is equal to the number of error factors×the number of nodes.

By transmitting the fault notification synchronization frame not only in the communication cycle immediately after the failure counter value reaches "the limit value—1," but also in the subsequent communication cycles, it is possible to synchronize the timings of fault notifications to the control applications among the nodes more reliably.

Figure 19:
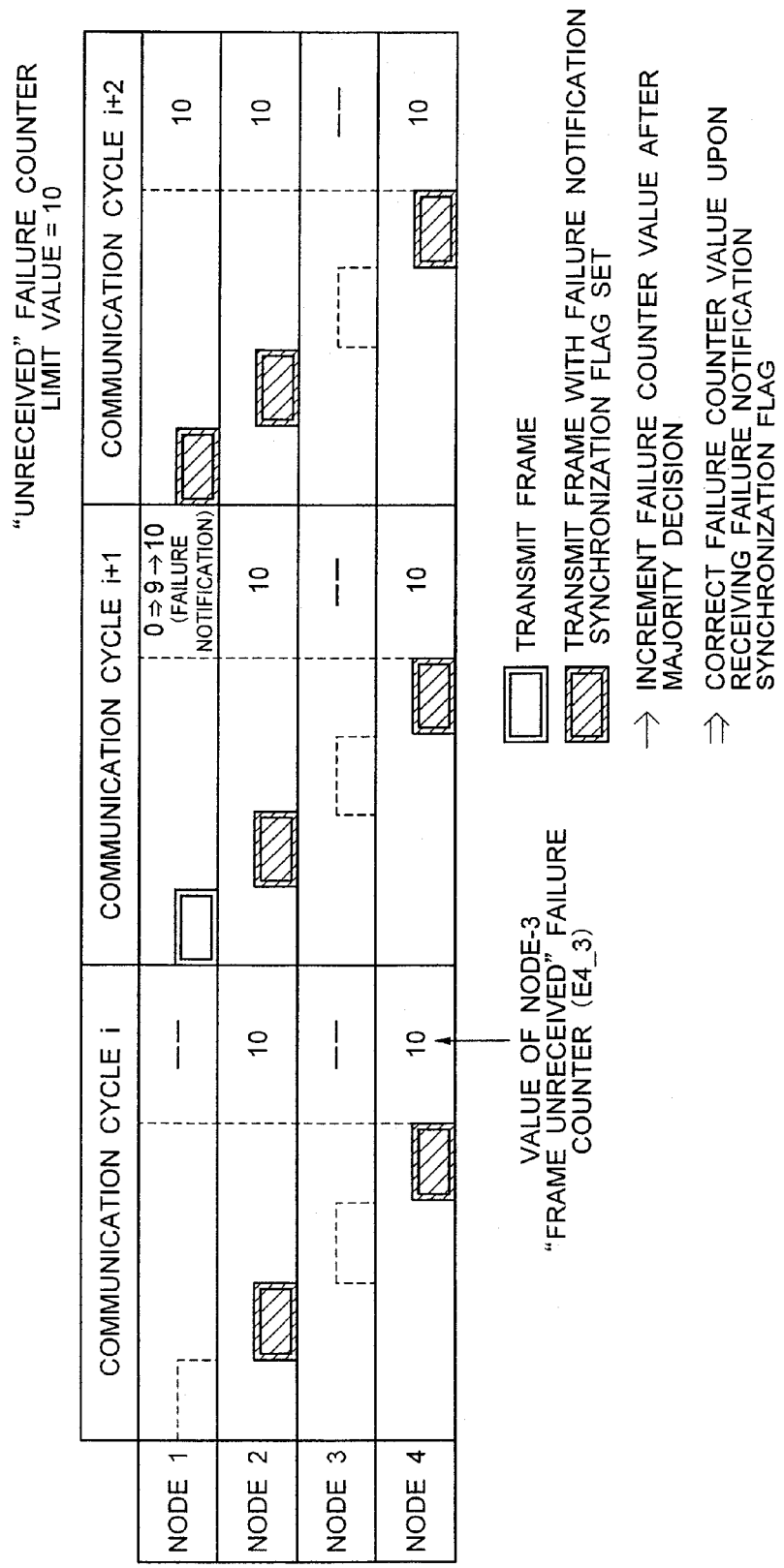
FIG. 19 is an explanatory diagram illustrating another example of the fault occurrence determination process.

In FIG. 19, it is assumed that when nodes 2 and 4 are performing backup control for a node-3 fault because node 3 cannot transmit frames due to the fault and the node-3 "Frame Unreceived" failure counter E4_3 in nodes 2 and 4 has reached the limit value, node 1 participates in communication in communication cycle i+1 either newly or by returning after a reset process or the like. Since nodes 2 and 4 continue to transmit the fault notification synchronization frame even after the node-3 "Frame Unreceived" failure counter E4_3 reaches the limit value, node 1 can correct the limit value to 9 immediately in the communication cycle during which it participates in the communication and shift to backup control instead of continuing a normal control process apart from nodes 2 and 4 until the failure counter reaches the limit value of 10.

Figure 20:
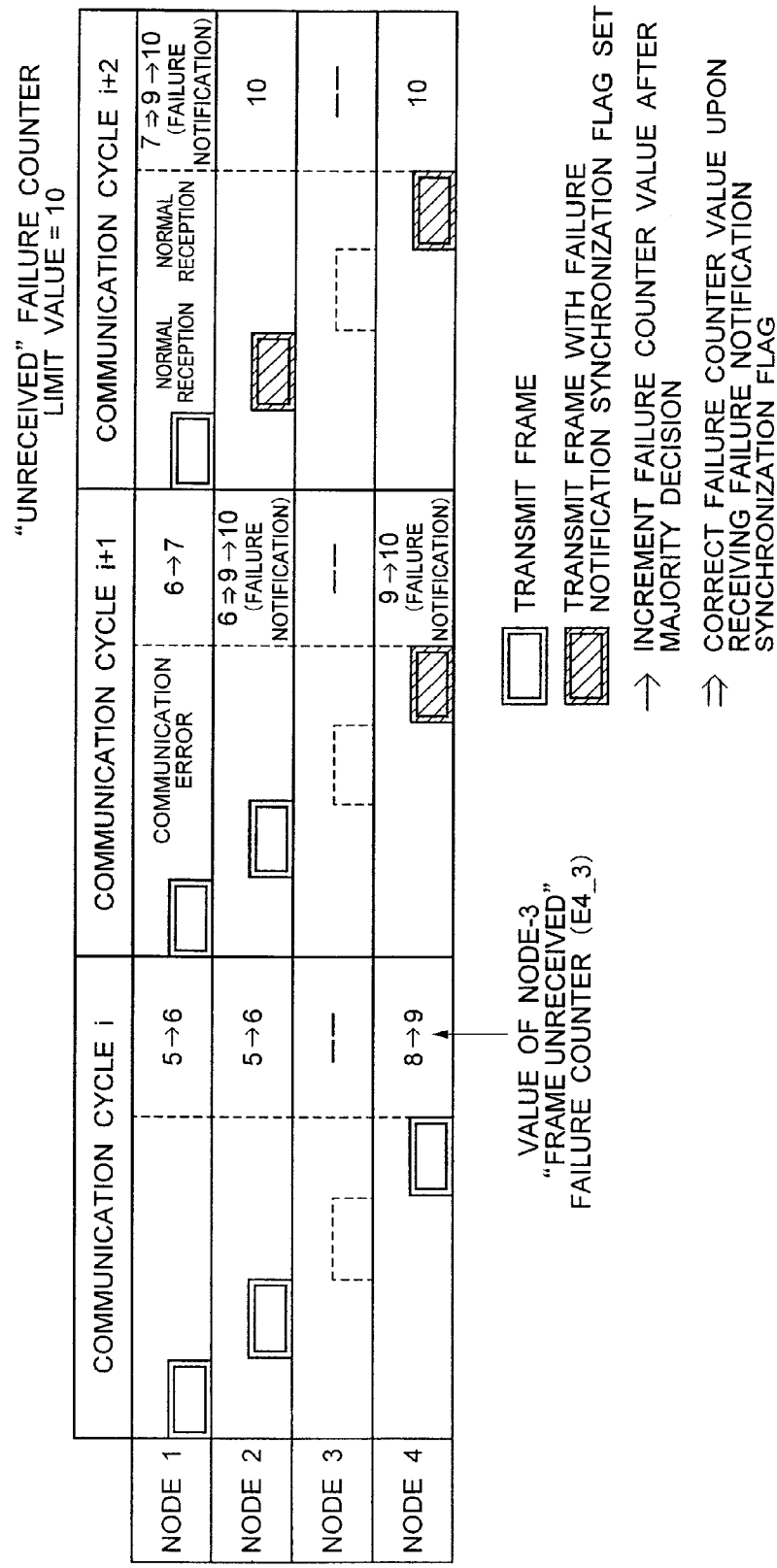
FIG. 20 is an explanatory diagram illustrating another example of the fault occurrence determination process.

FIG. 20 shows a case in which node 4 transmits a fault notification synchronization frame related to a node-3 "Frame Unreceived" fault in communication cycle i+1 and node 2 receives it but node 1 cannot. Node 2 corrects the failure counter value to 9 in this communication cycle, and notifies the control application of the fault after a failed-node identification process. Consequently, node 2 transmits a fault notification synchronization frame in the next communication cycle i+2. Since node 1 can receive the fault notification synchronization frame from node 2 or 4, it can shift to backup control in the next communication cycle like the other nodes even though it fails to receive the fault notification synchronization frame from node 4 in communication cycle i+1.

In the examples shown in FIGS. 17, 19, and 20, the fault notification synchronization frame is transmitted in the first communication cycle after the failure counter value reaches "the limit value—1," but it may be transmitted in the first communication cycle after the failure counter reaches the limit value, i.e., the fault is reported to the control application. In that case, however, the timings of fault notifications may vary among nodes by a period equal to one communication cycle, and thus the duration of one communication cycle should be made sufficiently smaller than the time constant of vehicle motion. Also, in FIG. 20, if there is any node in which the failure counter value reaches "the limit value—1," the other nodes corrects their own failure counter values according to the fault notification synchronization frame transmitted from the given node, but it is alternatively possible to design, for example, such that the failure counter values are corrected only if fault notification synchronization frames are received from a majority of normal nodes.

Figure 21:
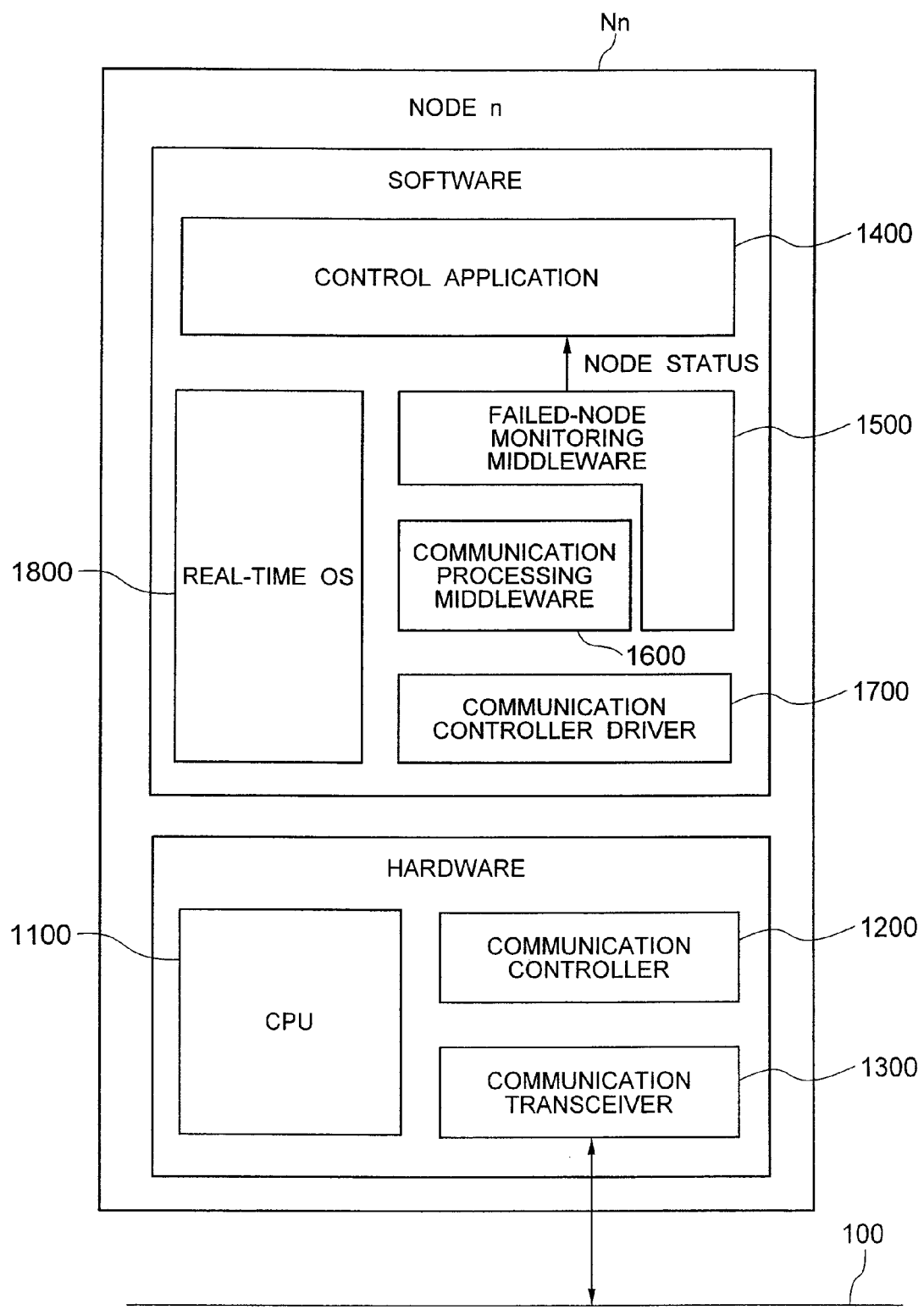
FIG. 21 is a diagram showing hardware and software configurations in each node.

An example of hardware and software configurations in each node are shown in FIG. 21. According to this example, the failed-node monitoring function according to the present invention is implemented by middleware subordinate to the control application software which executes the vehicle control logic. The hardware consists of a CPU 1100, a communication controller 1200, and a communication transceiver 1300 while software consists of a control application 1400, failed-node monitoring middleware 1500, communication processing middleware 1600, a communication controller driver 1700, and a real-time OS 1800. Referring to FIG. 6, the packing process and unpacking process are performed by the communication processing middleware 1600; and the network fault detection code appending process, network fault determination process, frame processing, and data transmitting/receiving process are performed by the communication controller driver 1700 and communication controller 1200. The communication transceiver 1300 corresponds to the network access section x6.

The failed-node monitoring middleware 1500 performs the network fault detection code appending process, other-node status determination process, and failed-node identification process. It has APIs (Application Program Interfaces) to provide node status information to the control application 1400. At a lower level, it provides an interface between the communication processing middleware 1600 and communication controller driver 1700. According to this example, since the failed-node monitoring function is implemented by means of middleware, the control application can acquire node status information using a predetermined API, and thus it is possible to improve development efficiency of control application software.

Figure 22:
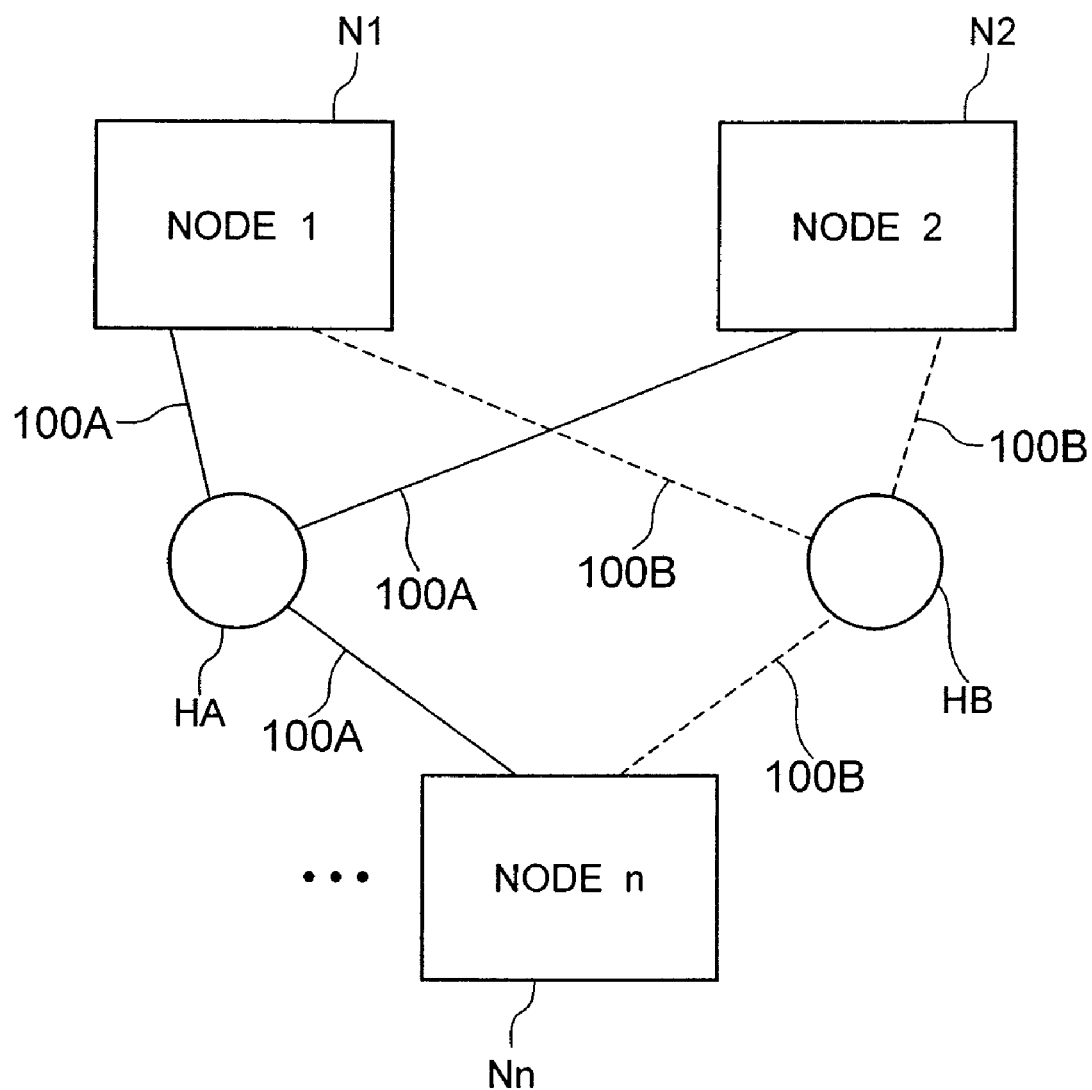
FIG. 22 is a diagram showing an example of network configuration.

The above examples are based on a bus network topology, but a star network topology via hubs may be used alternatively as shown in FIG. 22. Preferably, duplex networks are used to improve reliability. According to this example, nodes 1 to n are connected to a main network 100A and backup network 100B via hubs HA and HB, respectively.

With the bus network topology, if the network is disconnected, the system may be almost split in half depending on the location of disconnection. On the other hand, with the star network topology, only one node is isolated, and thus the isolated node can be identified accurately using a failed-node identification algorithm such as shown in FIG. 14.

Example 2

Next, description will be given of an example in which the node status determination according to the present invention is applied to a vehicle control system.

Figure 23:
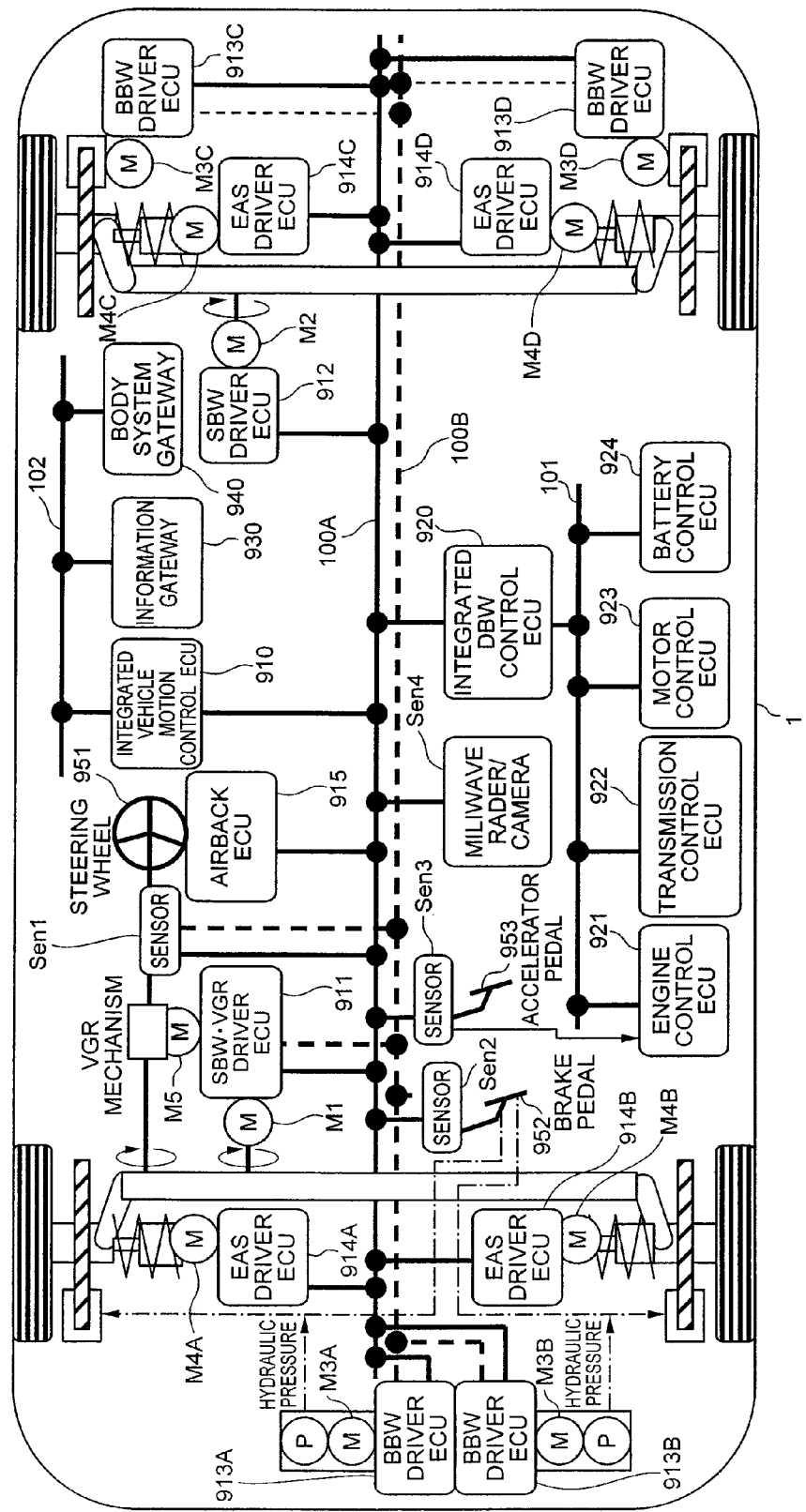
FIG. 23 is a system block diagram related to an example of a vehicle control system.

FIG. 23 shows an example of a vehicle control system. According to this example, a vehicle 1 is equipped with steering and brake backup mechanisms, but the same configuration may be used for vehicles which are not equipped with steering and brake backup mechanisms.

A vehicle control system 901 according to this example is equipped with an integrated vehicle motion control ECU 910 which centrally controls vehicle motion based on signals from a steering angle sensor Sen1 which measures a rotation angle of a steering wheel 951, brake pedal position sensor Sen2 which measures a depression of a brake pedal 952, accelerator pedal position sensor Sen3 which measures a depression of an accelerator pedal, and sensors (e.g., an acceleration sensor, yaw rate sensor, and wheel speed sensor: not shown) which detect vehicle conditions by interpreting an intention 21 of the driver using signals from the sensors which detect driver's requests. These components constitute nodes, being connected to the main network 100A.

An SBW (Steer-by-Wire) VGR driver ECU 911 which controls a steering motor M1 and a motor M5, an SBW driver ECU 912 which controls a steering motor M2, BBW (Brake-by-Wire) driver ECUs 913A to 913D which control brake motors M3A to M3d, an integrated DBW (Driver-by-Wire) control ECU 920 which centrally controls a drive system of the vehicle, EAS (Electronic Active Suspension) Driver ECUs 914A to 914D which control suspension motors M4A to M4D are connected as actuator driving nodes to the main network 100A, where the steering motor M1 generates a front-wheel steering force, the motor M5 acts on a variable gear ratio (VGR) mechanism mounted on a steering column, the steering motor M2 generates a front-wheel steering force, the brake motors M3A to M3d generate braking forces for the four wheels, and the suspension motors M4A to M4D adjust damping forces.

Furthermore, the main network 100A is connected with a millimeter wave radar/camera Sen4 which detects conditions outside the vehicle and an airbag ECU 915 which controls airbag deployment The backup network 100B is connected with minimum nodes required for safe running of the vehicle: namely, the steering angle sensor Sen1, brake pedal position sensor Sen2, SBW VGR driver ECU 911, and BBW driver ECUs 913A to 913D.

The integrated DBW control ECU 920 is connected with an engine control ECU 921, transmission control ECU 922, motor control ECU 923, and battery control ECU 924 via a network 101. The integrated vehicle motion control ECU 910 is connected with an information gateway 930 and body system gateway 940 via a network 102 and exchanges data with these devices, where the information gateway 930 provides a gateway into a network which controls car navigation and other information devices and the body system gateway 940 provides a gateway into a network which controls body-related devices such as door locks, side mirrors, and various meters. Although not shown, the airbag ECU 915 is connected at another end with a safety-related network which integrates various sensors and actuators needed for airbag deployment control.

According to this example, the integrated vehicle motion control ECU 910 calculates the steering angle, braking forces, driving force, and the like for vehicle travel control based on signals from a steering angle sensor Sen1, brake pedal position sensor Sen2, accelerator pedal position sensor Sen3, and sensors (e.g., an acceleration sensor, yaw rate sensor, and wheel speed sensor: not shown) which detect vehicle conditions. Then, it gives steering angle commands to a front-wheel SBW VGR driver ECU 11 and rear-wheel SBW VGR driver ECU 12, braking force commands to the BBW driver ECUs 913A to 913D of the four wheels, and a driving force command to the integrated DBW control ECU 920. Upon receiving the driving force command, the integrated DBW control ECU 920 calculates driving forces which power sources such as an engine and motors should generate, taking energy efficiency into consideration and transmits resulting driving force commands to the engine control ECU 921, motor control ECU 923 and the like via a network N2. By using not only the information from the sensors which detect driver's requests, but also information from the radar/camera Sen4 which detects the conditions outside the vehicle, the integrated vehicle motion control ECU 910 can perform control such as trail driving, lane-keeping driving, and risk-averse driving.

Figure 24:
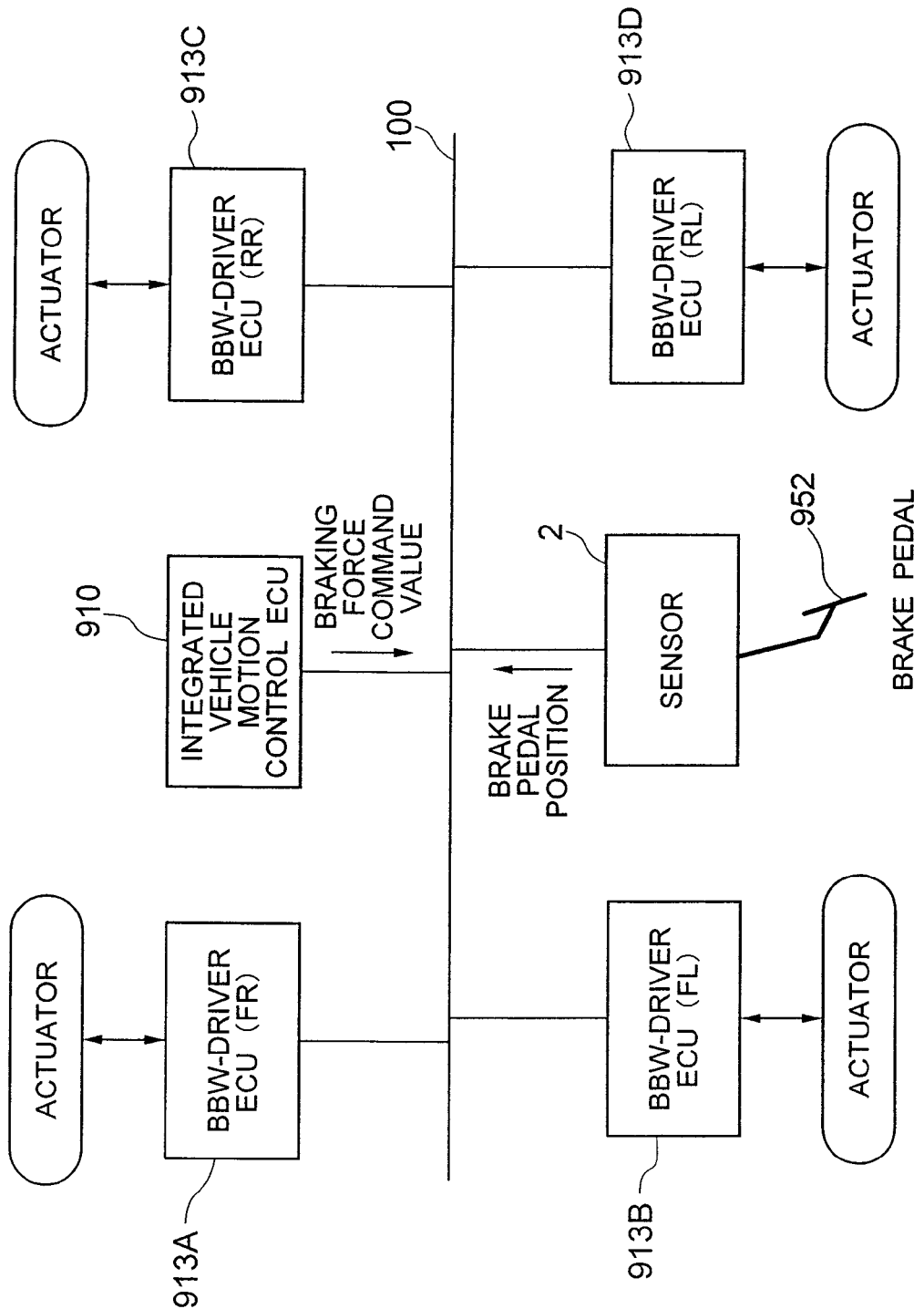
FIG. 24 is a system block diagram related to an example of a brake control system.

FIG. 24 is a simplified drawing produced by extracting nodes related to a brake control system from the system in FIG. 23. The brake control system according to this example consists of a brake pedal sensor 2 which processes a signal from the brake pedal position sensor and sends it to the network 100, with the brake pedal position sensor measuring a depression of a brake pedal 952 caused by the user; the BBW driver ECUs 913A to 913D which control the brake motors of the four wheels; and the integrated vehicle motion control ECU 910 which calculates braking force command values for the four wheels, based on the data transmitted from the brake pedal sensor 2 and signals from sensors (e.g., an acceleration sensor, yaw rate sensor, and wheel speed sensor: not shown) for detection of vehicle conditions, and sends them to the BBW driver ECUs 913A to 913D of the four wheels via the network 100.

According to this example, it is assumed that a brake pedal ECU 2 is configured to be fail-operational, meaning that it can operate even in case of one failure.

An example of how to implement the diagnostic method according to the present invention in such a control system will be described below. When applying the diagnostic method to an actual system, data exchanged among nodes includes control data D such as brake command values transmitted from the integrated vehicle motion control ECU 910 to the BBW driver ECUs 913A to 913D in addition to information Csn needed for status determination and status decisions S1 to Sn. A configuration of each node used when constructing the above system will be described with reference to FIGS. 25 to 28. Incidentally, FIGS. 25, 26, and 27 correspond to FIGS. 3, 5, and 6, respectively, and components are the same as those in the examples described earlier unless otherwise stated.

Figure 25:
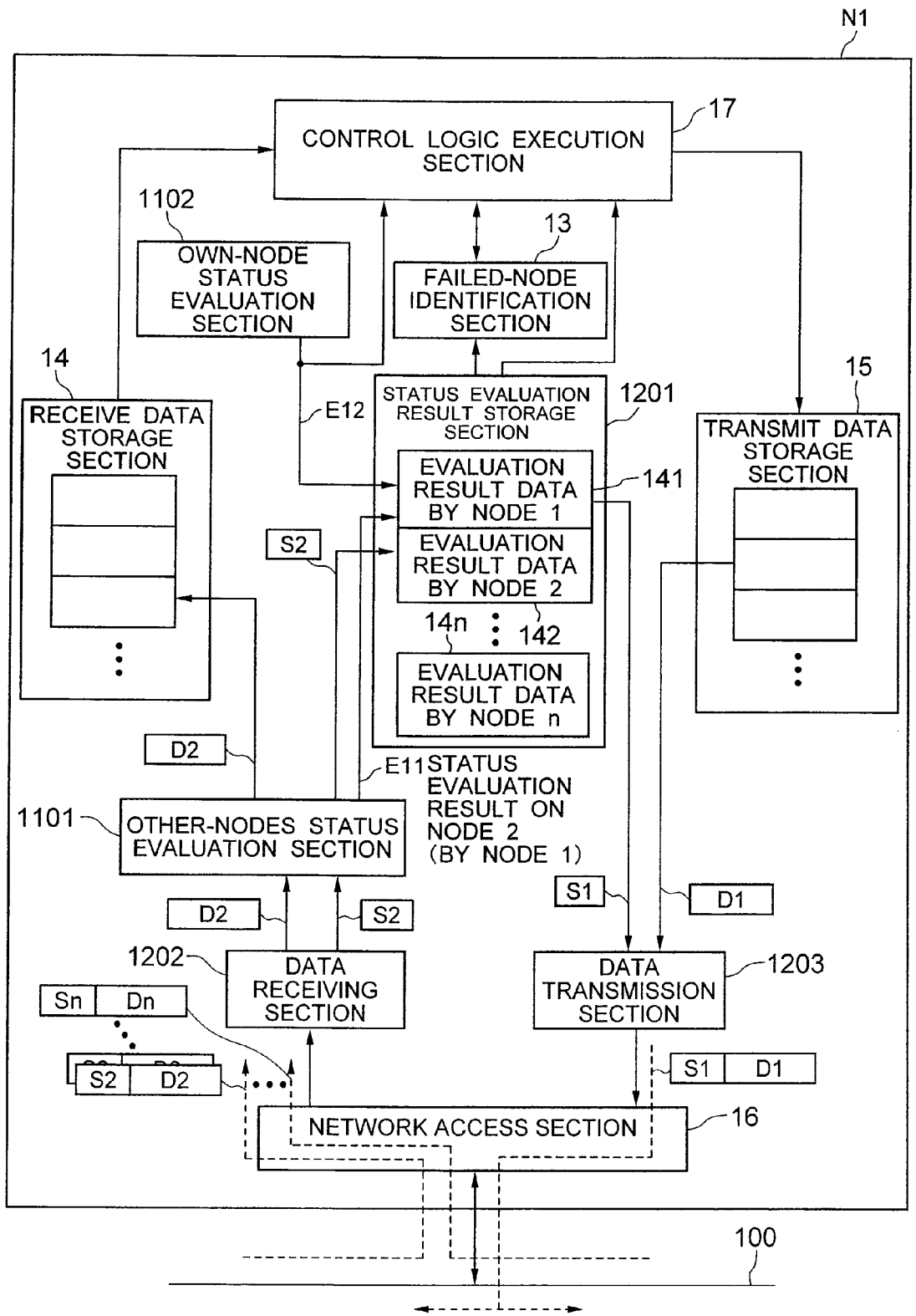
FIG. 25 is a block diagram showing an example of the basic configuration of the vehicle control system.

The basic configuration of each node is shown in FIG. 25. Although node 1 is cited as an example, the configuration is common to all the nodes in the network. According to this example, besides the configuration illustrated in FIG. 3, node 1 has a receive data storage section 14 which stores control data received from the other nodes and transmit data storage section 15 which stores control data subjected to arithmetic operations by the control logic execution section and transmitted to the other nodes.

Figure 26:
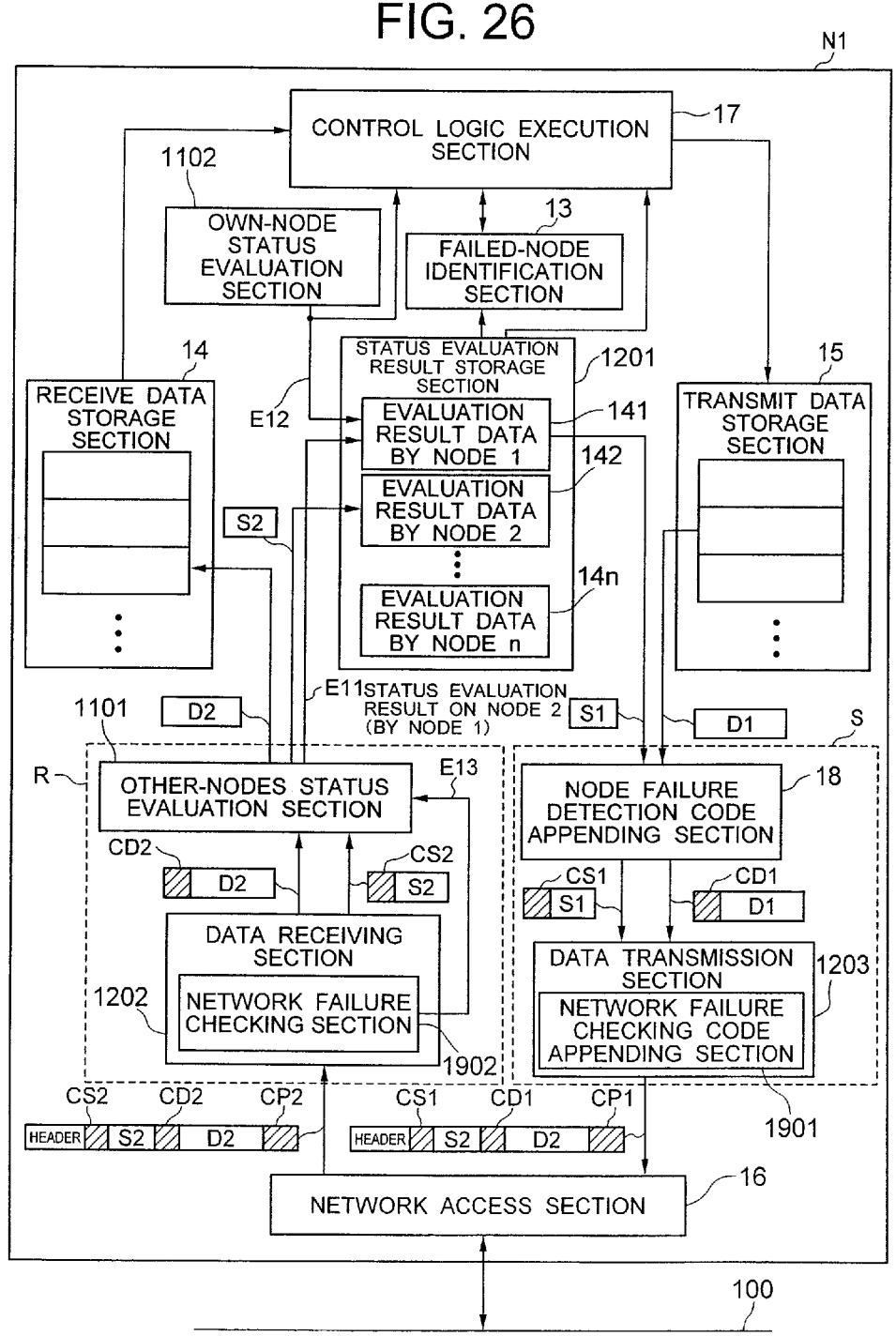
FIG. 26 is a block diagram related to an example of other-node status evaluation.

In FIG. 25, via the network access section 16, node 1 receives data transmitted, for example, by node 2. The transmit data from node 2 contains control data D2 needed for vehicle control and generated by the control logic execution section 27 of node 2 in addition to the status decisions S2 made by node 2. The reception processor 1202 separates the two sets of data and inputs them in the other-node status evaluation section 1101. The other-node status evaluation section 1101, checks the integrity of the S2 data, and thereby determines the status of node 2 as illustrated in FIG. 3 and stores the resulting decision E11 in the own node's status evaluation result storage buffer 141 of the status evaluation result storage section 1201. If there is nothing wrong with the data, the control data D2 is stored in the receive data storage section 14 and the status evaluation result S2 (self-diagnostic result+decisions about nodes 1 and 3 to n) made by node 2 are stored in the status evaluation buffer 142. Incidentally, the other-node status evaluation section 1101 may be configured to determine the status of node 2 by checking not only the status decisions S2 made by node 2, but also the integrity of the control data D2. This will make it possible to detect logical data errors not only in the data link layer, but also in the application layer although details will be described later (FIG. 26). Similarly, the other-node status evaluation section 1101 determines the status of nodes 3 to n, stores decisions E1n in the own node's status evaluation result storage buffer 141, and saves the status decisions from the other nodes in predetermined buffers 143 (not shown) to 14n. If there is nothing wrong with the status of nodes 3 to n, control data D3 to Dn from nodes 3 to n are stored in the receive data storage section 14. Incidentally, processes of the failed-node identification section 13 and own-node status determination section 1102 are the same as the examples illustrated in FIG. 3.

The control logic execution section 17 performs vehicle control calculations based on control data from the receive data storage section 14, information from the failed-node identification section 13, self-diagnostic results E12, status decisions stored in the status evaluation result storage section 1201, and the like and stores control data D1 to be transmitted to other nodes in the transmit data storage section 15. The data transmission section 1203 transmits the control data D1 generated by the control logic execution section 17 and node evaluation result S1 made by the own node as a set of data.

An example of other-node status determination will be described with reference to FIGS. 26 and 27. Components are the same as those illustrated in FIG. 5 unless otherwise stated. The node failure check code appending section 18 appends codes CD1 and CS1 to the control data D1 and own node's status decisions S1, respectively, in order for the other nodes which will receive the data to detect node-1 faults.

The data transmission section 1203 puts together the control data D1 and own node's status decisions S1 into a single set of communication data and appends a header to it and makes the network failure check code appending section 1901 append a network fault detection code CP1 for use to detect any fault occurring on the network 100 while the communication data is delivered to other nodes.

For example, when receiving communication data from node 2, the network failure checking section 1902 of the data receiving section 1202 determines, using the network fault detection code CP2 appended by the network failure check code appending section 2901 of node 2 and data part other than CP2, whether a data change such as a bit flip has not occurred on the network 100 during delivery of the communication data. The other-node status evaluation section 1101 checks node 2 for any fault using the codes CD2 and CS2 appended by the node failure check code appending section 28 of node 2 as well as data D2 and S2 and stores a resulting decision E11 and a decision E13 from the network failure checking section 1902 in a region for status of node 2 in the own node's status evaluation result buffer 141. Alternatively, the network failure checking section 1902 may store the decision by accessing the own node's status evaluation result buffer 141 directly.

Figure 27:
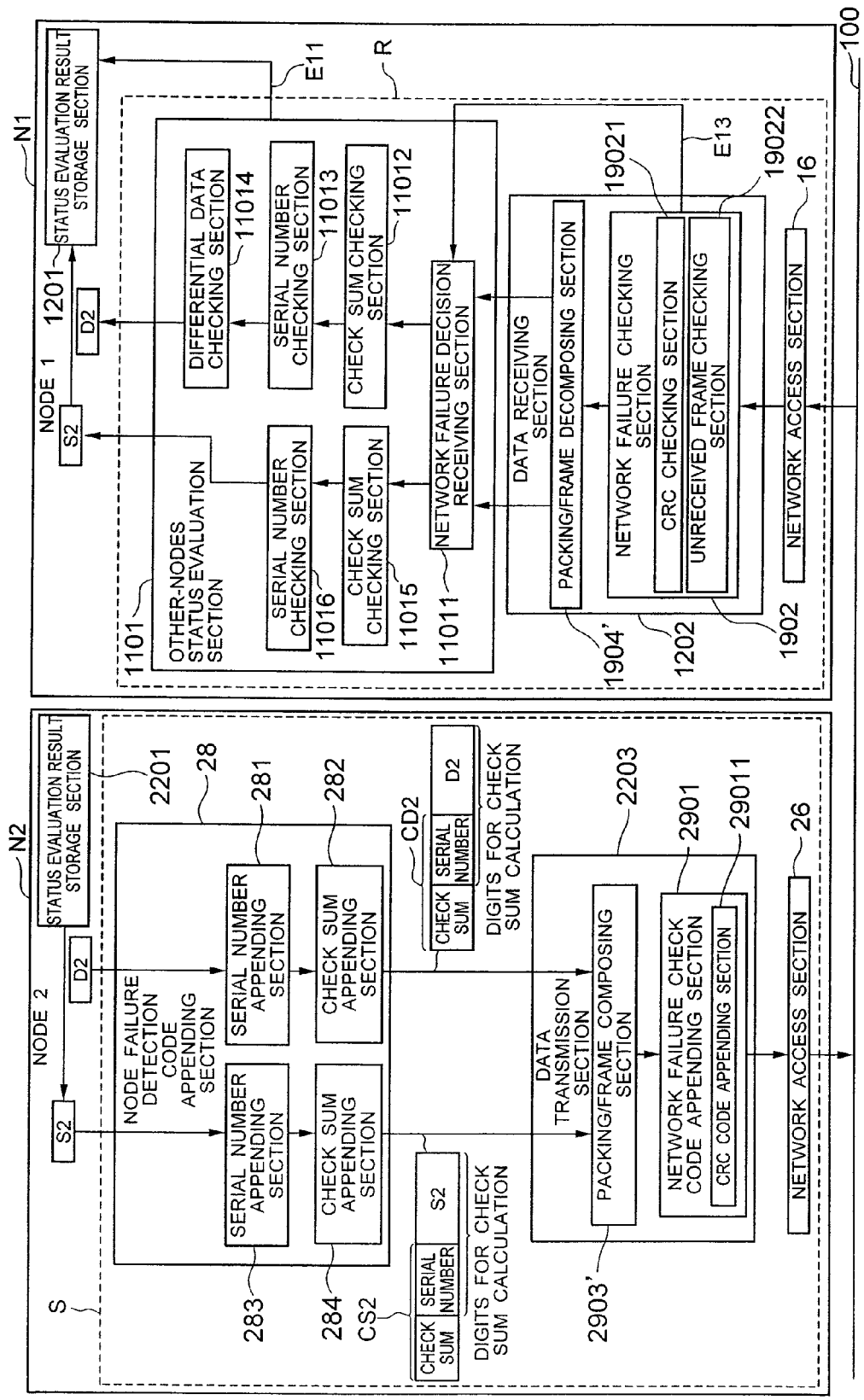
FIG. 27 is a block diagram related to an example of other-node status evaluation.

Details of the node failure check code appending section, other-node status evaluation section, data transmission section, and data receiving section are shown in FIG. 27. Components are the same as those in FIG. 6 unless otherwise stated. FIG. 27 shows an example in which node 2 transmits data with fault detection code appended and node 1 receives the data and checks for any fault. The node failure check code appending section 28 has a serial number appending section 281 for the control data D2, check sum appending section 282, serial number appending section 283 for the status decisions S2 made by node 2, and check sum appending section 284. The serial number appending sections 281 and 283 increment a serial number appended to data each time data is transmitted. The check sum appending sections 282 and 284 find a sum by totaling a serial number region and data region in bytes, bit-flip the sum, and append the resulting value as a check sum. A packing/frame processing section 2903 of the data transmission section 2203 packs D2 and S2 to which fault detection codes have been appended into a set of communication data and perform communication protocol processing such as appendage of a header. Subsequently, a known CRC (cyclic redundancy check) code is appended to check whether the communication data has not been corrupted on the network 100 due to a bit flip or the like.

Upon receiving the data from node 2, node 1 performs fault detection in the order opposite to the order in which fault detection codes are appended by node 2. In the network failure checking section 1902, an unreceived frame checking section 19022 and CRC checking section 19021 check for faults in the data link layer such as unreceived data or data corruption. Although not shown in the figure, faults at a communication protocol level such as synchronization errors and format errors are also detected by the network failure checking section 1902. If a fault is detected, the decision E13 is sent to a network fault decision receiving section 11011 of the other-node status evaluation section 1101.

On the other hand, the other-node status evaluation section 1101 checks the data D2 and S2 separated by an unpacking/frame processing section 1904' of the data receiving section 1202 by making a check sum checking section 11012, serial number checking section 11013, and differential data checking section 11014 check the integrity of the control data D2 itself and a check sum checking section 11015 and serial number checking section 11016 check S2, and thereby determines the status of node 2. The check sum checking sections 11012 and 11015 find a sum by totaling the serial number region and data region in bytes, bit-flip the sum, and check whether the resulting value agrees with the check sum appended to the data by the check sum appending section of the transmitting end. Also, the serial number checking sections 11013 and 11016 check whether the serial number appended to the current receive data is incremented from that of the previous receive data.

The differential data checking section 11014 determines whether a change between the current receive data and previous receive data is equal to or larger than a threshold set by the control logic execution section 17.

If none of the checking sections detect a fault, D2 and S2 are stored in predetermined regions of the receive data storage section 14 and status evaluation result storage section 1201, respectively. If a fault is detected, no checking is performed at levels higher than the checking section which has detected the fault. Also, data in the receive data storage section 14 and status evaluation result storage section 1201 is not updated and the control logic execution section 17 is notified to that effect.

This configuration makes it possible to transmit and receive control data needed for vehicle control while performing the diagnostic process according to the present invention. Also, it offers the same advantages as the first example described with reference to FIGS. 5 and 6. Besides, since the differential data abnormality checking section 11014 checks the integrity of the control data D itself, it is also possible to diagnose abnormalities in the application layer.

The communication cycle of the networks 100 and 100A is designed to be shorter than, or at the most equal to, a control cycle of a control system (e.g., control cycle of feedback control of brakes). If the control cycle gets longer than the communication cycle, control data Dx(i) in a communication cycle i may not be updated until the next communication cycle i+1. For example, if the control cycle is 10 times longer than the communication cycle, the control cycle is updated only once in 10 communication cycles.

An available transmission method which can deal with such a situation involves appending the control data Dx in all communication cycles without exception regardless of whether the control data Dx is updated in each communication cycle. For example, if the control cycle is 10 times longer than the communication cycle, the control data Dx appended remains uniform in communication cycles 0 to 9 unless a fault occurs in midstream, and is updated for the first time in communication cycle 10. This method simplifies a transmission process in each node, in which there is no need to consider whether the control data has been updated. This feature is especially useful when control cycles differ among control systems such as brake control and steering control systems because it can disregard the existence of multiple control cycles.

Another method for transmitting control data x when the control cycle is longer than the communication cycle involves appending the control data Dx only in communication cycles in which the control data Dx is updated and transmitting only status decisions Sx in communication cycles in which the control data Dx is not updated. This method can reduce the amount of data to be communicated, and thus implement an inexpensive system by keeping the traffic volumes of the networks 100 and 100A lower than can the first method.

Figure 28A:
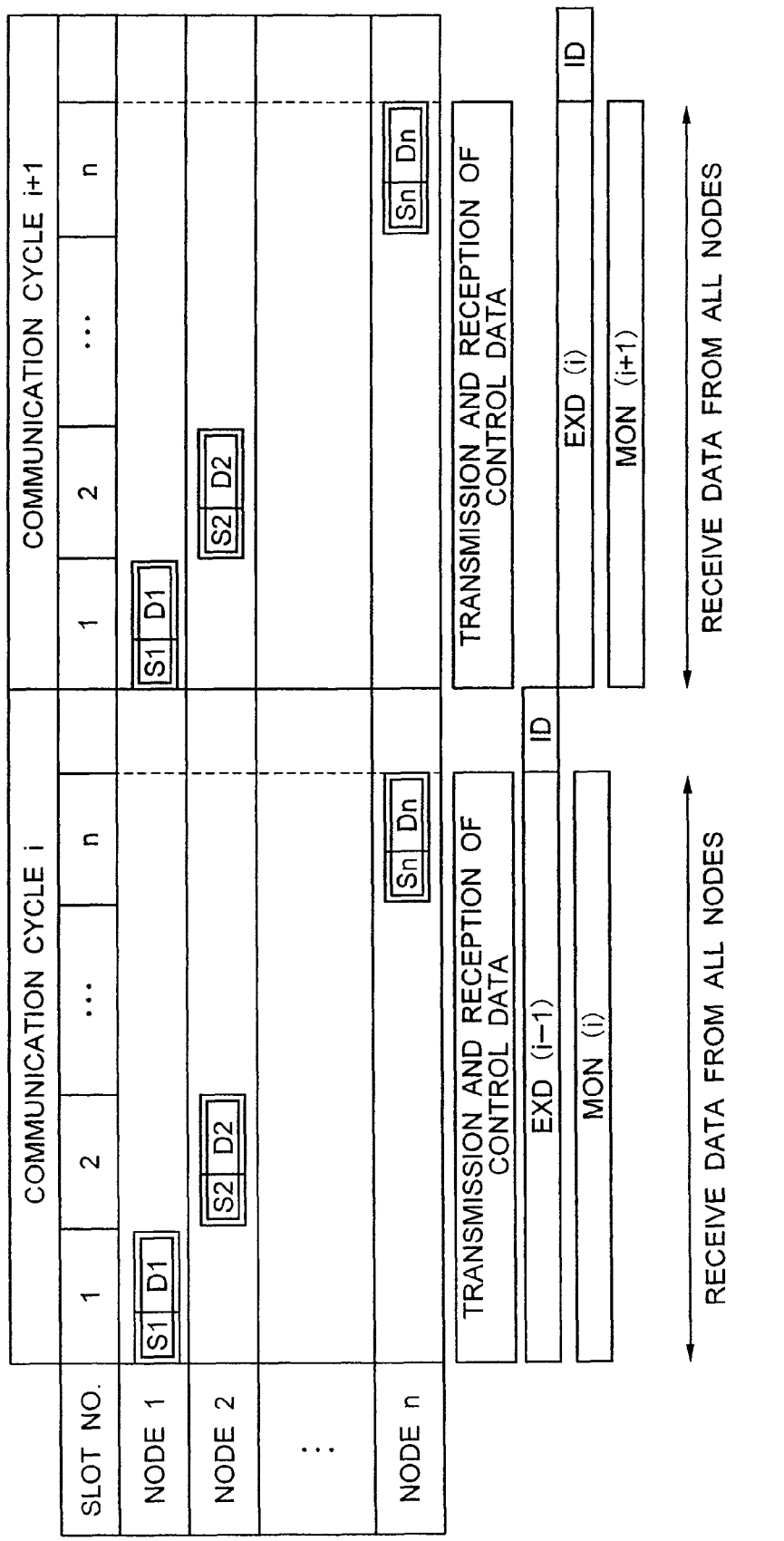
FIGS. 28A and 28B are timing charts illustrating transmission/reception timings of control data and node evaluation result.

Although it has been assumed in the above examples that the control data Dx and status decisions Sx are transmitted/received as a single unit (in the same slot) as shown in FIG. 28A (in FIGS. 28A and 28B, double lines are drawn around transmit data), the control data Dx and status decisions Sx may be transmitted/received in separate slots.

Figure 28B:
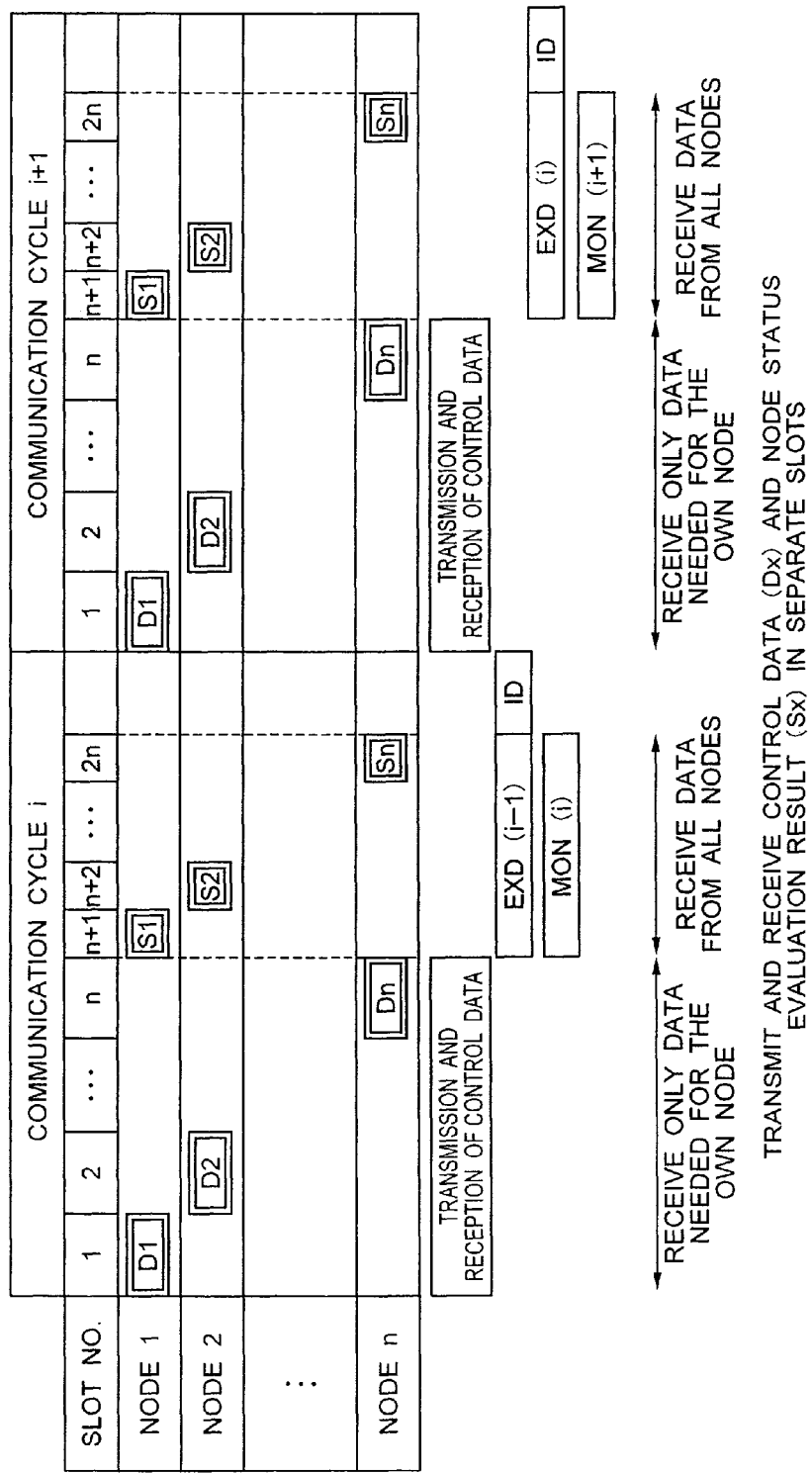

In FIG. 28B, the control data Dx is transmitted and received in the first half of each communication cycle and the status decisions Sx are transmitted and received in the second half of each communication cycle. Consequently, in FIG. 28B, only data needed for control performed in the own node have to be received in a control data transmitting/receiving phase in the first half of each communication cycle whereas in FIG. 28A, the transmit data from all nodes must be received during the entire period of each communication cycle. In this case, in the configuration shown in FIG. 26, the transmission/reception of the status decisions Sx and transmission/reception of the control data Dx are performed separately.

Next, an example in which the present invention is applied to the brake control system shown in FIG. 24 will be described with reference to FIG. 29.

Figure 29:
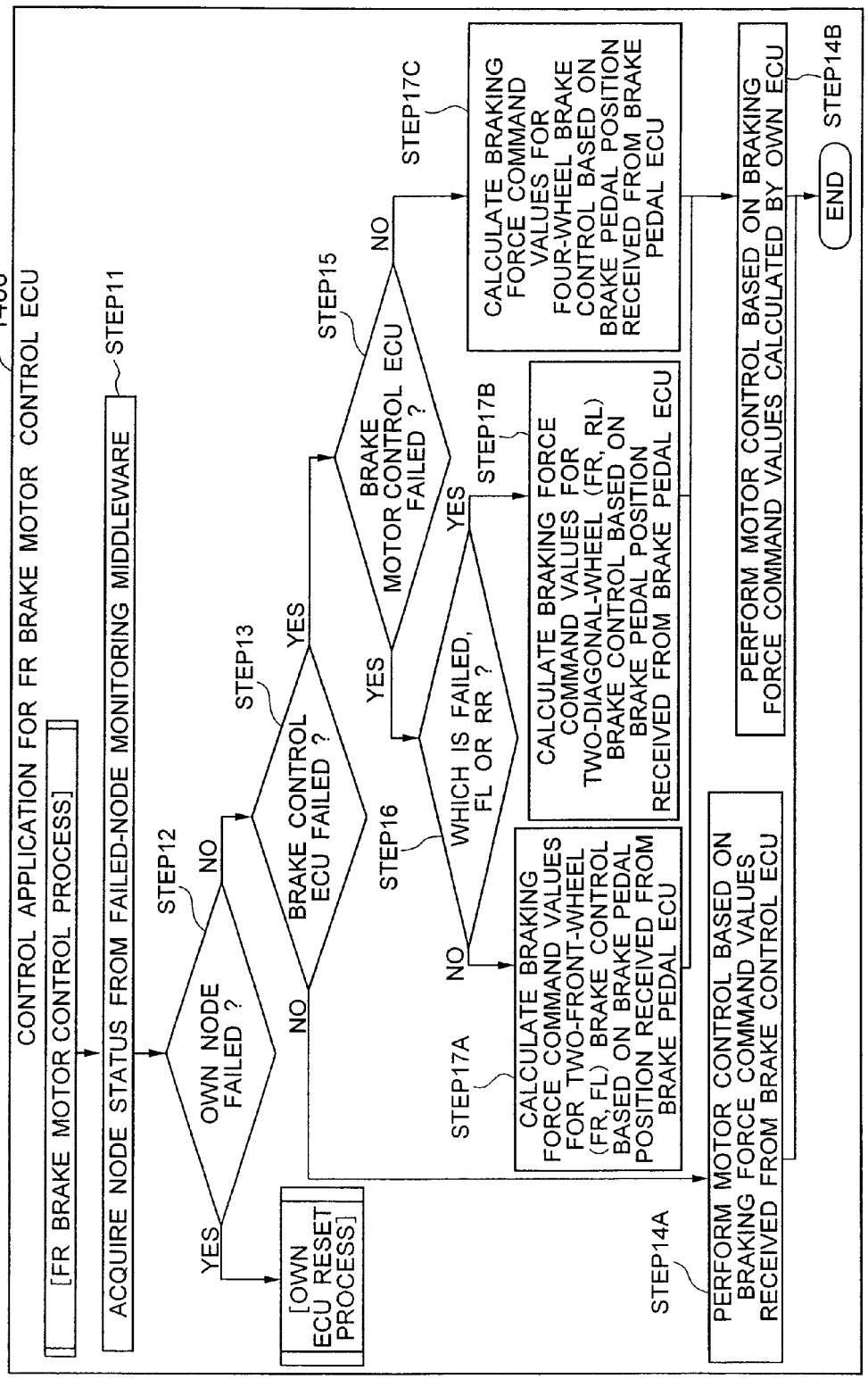
FIG. 29 is a process flowchart of a control application for a right front wheel brake motor control ECU.

An example of a FR brake motor control process performed by the control application 1400 for a right front wheel (FR) brake motor control ECU 3 is shown in FIG. 29. The FR brake motor control process begins with acquiring status information about remote ECUs relevant to the control performed by the local ECU from the failed-node monitoring middleware 1500 in Step 11. Next, in Step 12, the local ECU determines by self-diagnosis whether it is failed. If the local ECU is failed, it resets itself. If the local ECU controls sensors and actuators, it diagnoses their status in addition to the self-diagnosis. If there is something wrong with any sensor or actuator, the local ECU stops supplying power to it or takes other appropriate measures.

If the local ECU is normal, it checks a brake control ECU 1 for any fault in Step 13 based on the status information about remote ECUs acquired in Step 11. If the brake control ECU 1 is normal, the local ECU performs regular control—motor control based on braking force command values received from the brake control ECU—in Step 14A. If the brake control ECU 1 is failed, the local ECU checks in Step 15 whether any of brake motor control ECUs is failed. If there is nothing wrong with any brake motor control ECU, the local ECU goes to Step 17C to calculate braking force command values for four-wheel brake control based on the brake pedal position received from the brake pedal ECU 2. If any of the brake motor control ECUs is failed, the local ECU locates a faulty spot in Step 16. If the fault is located in the brake motor control ECU of the left front wheel or right rear wheel, the local ECU goes to Step 17B to calculate braking force command values for two-diagonal-wheel brake control using the right front wheel and left rear wheel, based on the brake pedal position received from the brake pedal ECU 2. If the fault is located in the brake motor control ECU of the left rear wheel, the local ECU goes to Step 17A to calculate braking force command values for two-front-wheel brake control using the right front wheel and left front wheel, based on the brake pedal position received from the brake pedal ECU 2. After calculating the braking force command values by itself in Step 17A, Step 17B, or Step 17C, the local ECU goes to Step 14B for motor control based on the command values.

In this way, according to this example, since the control application can identify any faulty ECU accurately using the API provided by the failed-node monitoring middleware, it can switch control according to the faulty spot.

Example 3

Another example of the present invention will be described below.

According to the first example, status decisions are received from all the nodes in the network and all the nodes are placed under fault monitoring for identification of failed nodes. However, increases in the number of nodes are expected to lead to increased reception in each node and amounts of computation by the failed-node identification algorithm execution section 131. Thus, these processes, when performed by software, will result in an increased CPU processing load.

To solve this problem, according to this example, nodes in a network are divided into a number of mutually monitoring groups and nodes are monitored mutually within each group. This can reduce the amounts of computation in each node. Details of this example will be described below.

Figure 30:
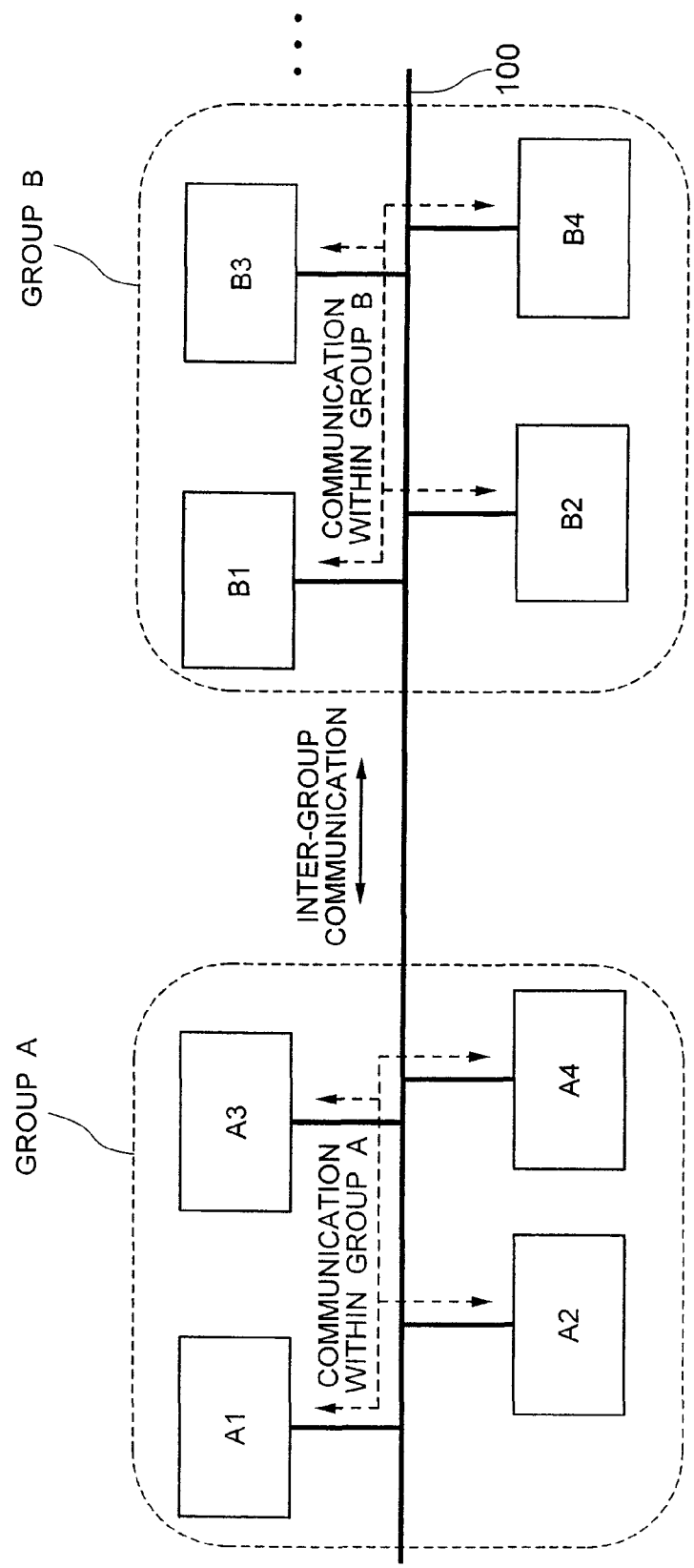
FIG. 30 is a diagram showing an example in which nodes connected to a network are divided into groups of four.

As shown in FIG. 30, according to this example, the nodes connected to the network 100 are divided into mutually monitoring groups of four such as group A, group B, and so on. Through intra-group communication within each group, node evaluation result are exchanged among the nodes and any failed node is identified as in the case of the first example. Through inter-group communication, any failed node identified by mutual monitoring within each group is reported to other groups. In both intra-group communication and inter-group communication, control data is exchanged together with information about node status.

Figure 31:
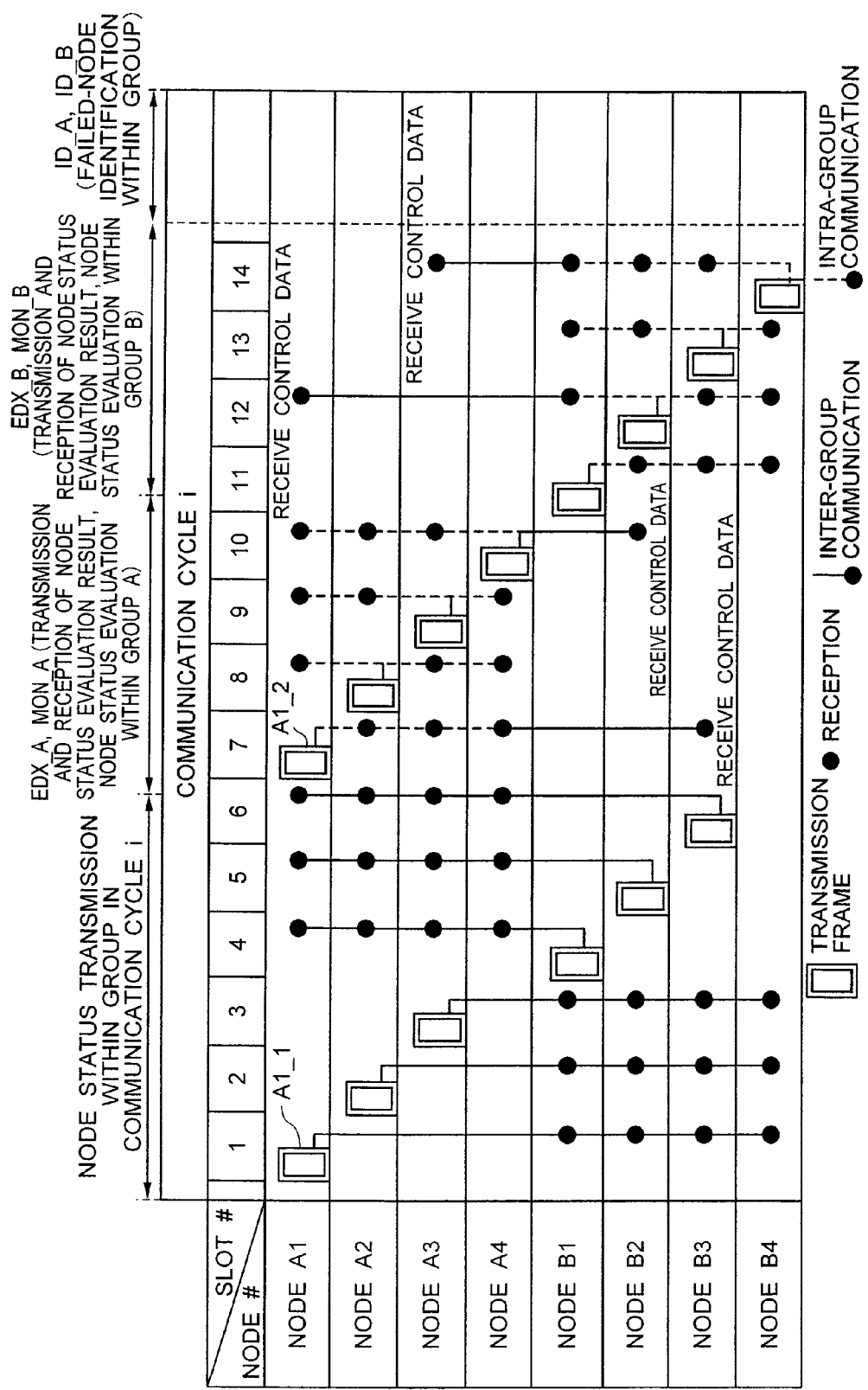
FIG. 31 is a diagram showing an embodiment of data transmission and reception among nodes in one communication cycle when the nodes are divided into two mutually monitoring groups.

FIG. 31 shows an embodiment of data transmission and reception among nodes in one communication cycle when a system of eight nodes in total is divided into mutually monitoring groups of four nodes—group A and group B. Group A consists of nodes A1 to A4 while group B consists of nodes B1 to B4. The black circles in the figure indicate receiving nodes of each frame transmitted by each node. As in the case of FIG. 30, the dotted lines indicate intra-group communication and solid lines indicate inter-group communication.

Figure 32:
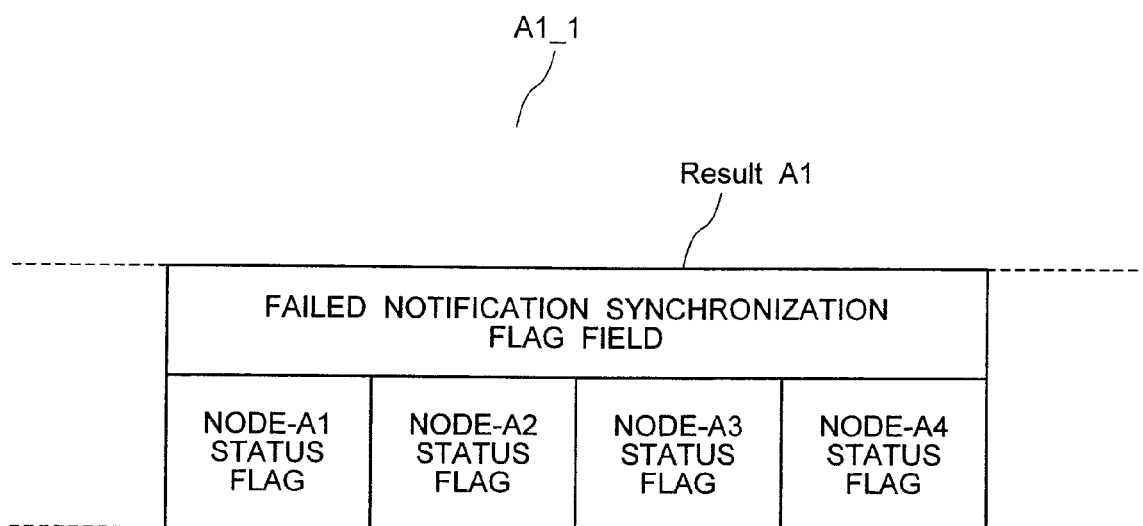
FIG. 32 is a diagram showing a configuration example of a transmit frame A1_1 from node A1 in an intra-group node status exchange phase in the previous communication cycle.

In communication slots 1 to 6, node status (the presence or absence of faults) obtained by intra-group mutual monitoring in the previous communication cycle is exchanged between group A and group B. A frame exchanged in this phase is illustrated in FIG. 32 by taking transmit frame A1_1 from node A1 as an example. To keep the nodes in the remote group as well as the control logic execution section of the own node from managing the status of nodes in the local group, frame A1_1 has a node failure flag field ResultA1 for use to transmit information stored in the node failure flag storage section 135 to the control logic execution section 17 shown in FIG. 10. The node failure flag field ResultA1 indicates the presence or absence of each type of fault in all the nodes in group A.

In this phase three nodes transmit the same data both in group A and group B as shown in FIG. 31. This is intended to provide for situations in which a fault occurs in one node disabling the node to transmit a frame or in which transmit data contains an error, so that information from the remaining two nodes in good order can be used. Incidentally, in FIG. 31 all the nodes receive node status data on the remote group, but this is not necessary if node status in the remote group does not affect control logic executed in the own node.

In communication slots 7 to 10, the nodes in group A transmit, in turns, node status data on the group-A nodes, together with control data if necessary. Also, they determine node status by monitoring the frames. Frame A1_2 transmitted by node A1 in slot 7 consists of node evaluation result SA1 about the nodes in group A, fault notification synchronization flag field SyncA1, and control data DA1 as shown in FIG. 33. A detailed configuration and generation method of the node evaluation result and fault notification synchronization flag field are the same as in the first example. In slots 7 and 10, nodes B3 and B2 receive transmit frames from nodes A1 and A4, respectively, and they extract and use only the control data, but not the node evaluation result of the group-A nodes.

Similarly, in communication slots 11 to 14, the nodes in group B exchange node status data and determine node status among themselves. In slots 12 and 14, nodes A1 and A3 receive control data from nodes B2 and B4, respectively.

After exchanging node evaluation result within each group, each group identifies any failed node within the group based on the exchanged information. According to this example, the number of nodes to be monitored are three, and these nodes can be checked for any fault by a majority vote based on the node evaluation result made by four nodes. Thus, this can reduce the amounts of computation in each node greatly compared to the first example in which the status of all the nodes in the network is monitored using the node evaluation result made by all the nodes. Incidentally, control mode is switched in each node when intra-group node status in the previous communication cycle is exchanged between the groups in the first half of a communication cycle i.e., at the end of communication slot 6 in FIG. 31 after the failure counter of a node in the local group reaches the limit value or after a node failure flag field is received from a node in the remote group indicating that a fault has occurred in a node in the group.

Figure 34:
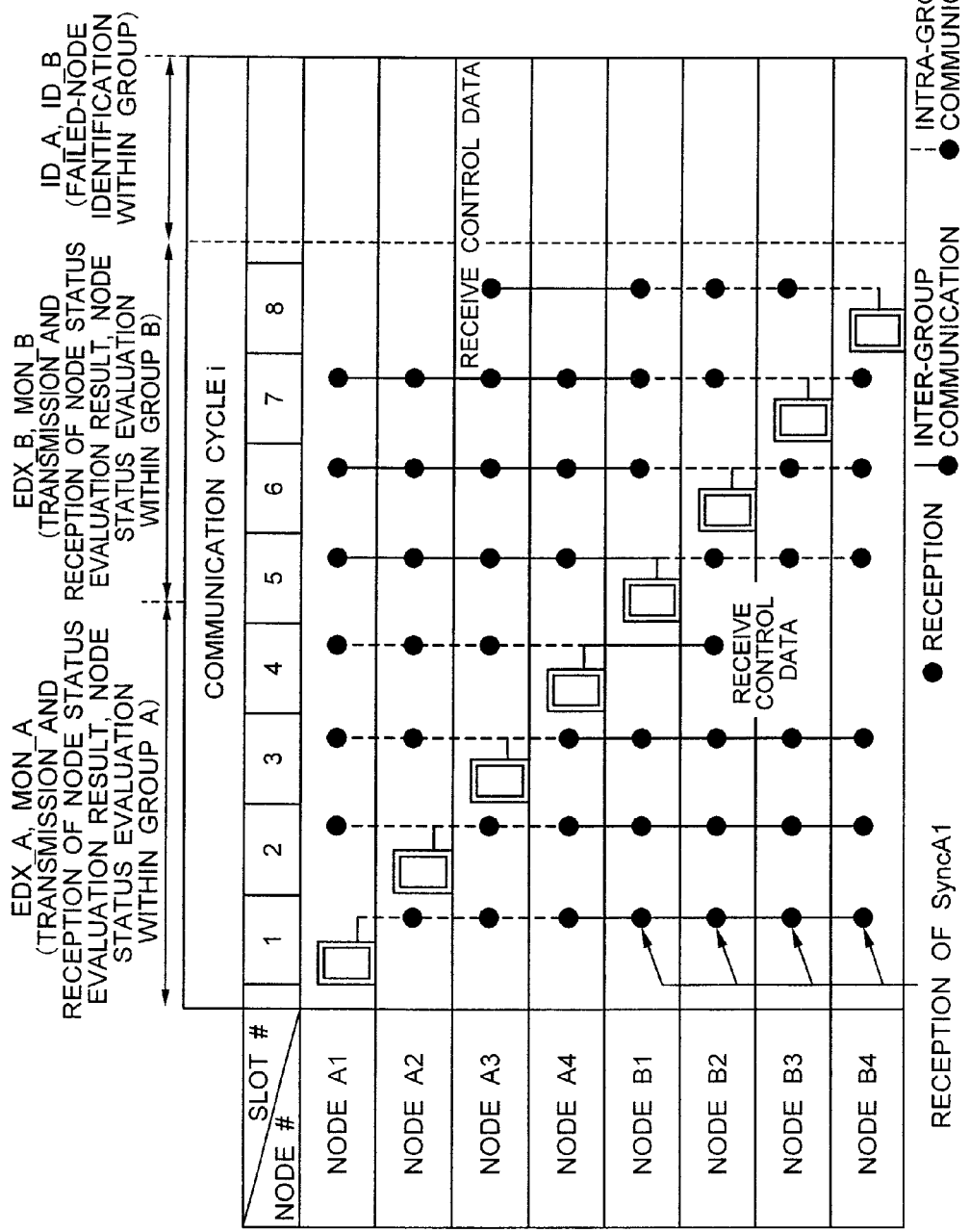
FIG. 34 is a diagram showing an embodiment of data transmission and reception among nodes in one communication cycle when fault notification synchronization flag fields are received from nodes in another group.

FIG. 34 shows an example in which fault notification synchronization flag fields Sync are received from the nodes in the remote group, thereby eliminating the intra-group node status exchange in the first half of the communication cycle shown in FIG. 31. In communication slots 1 to 3, the group-B nodes extract SyncAx (x=1, 2, 3) from frames transmitted from nodes A1 and A3. Similarly, the group-A nodes extract SyncBx from frames transmitted from nodes B1 and B3. As described above, in the communication cycle in which the failure counter reaches the limit value, since the bit of the appropriate fault factor for the appropriate node is set to 1 in the fault notification synchronization flag field Sync, the node status in the local group can be reported to the nodes in the remote group using this bit. However, a reversible failure counter should be used because the node may recover from the fault within the communication cycle and consequently the failure counter may not reach the limit value, i.e., the control mode may not be switched. In that case, for example, only if the same bit in the fault notification synchronization flag field SyncBx transmitted by the group-B nodes is set to 1 in two consecutive communication cycles, the group-A nodes can determine that the failure counter of the group-B node corresponding to the bit has reached the limit value. This example can reduce communication slots by six compared to the example shown in FIG. 31, and thereby reduce communication zones of inter-group communication for node status notification.

Example 4

In the above examples, all the nodes on the network identifies (ID process) any failed node among all the other nodes on the network or all the other nodes in the group based on their own status decisions.

In addition to this highly reliable technique, it is also possible to share the ID process with the other nodes on the network or the other nodes in the group to further reduce the CPU processing load. Specifically, in a group of n nodes (including a case in which all the nodes in a network belongs to a single group), one node performs the ID process of only m nodes (n>m>1) and transmits results to the other nodes and receives ID results of the remaining nodes from the other nodes. Hereinafter this technique is referred to as a "decision broadcasting method." Incidentally, this method become the same as the above example when m=n.

Figure 35:
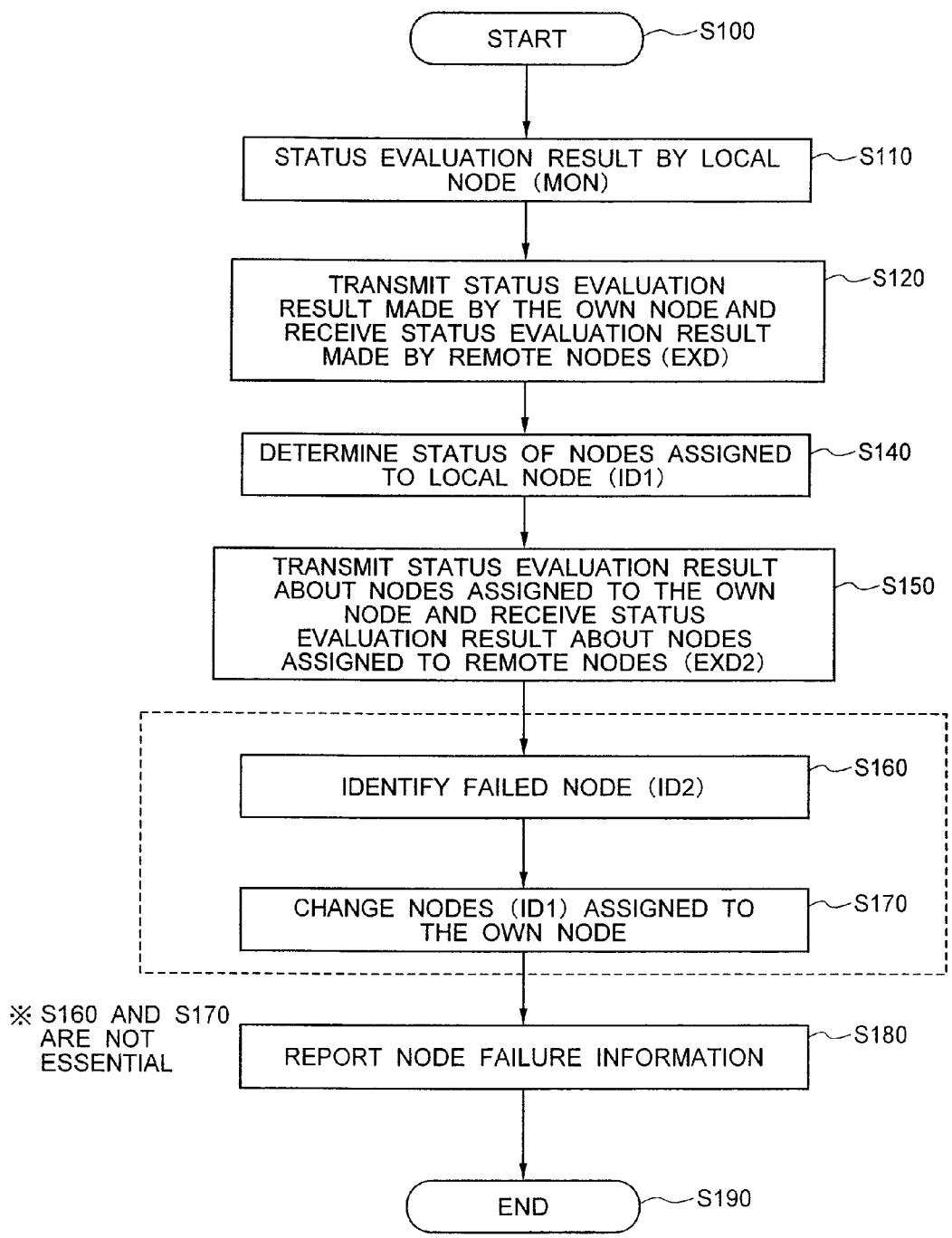
FIG. 35 is a flowchart of a node status monitoring process in a decision broadcasting method.

FIG. 35 is a flowchart showing how to implement a node status (failed-node) monitoring function by the decision broadcasting method. The processes of the flowchart are performed by each node.

In Step S100, processing is started. In Step S110, each node determines node status independently. This process is the same as the MON process according to the first example. In Step S120, the decisions made in Step S110 are transmitted (broadcasted) to the other nodes in the group. Also, each node receives node evaluation result made by the other nodes. The process in Step S120 is the same as the EXD process according to the above example.

In Step S140, based on the status decisions (MON results) made by itself and other nodes in Step S120, each node establishes the presence or absence of each type of fault on a node by node basis only regarding the m nodes in the group assigned to the own node. The process in Step S140 is designated as ID1, which differs from ID according to the above example in that the nodes checked by the own node is limited to m nodes.

In Step S150, the status decisions about m nodes made in Step S140 are exchanged with the other nodes. The process in Step S150 is designated as EXD2. In Step S160, based on the status decisions (ID1 results) made by the local and other nodes in Step S150, each node establishes the presence or absence of each type of fault on a node by node basis. The process in Step S160 is designated as ID2. When m=1, there is no particular need to perform this process, but when m≧2, a single result must be produced from multiple ID1 results by a majority decision or prioritization.

In Step S170, the nodes monitored in ID1 are changed. In Step S180, node fault information is reported as in the above example. In Step S190, the processing is finished.

By repeating Steps S100 to S190, node status monitoring is continued. This example reduces the processing load of the CPU and communication controller compared to the above examples because each node need to receive status decisions (MON results) from only m nodes assigned to it (status decisions made by nodes other than the assigned nodes do not have to be received from the beginning or may be discarded without processing after reception) and make status decisions (ID1 results) about only m nodes. This makes it possible to reduce manufacturing costs of ECUs and spare other processes part of CPU capacity.

Each node is assigned m nodes so that all the nodes in the group will be checked in ID1. In Step S170, the nodes assigned to each node for ID1 are changed each time or periodically, so that even if a fault occurs in a node making it impossible to perform all or part of Steps S100 to S190, it will be possible to prevent a situation in which ID1 of a specific node would never be performed and consequently no status decision would be transmitted (EXD2). Step S170 is important in maintaining reliability of the node status monitoring function although it is not essential. Incidentally, the failed-node identification algorithm in the above example corresponds to ID1+EXD2+ID2.

Figure 36:
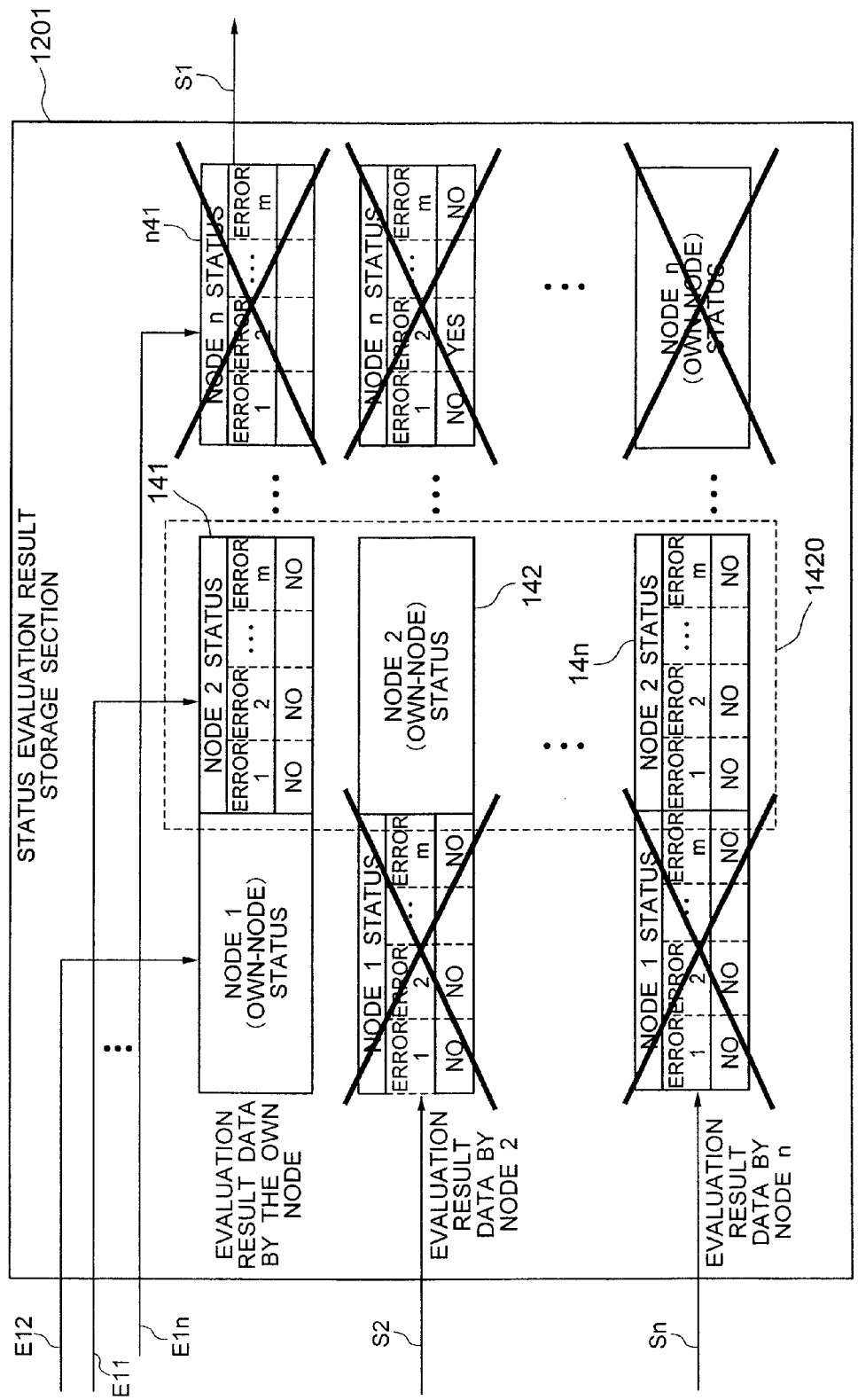
FIG. 36 is a diagram showing a configuration example of a node status monitoring function according to the decision broadcasting method.
Figure 37:
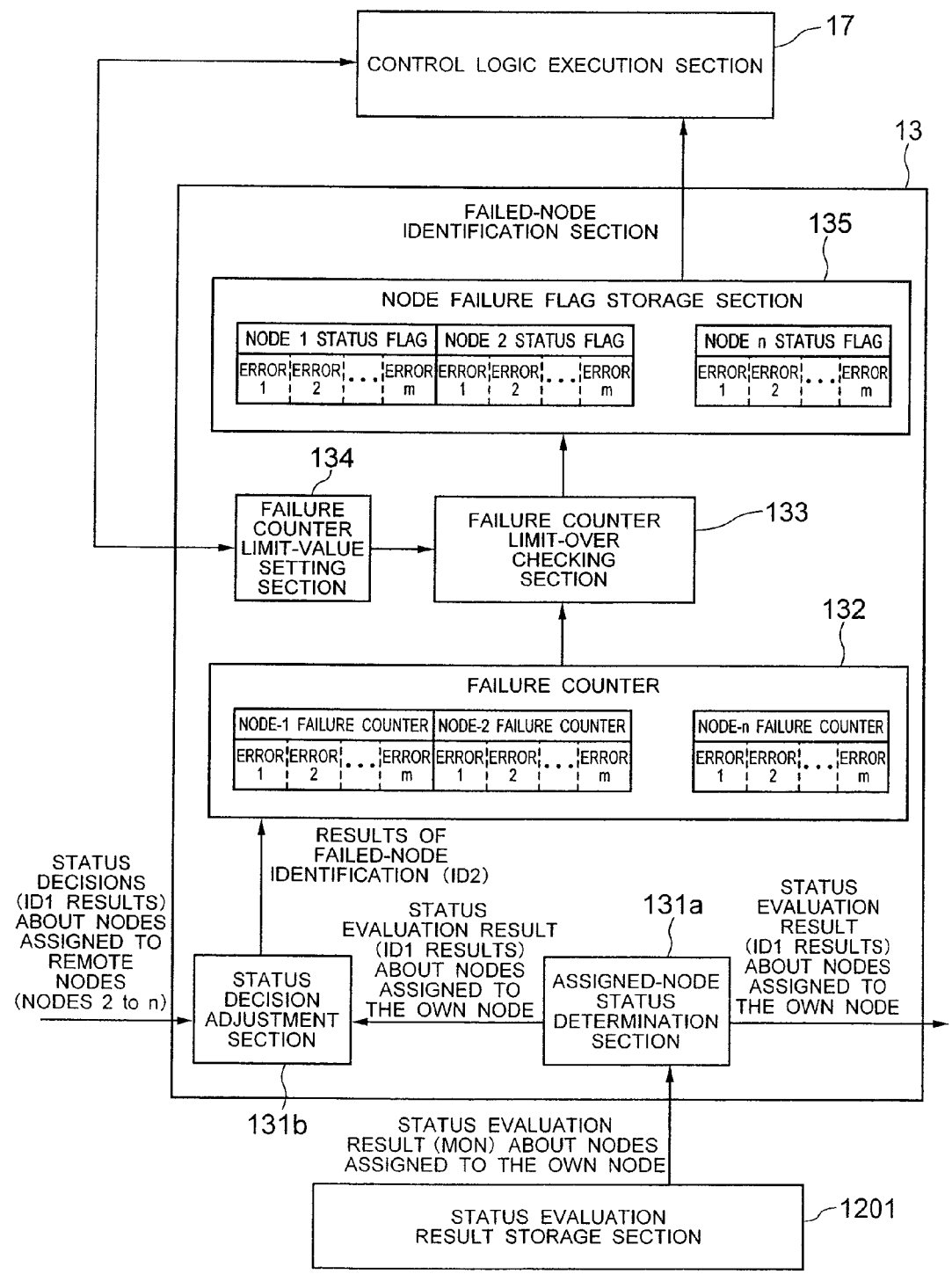
FIG. 37 is a diagram showing a configuration example of a node status monitoring function according to the decision broadcasting method.

FIGS. 36 and 37 show a status evaluation result storage section and failed-node identification section based on the decision broadcasting method. For simplicity of explanation, node 1 will be cited as an example. It is assumed that m=1. In this example, node 1 monitors node 2 in ID1.

In FIG. 36, the region in which status decisions (MON results) are stored is limited compared to the one in FIG. 4. The only region is a status evaluation result storage section 1420 for an assigned node, i.e., a buffer for status decisions about node 2. Status decisions about nodes other than node 2 are either rejected, or discarded even if received.

In FIG. 37, an assigned-node status determination section 131a makes a status determination (ID1) about node 2 based on data in the assigned-node status evaluation result storage section 1420. The result of ID1 is sent to a status decision adjustment section 131b as well as to the other nodes (EXD2).

The status decision adjustment section 131b identifies any failed node (ID2) based on the status decisions (ID1 results) made by the own node and status decisions (ID1 results) received (EXD2) from the other nodes (nodes 2 to n). The nodes about which status determinations (ID1) are made by the other nodes are node 1 and nodes 3 to n. When the number m of nodes for status determination is equal to or larger than 2, the status decision adjustment section 131b consolidates the status decisions (ID1 results) into a single status decision by a majority decision or prioritization. When m=1 as in this example, the ID1 result is used directly as an ID2 result. Regarding the status of the own node (node 1), status decisions are consolidated into a single status decision by giving priority to the own node's status decision over the status decisions (ID1 results) made by the other nodes.

The status decision adjustment section 131b increments the value of the failure counter 132 related to the failed node and fault type confirmed according to the ID2 results.

This example (FIG. 36) can reduce required buffer capacity compared to the first example (FIG. 4), and thereby reduce manufacturing costs of ECUs.

Figure 38:
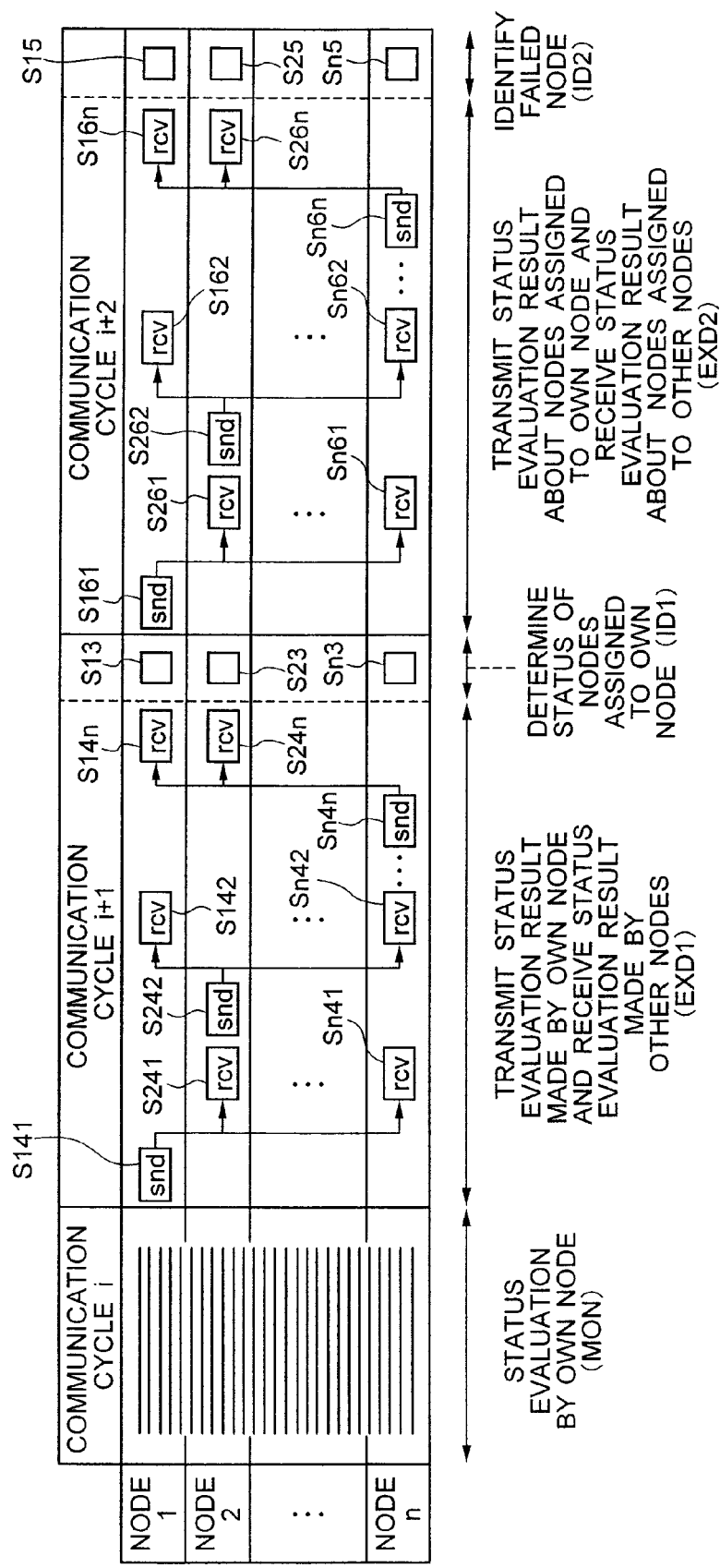
FIG. 38 is a timing chart of node status monitoring (uni-processing) according to the decision broadcasting method.

FIG. 38 shows an example of a communication schedule according to the decision broadcasting method. Each node makes status determinations (MON) in a communication cycle i. In the next communication cycle i+1, all the nodes exchange the status determinations (EXD) they made. Also, each node makes status determinations (ID1) about the nodes assigned to it. In the next communication cycle i+2, the nodes exchange the status decisions about the assigned nodes (EXD2). Also, any failed node is identified (ID2). These processes are repeated subsequently.

In this way, the decision broadcasting method requires three communication cycles to make one failed-node identification, one cycle more than in the above examples which require two communication cycles. However, this example reduces the CPU processing load, making it possible to reduce the duration of each cycle compared to the above examples or increase the number of steps in each cycle compared to FIG. 38 (e.g., perform all EXD, ID1, EXD2, and ID2 by the (i+1)th cycle), and thus it does not necessarily take more time to identify a failed node than do the above examples.

Figure 39:
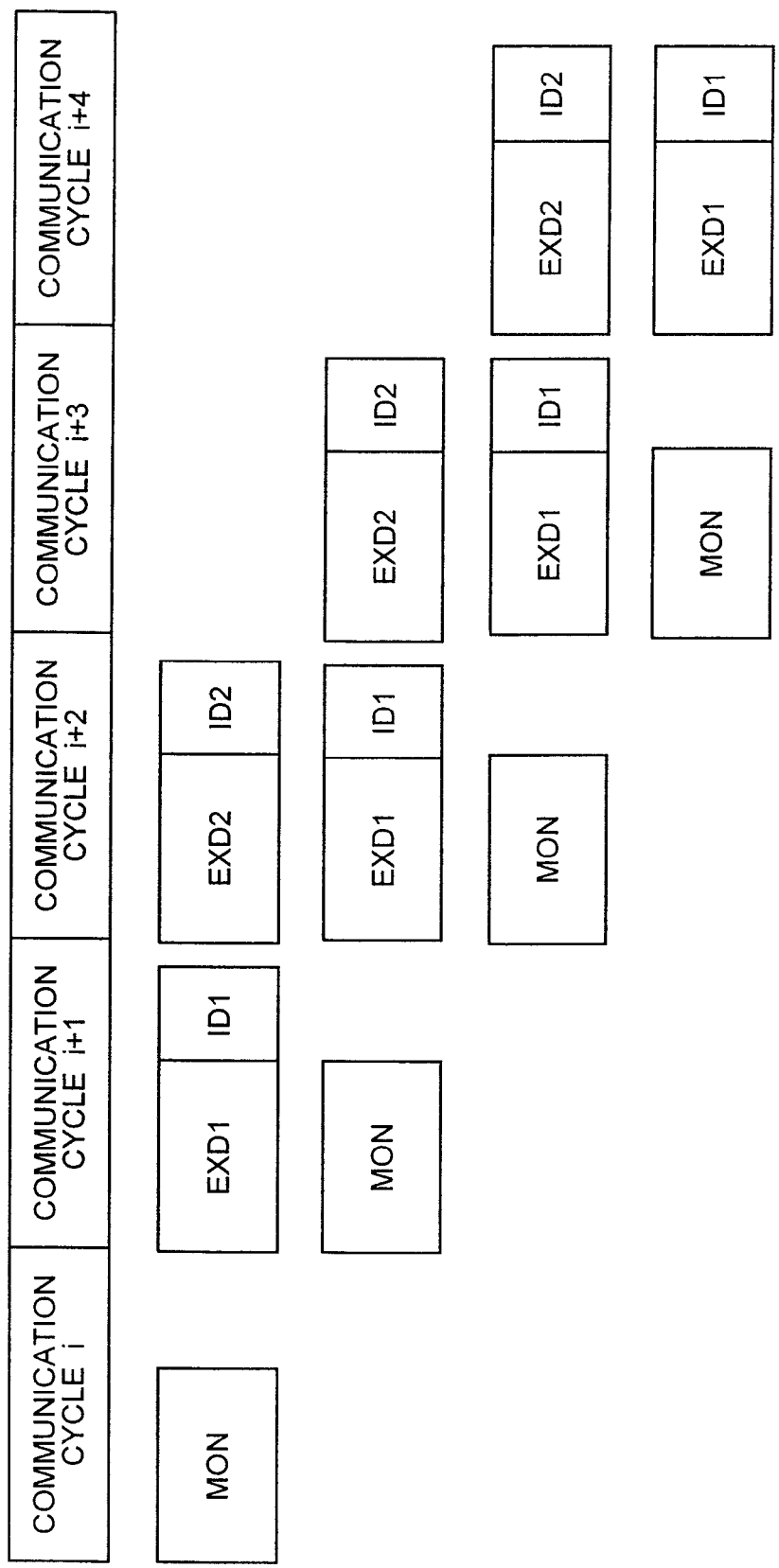
FIG. 39 is a timing chart of node status monitoring (concurrent processing) according to the decision broadcasting method.

When repeating Steps S100 to S190, the processes may be performed concurrently. In FIG. 39, an MON process is performed in communication cycle i, and in the next communication cycle i+1, EXD and ID1 processes are performed on the MON results and an MON process is performed newly. In communication cycle i+2, the ID1 results produced in communication cycle i+1 are subjected to EXD and ID1 processes, the MON results produced in communication cycle i+1 are subjected to EXD and ID1 processes, and an MON process is performed newly. By repeating the above processes, it is possible to identify a failed node in each communication cycle.

FIG. 40 shows an example of changed schedule of assigned nodes in ID1 of each node. That is, the schedule indicates the nodes whose status each node should determine in ID1 in each communication cycle and whose status decisions each node should transmit to the other nodes in the next communication cycle. This corresponds to the process in Step S170.

A schedule 2000 assumes that m=1. Node 1 is assigned to determine the status of node 2 in communication cycle i, node 3 in communication cycle i+1, and node n in communication cycle i+n−1. Coming full circle, it returns to node 2 in communication cycle i+n to repeat the rotation. Subject nodes are assigned to nodes 2 to n in such a way that the status of all the nodes will be determined in a communication cycle. Node 2 is assigned to monitor node 3 in communication cycle i, node 4 in communication cycle i+1, and node 1 in communication cycle i+n−1. Node n is assigned to monitor node 1 in communication cycle i, node 2 in communication cycle i+1, and node n−1 in communication cycle i+n−1. Consequently, even if each node monitors a single node in ID1, it is possible to check all the nodes for a fault in every communication cycle.

A schedule 2010 assumes that m=2. If all the nodes are scheduled to be always subjected to status determination (ID1) by two nodes (m=2), even if a fault occurs in a node in the group, making it impossible to perform all or part of Steps S100 to S190, no node will remain unchecked. The schedule 2010 is designed for this purpose. As ID1 subject nodes, node 1 checks nodes 2 and 3 in communication cycle i, nodes 3 and 4 in communication cycle i+1, nodes n and 2 in communication cycle i+n−1. Coming full circle, it returns to nodes 2 and 3 in communication cycle i+n to repeat the rotation. Node 2 checks nodes 3 and 4 in communication cycle i, nodes 4 and 5 in communication cycle i+1, nodes 1 and 3 in communication cycle i+n−1. Node n checks nodes 1 and 2 in communication cycle i, nodes 2 and 3 in communication cycle i+1, nodes n−1 and 1 in communication cycle i+n−1.

The schedules 2000 and 2010 may be retained as tables in a memory or other storage device. Schedules with such regularity can be calculated using a simple mathematical expression. In that case, for example, the node number of a node monitored by node 1 in the schedule 2000 can be determined by adding 1 to the remainder left after the given communication cycle is divided by n−1.

Figure 41:
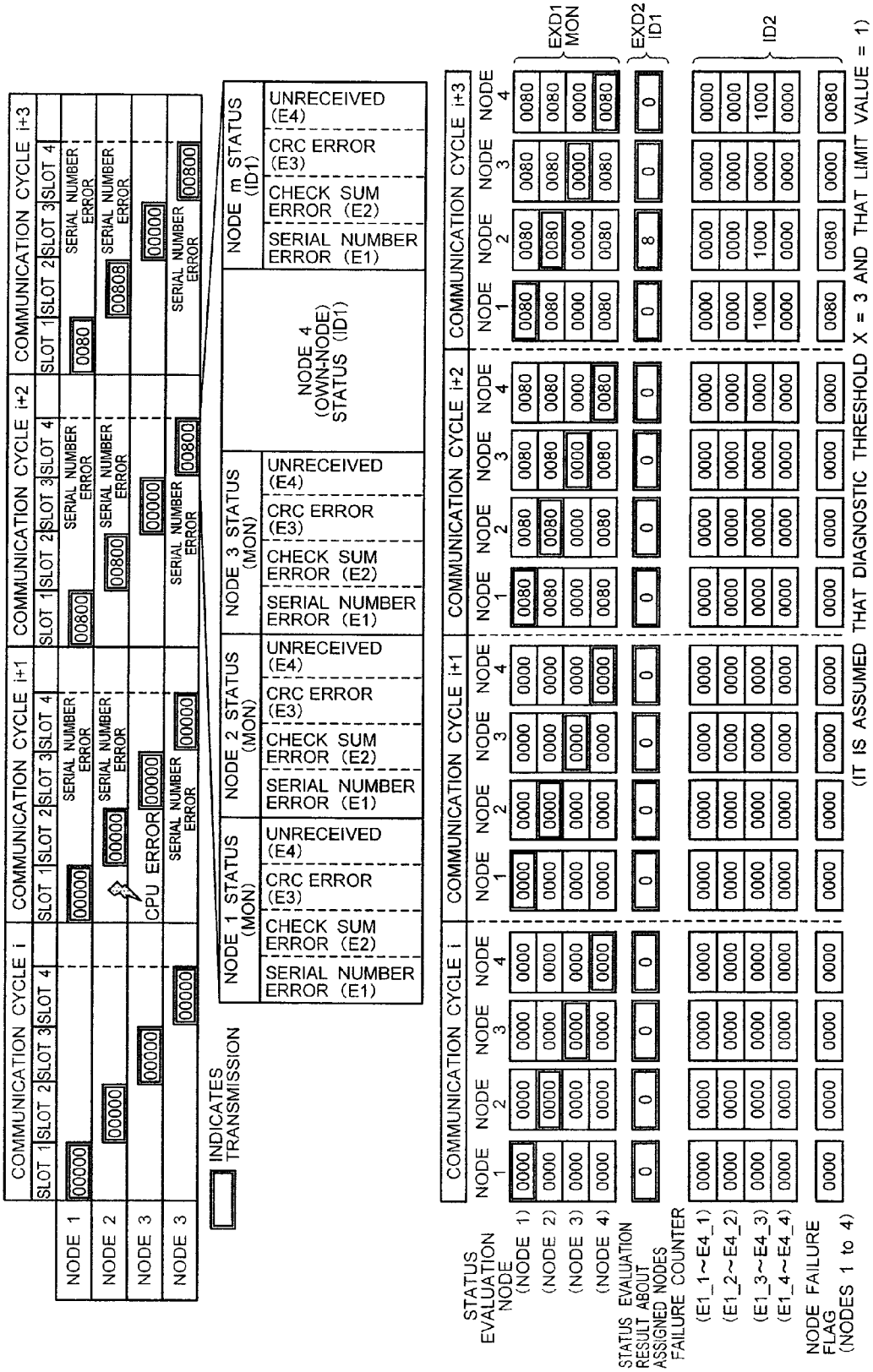
FIG. 41 is a diagram showing an application example of node status monitoring according to the decision broadcasting method.

FIG. 41 shows an example of node status monitoring according to the decision broadcasting method. It is similar to FIGS. 15 and 16. In FIG. 41, it is assumed that a CPU fault occurs in node 3 during time slot 1 of communication cycle i+1, causing software to malfunction. Node 3 is supposed to transmit, during slot 3, the status decision (MON result) made in communication cycle i, but the node failure check code appending section 38 cannot increment the serial number due to the CPU fault. Consequently, upon receiving the status decision from node 3 (EXD, which in this case, includes the ID1 results produced in communication cycle i, and thus combines EXD2), the other nodes detect that the serial number is not incremented and determine that a serial number error has occurred in node 3 (MON in communication cycle i+1). At this time, however, even if the fault in data from node 3 is detected, each detecting node cannot determine whether it is a fault of node 3 or misjudgment of its own because the determination is made by the detecting node alone. Thus, in the next communication cycle i+2, nodes 1, 2, and 4 transmit their status decisions (MON results) 0080 (which indicates the serial number error in node 3) together with the status decisions (ID1 results) made in communication cycle i+2

(EXD). In the second half of communication cycle i+2, by using the status decisions made by nodes 1, 2, and 4, node 2 determines the status of node 3 (ID1), determines the presence or absence of each type of fault, and confirms the serial number error in node 3. Furthermore, in communication cycle i+3, node 2 transmits the status decision (ID1 result) about node 3 together with the status decision (MON result) made in communication cycle i+2 (EXD2). Thus, nodes 1, 2, and 4 learn that the serial number error in node 3 has been confirmed and increment the failure counter Ex_3 (x=1, 2, 4). Consequently, the value of the failure counter reaches the limit value, causing the appropriate part of the node failure flag to be set. In this way, the nodes can know the faulty spot and fault type accurately.

Figure 42:
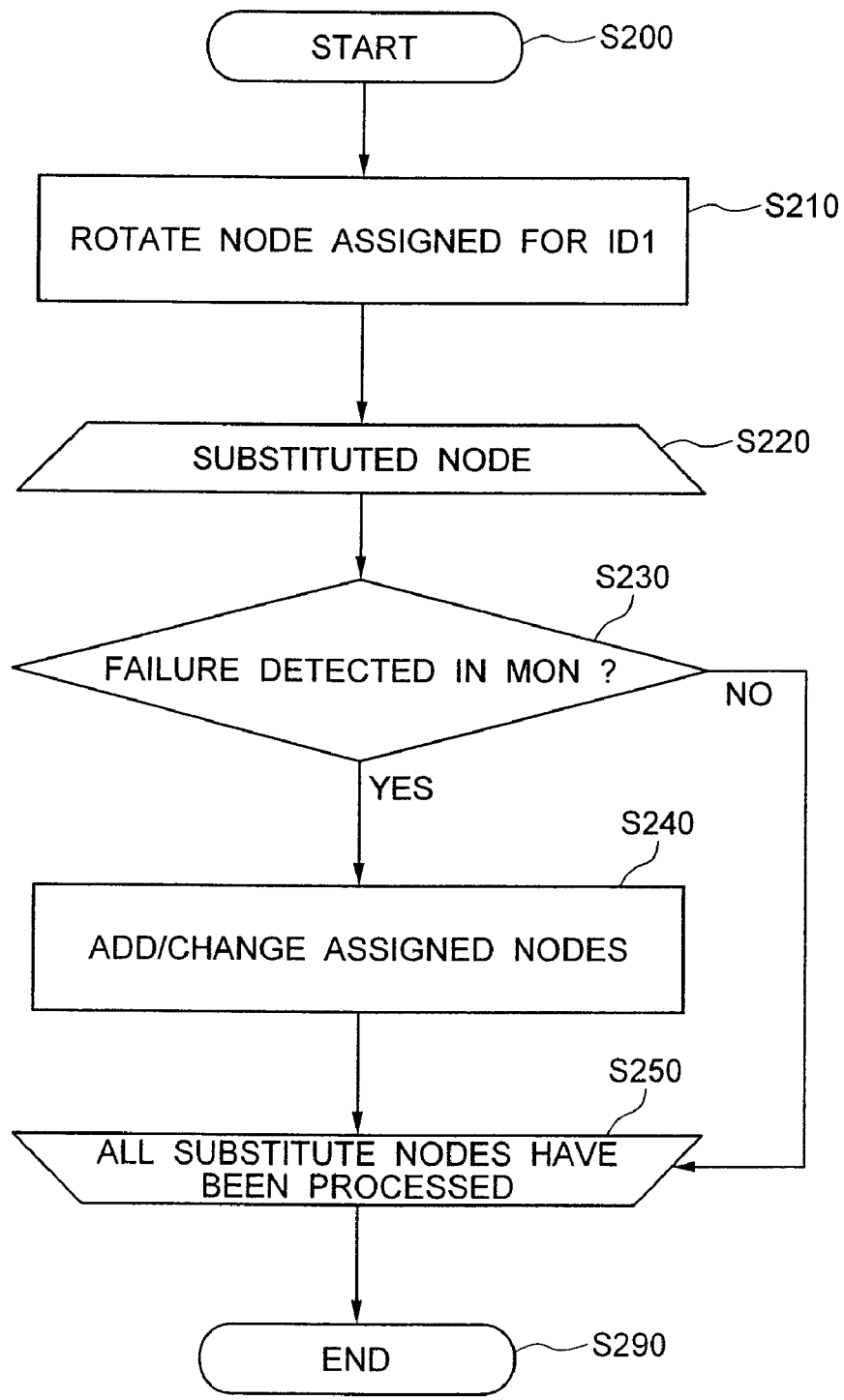
FIG. 42 is flowchart of a proxy status evaluation process.

FIG. 42 shows a flow of ingeniously designed method for changing assigned nodes in ID1 of each node. In this example, when a node originally supposed to make a status determination (ID1) turns out to be faulty, the status determination (ID1) is taken over by another node which detects the fault, so that the node status monitoring function will not be obstructed.

Each node on the network is assigned nodes on whose behalf it should make status determination (ID1) as well as nodes whose status it should determine (ID1). When a substituted node is found faulty, the substitute node is supposed to make status determination (ID1) of a node assigned to the substituted node.

The flow in FIG. 42 will be described below. In Step S200, processing is started. In Step S210, m nodes assigned to each node for status determination are rotated. The rotation corresponds to changes in assigned nodes in the schedules 2000 and 2010.

Steps S220 to S250 are carried out for each substituted node. One substituted node is assumed to be node a.

In Step S230, it is checked whether node a is failed. The fault detection is based on status determination (MON) by the node itself. If node a is failed, the flow goes to Step S240. Otherwise, the flow goes to Step S250.

In Step S240, one of the substituted nodes is changed to one of the nodes assigned to node a. Alternatively, one of the nodes assigned to node a is added as an assigned node. If it is found in Step S250 that all the substitute nodes have been processed, the flow goes to Step S290 to finish the processing. Otherwise the flow returns to Step S220.

In the above example, status determination by proxy is started when a fault is detected in an MON process. Alternatively, status determination by proxy may be used from the time when a fault is detected based on an ID2 process performed by the own node or ID1 results received from the other nodes in an EXD2 process until the time when the substituted node is determined to be normal again.

FIG. 43 shows an example in which the flow in FIG. 42 is applied to actual network nodes. A timing chart 2020 shows nodes assigned to each node on the network for status determination (ID1) in each communication cycle. A schedule 2030 shows a node on whose behalf each node should make status determination (ID1) if necessary in each communication cycle.

According to the timing chart 2020, in a communication cycle i, node 1 checks node 2, node 2 checks node 3, node 3 checks node 4, and node 4 checks node 1 to make status determination (ID1). In the next communication cycle i+1, the nodes assigned to each node for status determination are rotated. Consequently, node 1 checks node 3, node 2 checks node 4, node 3 checks node 1, and node 4 checks node 2 to make status determination (ID1). However, in the MON process at the beginning of communication cycle i+1, nodes 2, 3, and 4 find a fault (e.g., CRC error) in node 1. Consequently, node 4 which is supposed to substitute for node 1 according to the schedule 2030 makes status determination (ID1) of node 3 originally assigned to node 1 for status determination. In communication cycle i+2, nodes 2, 3, and 4 also find node 1 faulty. Consequently, node 3 which is supposed to substitute for node 1 according to the schedule 2030 makes status determination (ID1) of node 4 originally assigned to node 1 for status determination.

Each node must have a status determination (ID1) schedule of the nodes they will have to substitute for. The schedules 2030 may be retained as tables in a memory or other storage device or calculated using a mathematical expression.

In this way, the nodes can monitor the node status of each other while avoiding a situation in which any node would be left out of an ID1 process.

Example 5

Now, software design tools for the node status monitoring function according to the present invention will be described below. Generally a design tool is used to create software which performs the above processes running on an ECU. The design tool is a software product running on a general-purpose computer or the like and is used by the user to make settings for network configuration, communication scheduling, task scheduling, and the like. In many cases, such a software product has a GUI (Graphical User Interface) and allows the user to design visually on a screen using input devices such as a keyboard and mouse.

The design tool outputs source files including a header file based on the user settings. When the source files are combined with another source-file/object-file library and the like and passed through a compiler/linker, an executable program which runs on an ECU is generated. Incidentally, possible embodiments of the node status monitoring function according to the present invention include middleware.

If the user can use such a design tool to make settings for the node status monitoring function according to the present invention and to generate software which performs this function on ECUs, it is possible to put the present invention into practical use while reducing the burden of design on the user. GUIs and functions of such a design tool will be described below.

Figure 44:
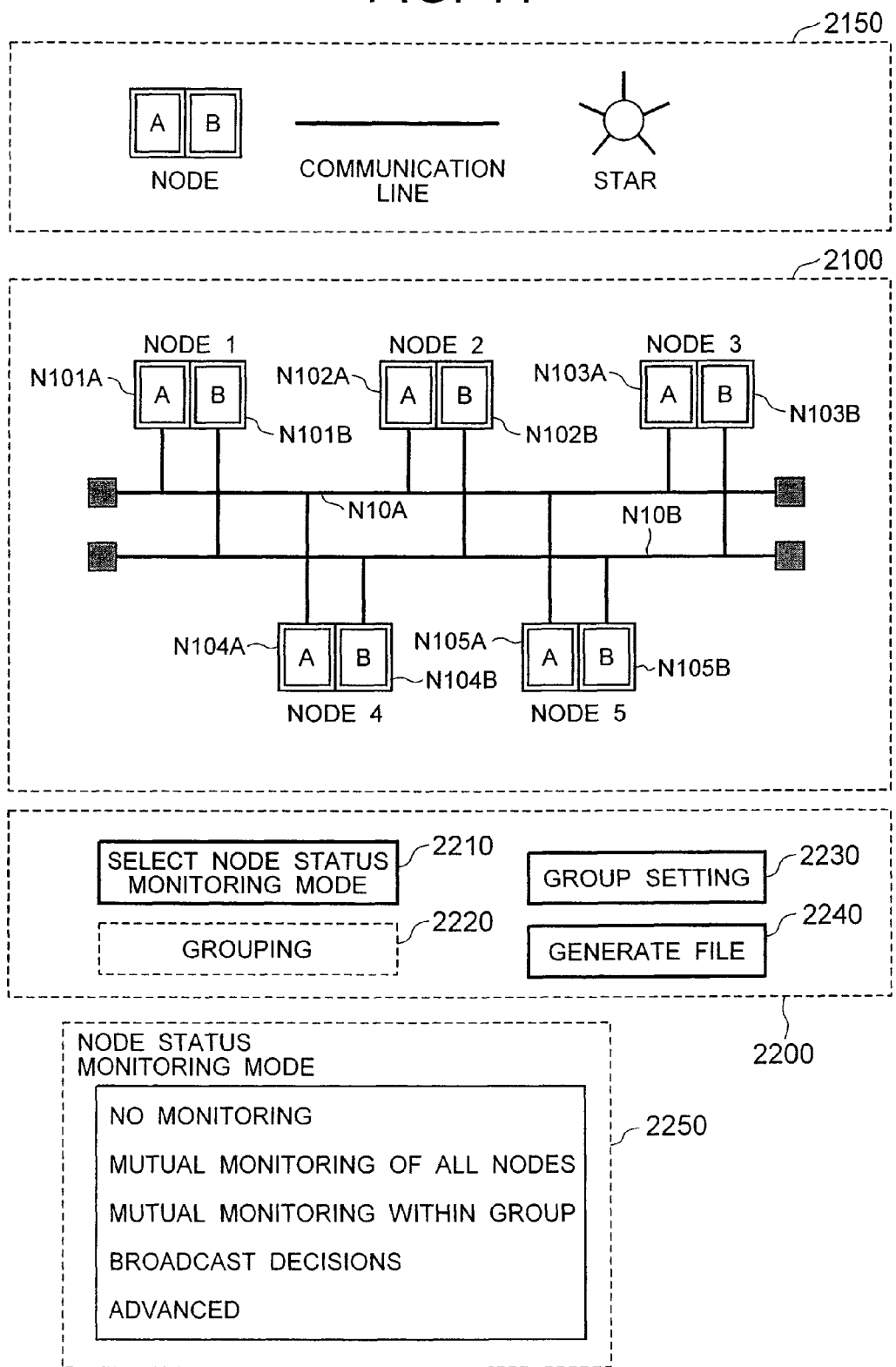
FIG. 44 is a diagram showing an example GUI of an ECU software design tool.

FIG. 44 shows a screen example of the design tool. The screen consists of a network configuration setting section 2100, network component selection area 2150, and main network setting section 2200. Communication lines N10A and N10B are laid in the network configuration setting section 2100 so that nodes 1 to 5 will be connected to them in a bus topology. That is, the network uses duplex communication paths of channel A and channel B. To monitor node status separately on channel A and channel B, each node is divided into two parts on the screen: part A (N101A of node 1 to N105A of node 5) and part B (N101B of node 1 to N105B of node 5). The network configuration is set and edited by the user by selecting and laying out (dragging and dropping) elements such as nodes and communication lines in the network component selection area 2150. Such a setting and editing method is adopted commonly by design tools, and detailed description thereof will be omitted.

The main network setting section 2200 contains a node status monitoring mode selection button 2210, node status monitoring mode indicator 2220, node group setting button 2230 for use to set a node group for node status monitoring, and file output button 2240 for use to generate and output a source file or the like. When the user presses a node status monitoring mode selection button 2210 with a mouse or the like, a node status monitoring mode list 2250 appears on the screen and a method selected by the user is presented in the node status monitoring mode indicator 2220. Available selections of monitoring modes are "No Monitoring," "Mutual Monitoring of all Nodes," "Mutual Monitoring within Group," "Broadcast Decisions," and "Advanced."

When "No Monitoring" is selected, this design tool understands that the node status monitoring function will not be used and disables settings (rejects inputs) related to node status monitoring, and consequently items related to node status monitoring will not be contained in outputted source files and the like.

Conversely, when "Mutual Monitoring of all Nodes," "Mutual Monitoring within Group," "Broadcast Decisions," or "Advanced" is selected, this design tool enables setting inputs related to node status monitoring, and consequently items related to node status monitoring will be contained in outputted source files and the like.

"Mutual Monitoring of all Nodes" is a mode in which all the network nodes in the network configuration setting section 2100 monitor each other. That is, each node makes status determinations (MON), exchanges status decisions with other nodes (EXD), and makes node status determinations (ID). This mode is reflected in content of outputted source files and the like. "Mutual Monitoring within Group" is a mode in which the network nodes are divided into groups and all the nodes in each group monitor each other. "Broadcast Decisions" is a mode in which each node in the group makes independent status determinations (MON) about all the other nodes in the group, but makes node status determinations (ID1) about only m other nodes in the group and decisions (ID1 results) are exchanged and shared among the network nodes.

"Advanced" is a mode which allows details of a node status monitoring mode to be specified. It allows node-by-node specification of detailed items, including "Node Status Monitoring Group" which is used when each node makes independent status determination (MON) and shares the results with the other nodes (EXD), information about the nodes assigned for status determination (ID1), an option as to whether to transmit (or broadcast) status decisions (ID1 results) to the other nodes, and an option as to whether to identify a failed node (ID2) by receiving status decisions (ID1 results) from the other nodes in and out of the group.

The "Advanced" mode may become equivalent to "Mutual Monitoring of all Nodes," "Mutual Monitoring within Group," "Broadcast Decisions," or the like depending on specified settings. For example, if in the "Advanced" mode, the node status monitoring group is set to include all the nodes on the network and node status determinations (ID1) are set not to be transmitted (the settings of nodes assigned for status determination and the option as to whether to identify a failed node (ID2) become meaningless and thus are automatically disabled), the results become equivalent to "Mutual Monitoring of all Nodes." If the node status monitoring group is set to include only n nodes on the network and node status determinations (ID1) are set not to be transmitted, the results become equivalent to "Mutual Monitoring within Group." That is, the "Advanced" mode includes all the other modes except "No Monitoring."

Figure 45:
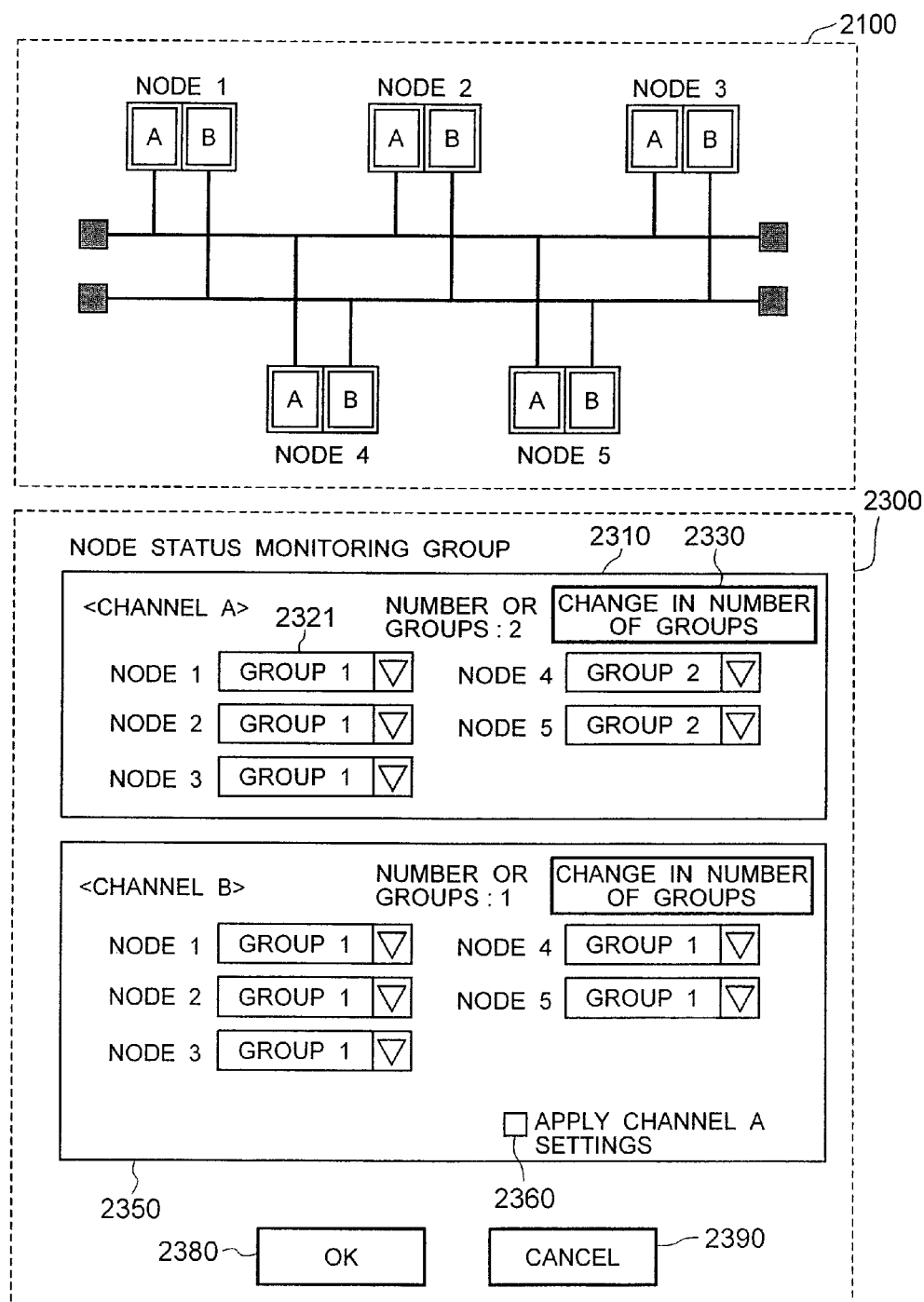
FIG. 45 is a diagram showing an example of a node status monitoring group setting screen of the ECU software design tool.
Figure 46:
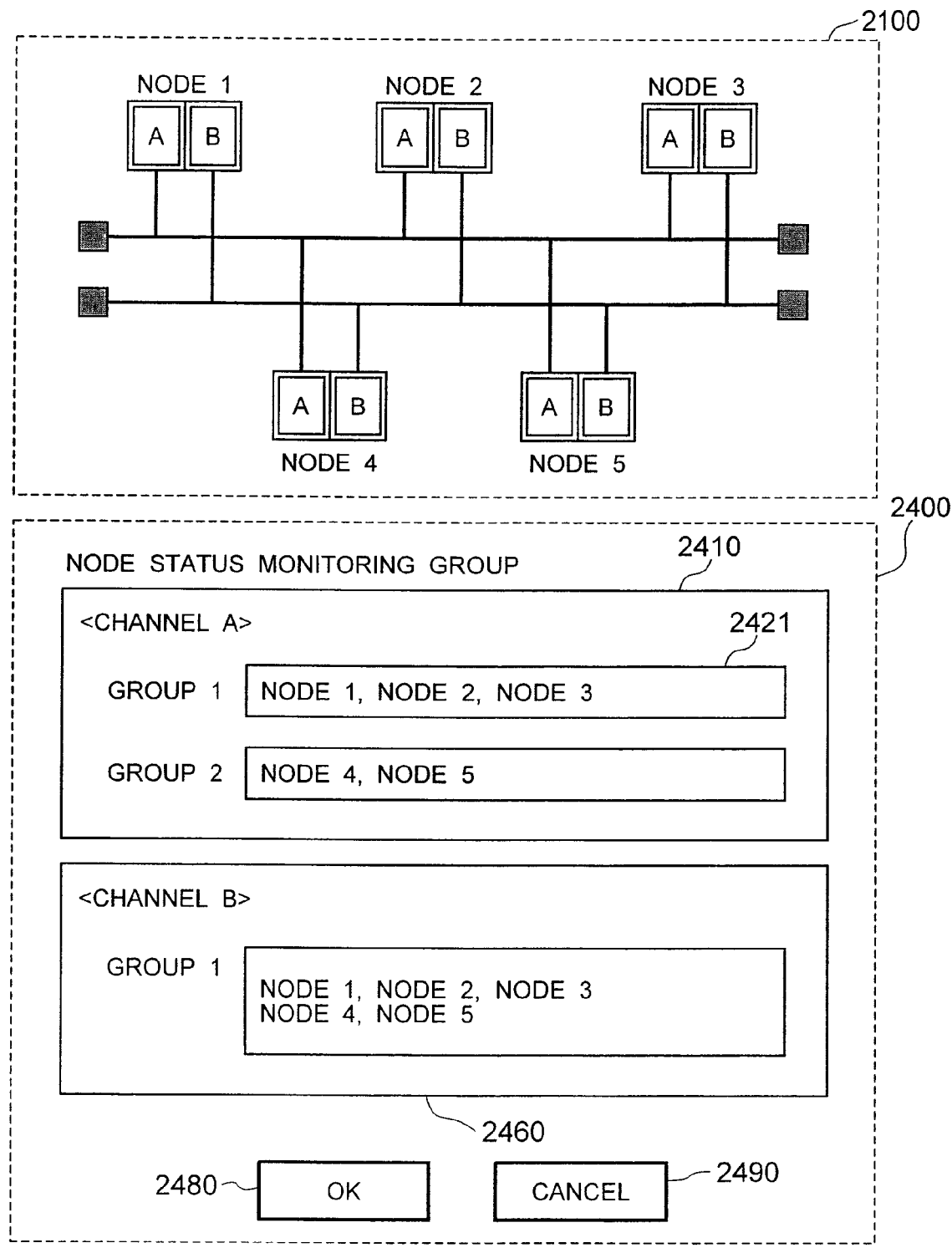
FIG. 46 is a diagram showing an example of a node status monitoring group setting screen of the ECU software design tool.
Figure 47:
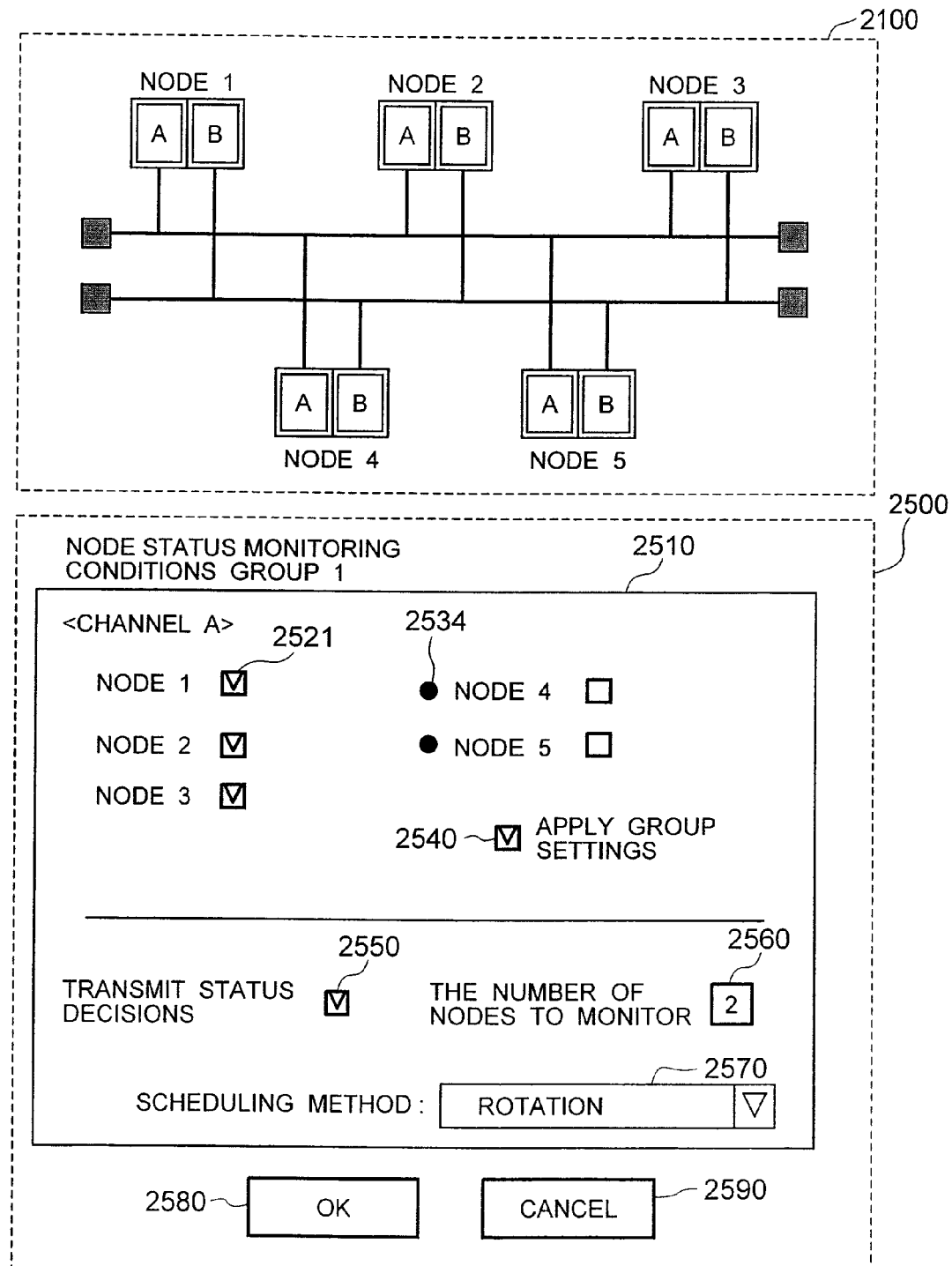
FIG. 47 is a diagram showing an example of a node status monitoring group condition setting screen of the ECU software design tool.

When the user presses the button 2230 in the main network setting section 2200, a screen appears allowing the user to make group settings and monitoring condition settings for node status monitoring. FIG. 45 shows an example of a screen used to specify node status monitoring groups on the basis of nodes, FIG. 46 shows an example of a screen used to specify node status monitoring groups on the basis of groups, and FIG. 47 shows an example of a screen used to specify detailed conditions of a node status monitoring group (e.g., group 1 on channel A). The three screens can be switched using tabs.

In FIG. 45, a node status monitoring group setting screen (node-based) 2300 consists of a channel A setting section 2310, channel B setting section 2350, button 2380, and button 2390. When the user presses the button 2380, the settings made on the screen are applied, and when the user presses the button 2390, the settings are discarded.

The channel A setting section 2310 has node status monitoring group drop-down list boxes $232x$ (x=1 to 5; 2321 is illustrated in FIG. 45) for use to specify node status monitoring groups to which nodes 1 to 5 should belong. When the user presses a button 2330 an input field for the number of node status monitoring groups appears, allowing the user to change the number of node status monitoring groups. In FIG. 45, the number of node status monitoring groups on channel A is 2 and available group names in the node status monitoring group drop-down list boxes is "Group 1" and "Group 2." If the number of node status monitoring groups is reduced and a group which has been specified in a node status monitoring group drop-down list box is no longer available, it is considered that the given node has no setting of a node status monitoring group.

The channel B setting section 2350 is almost the same as the channel A setting section 2310. However, if the user checks a radio button 2360, inputs related to channel B, i.e., entries in the node status monitoring group drop-down list boxes $232x$ are disabled (inputs re rejected) and the same settings as those for channel A apply.

Referring to FIG. 46, a node status monitoring group setting screen (group-based) 2400 consists of a channel A setting section 2410, channel B setting section 2460, button 2480, and button 2490. The buttons 2480 and 2490 are equivalent to the buttons 2380 and 2390, respectively.

The channel A setting section 2410 has member node text boxes $242x$ for use to specify nodes which should belong to a node status monitoring group x (2421 is illustrated in FIG. 46). The nodes whose names are entered in a member node text box belong to the given node status monitoring group. The same results can be obtained by dragging and dropping desired nodes among the nodes N101A to N105B from the network configuration setting section 2100 to a member node text box $242x$ or by clicking a desired member node text box $242x$ to select a group to edit (the group name is displayed in reverse video) and then clicking desired nodes among the nodes N101A to N105B in the network configuration setting section 2100. To remove a node from a node status monitoring group, the user can delete the node name.

In the "Mutual Monitoring of all Nodes" mode, the design tool may disable (reject inputs in) the node status monitoring group setting screen (node-based) 2300 and node status monitoring group setting screen (group-based) 2400.

Referring to FIG. 47, a node status monitoring group condition setting screen 2500 consists of a channel A setting section 2510, button 2580, and button 2590. The buttons 2580 and 2590 are equivalent to the buttons 2380 and 2390, respectively. Although only settings for channel A are shown on the screen, settings for channel B are displayed similarly.

The channel A setting section 2510 has subject node check boxes $252x$ (x=1 to 5; 2521 is illustrated in FIG. 47) for use to specify nodes about which node status determinations (ID1) should be made within the group out of nodes 1 to 5. Nodes carrying a reservation indicator $253x$ (x=1 to 5; 2534 is illustrated in FIG. 47) are marked for status determination (ID1) by another node status monitoring group. The design tool may check for any node exempted from status determination (ID1) and display a warning message together with its node number. If the user checks a radio button 2540, inputs related to channel A, i.e., entries in subject node check boxes 252$x$ are disabled (rejected) and the nodes in the same node status monitoring group are monitored. This setting is used in "Mutual Monitoring of all Nodes," "Mutual Monitoring within Group," and "Broadcast Decisions" modes. For these modes, the design tool may disable (reject inputs in) the node status monitoring group condition setting screen 2500.

Depending on the method for specifying the nodes to be monitored, nodes 2 to 5 may make independent status determinations (MON) and share decisions (EXD) as well as make status determinations (ID1) and share decisions (EXD2), for example, with respect to node 1.

A Status Determination Transmit Status Decisions check box 2550 specifies whether to transmit status decisions (ID1 results) to other nodes. If this section is selected, meaning "Transmit," the Status Determination Number of Nodes to Monitor indicator 2560 and Status Determination Scheduling Method drop-down list box 2570 are enabled to accept inputs.

The Status Determination Number of Nodes to Monitor indicator 2560 specifies the number of nodes which one node monitors in a single session of status determination (ID1), i.e., the number m described above. If m is constant within the group, there is a constrains: the total number of network nodes$\geq$m$\geq$the number of nodes subjected to status determination (ID1) the number of nodes belonging to the node status monitoring group, where m is an integer. Any input which falls outside this range is rejected.

The Status Determination Scheduling Method drop-down list box 2570 allows the user to specify a scheduling of nodes assigned for node status determination (ID1). In the example of FIG. 42, a "rotation" method in which assigned nodes are changed according to the schedule 2000 or 2010 is specified. Alternatively, it is possible to specify a method in which status determination is taken over from a node originally supposed to make a status determination if the node turns out to be faulty, as described with reference to the timing chart 2020 and schedule 2030.

In the "Advanced" node, more detailed settings should be made for each node. The screen in FIG. 47 is used for the detailed settings. The screen appears and accepts inputs, for example, when the user clicks any of the nodes N101A to N105B in the network configuration setting section 2100 with a mouse.

A node status monitoring advanced settings screen 2600 is shown as a setting screen for node 1 for the sake of simplicity. It consists of a channel A setting section 2610, channel B setting section 2650, button 2680, and button 2690. The buttons 2680 and 2690 are equivalent to the buttons 2380 and 2390, respectively.

In the channel A setting section 2610, a node status monitoring group drop-down list box 2620 is equivalent to the node status monitoring group drop-down list boxes 232$x$ of the node status monitoring group setting screen 2300.

Figure 48:
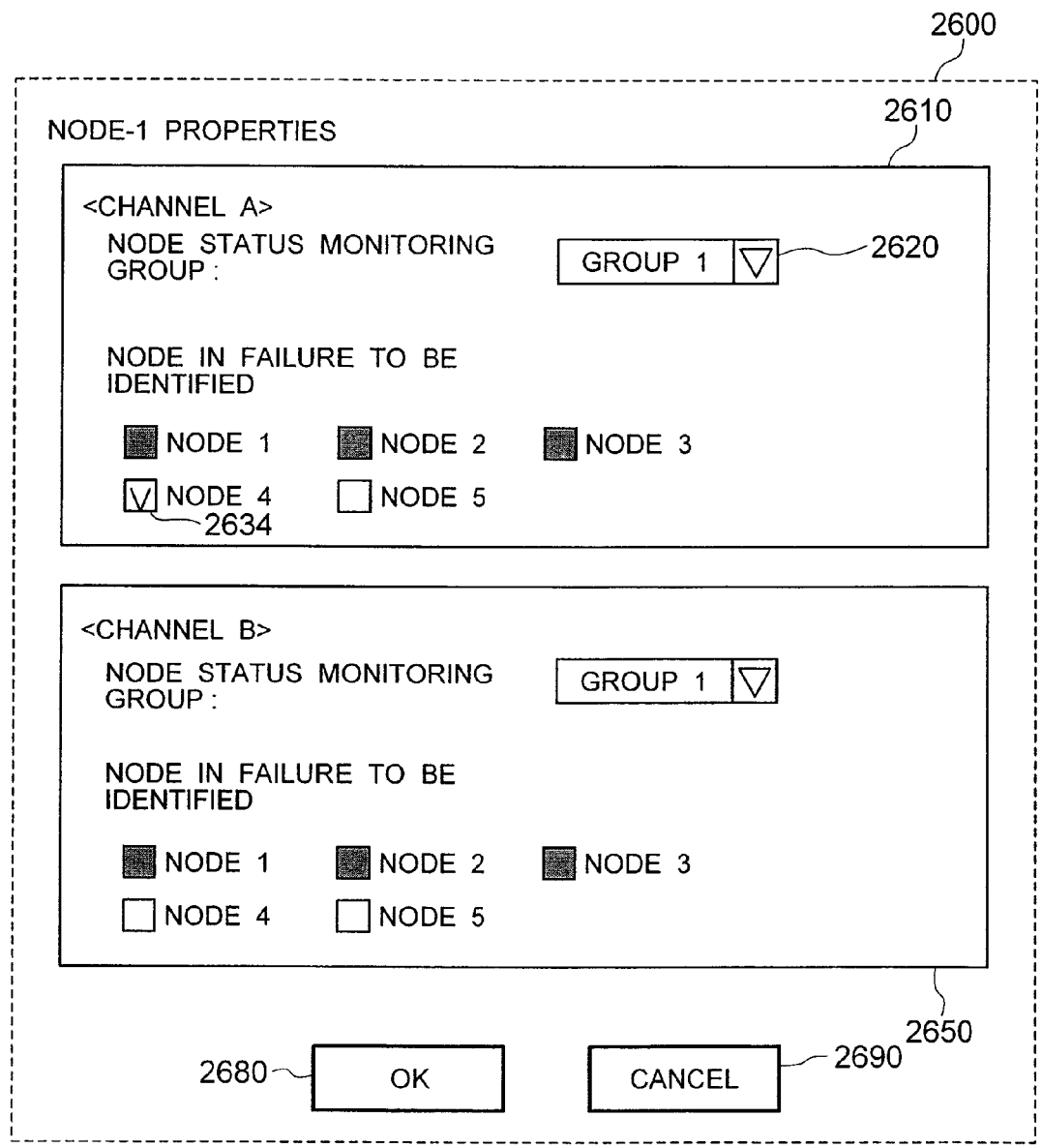
FIG. 48 is a diagram showing an example of a node status monitoring advanced settings screen of the ECU software design tool.

Regarding the nodes whose fault identification check box 263$x$ ($x$=1 to 5; 2634 is illustrated in FIG. 48) is checked by the user, the design tool sets the software such that IDI results about the nodes will be received and fault identification (ID2) will be performed. In the example of FIG. 42, however, fault identification (ID2) is unconditionally made of the nodes selected by the user for status determination (ID1). The content of channel B setting section 2650 is the same as that of the channel A setting section 2610.

The design tool sets communication-related parameters of the ECU software of a certain node so that the node will make independent status determination (MON) of any node about which the user wants to make status determination (ID1), to send the determination (EXD). Also, the user may be allowed to select whether to use the failure counter and failure flag in managing the nodes whose fault identification (ID2) is specified by the user. Status determinations (MON) from other nodes in other node status monitoring groups are received in the slot in which status determinations (MON) are transmitted from the other nodes in the same node status monitoring group. The status decisions (ID1 results) for use in fault identification (ID2) are received in the slot in which ID1 results are transmitted (EXD2) by the nodes which perform an ID1 process for the nodes specified in the fault identification check boxes 263$x$. The design tool sets the ECU software so that the appropriate nodes will receive the status decision data in these slots. Incidentally, data transmission is scheduled (regarding which node transmits data in what slot) by means of functions attached to the design tool or manually by the user.

Although in the above example, each node can belong to only a single node status monitoring group, each node may be allowed to belong to two or more groups. In that case, two or more input fields 232$x$ for use to specify node status monitoring groups may be provided for each node. Also, the node indicators N101A to N105B may be color-coded according to the groups they belong to, in order to make it easier for the user to recognize. Besides, although node status is monitored separately on channel A and channel B, the user may be allowed to make a software setting such that any node found faulty on either channel will be reported to various programs regardless of the channel on which the fault is detected.

The ECU software design tool, which is equipped with the GUI and software generating function, makes it possible to produce software which has the node status monitoring function according to the present invention while reducing the burden of design on the user and time required for design.

Lastly, preferred embodiments of the present invention will be listed.

[1] A vehicle control system in which a plurality of nodes connected to a communication network transmit data via the communication network and thereby implement functions of a vehicle, wherein each of the plurality of nodes comprises: a node status determination section which determines node status including operating status of the own node and operating status of other nodes connected to the communication network; a status evaluation result transmitting/receiving section which transmits node evaluation result made by the own node to other nodes and receives node evaluation result made by other nodes; and a failed-node identification section which identifies any failed node in the communication network using the node evaluation result made by the own node and the node evaluation result made by the other nodes.

[2] The vehicle control system according to [1] above, wherein: the node status determination section comprises a own-node status determination section which diagnoses operating status of the own node and operating status of sensors or actuators controlled by the own node, and a other-node status determination section which determines status of other nodes connected to the communication network; and the status evaluation result transmitting/receiving section transmits the status decisions made by the own node and the status decisions made by the other nodes, in batches.

[3] The vehicle control system according to [2] above, wherein: the status evaluation result transmitting/receiving section comprises a node failure check code appending section which appends to transmit data a code used to detect a node fault; when receiving data transmitted by a other node, the other-node status determination section checks the transmitting node for a fault using the node failure check code appended to the transmit data by the transmitting node.

[4] The vehicle control system according to [3] above, wherein: the node failure check code appending section comprises a serial number appending section which appends a serial number to the transmit data, the serial number being incremented each time data is transmitted; and if the serial number appended to the data received from a other node is not incremented from the serial number appended to the data received from the other node the previous time, the other-node status determination section determines that the other node is failed.

[5] The vehicle control system according to [3] above, wherein: the node failure check code appending section comprises a check sum appending section which appends a check sum found by totaling transmit data to the transmit data; the other-node status determination section determines a check sum by totaling transmit data from a other node and determines that the transmitting node is failed if the check sum does not match the check sum appended to the data.

[6] The vehicle control system according to [2] above, wherein: the node status determination section calculates a difference between data received from a other node this time and data received from the other node the previous time and determines that the other node is failed if the difference is equal to or larger than a predetermined threshold.

[7] The vehicle control system according to [3] or [6] above, wherein: each of the plurality of nodes comprises a network failure checking section which detects communication trouble on the network; and the other-node status determination section determines status of other nodes including decisions made by the network failure checking section.

[8] The vehicle control system according to [1] above, wherein: each of the plurality of nodes comprises a vehicle control logic execution section which executes vehicle control logic; and the failed-node identification section comprises a failed-node identification algorithm execution section which identifies any failed node based on the status decisions made by the own node and the status decisions made by and received from the other nodes, a failure counter which is incremented based on the number and type of faults occurring in the identified node, and a node failure flag storage section which contains a node failure flag for use by the vehicle control logic execution section to recognize that a fault has occurred in the node whose failure counter reaches a predetermined limit value.

[9] The vehicle control system according to [8] above, wherein: the node failure flag storage section is configured to be readable by the vehicle control logic execution section; and the vehicle control logic execution section changes details of vehicle control according to any failed node and fault factor based on information in the node failure flag storage section.

[10] The vehicle control system according to [8] above, wherein when a failed node returns to normal, the vehicle control logic execution section can select whether to decrements value of the failure counter from value before the return to normal or to maintain the value before the return to normal.

[11] The vehicle control system according to [9] above, wherein if the number of nodes which makes a same node status decision is equal to or larger than a diagnostic threshold set by the vehicle control logic execution section, the failed-node identification algorithm execution section regards the node status decision true and identifies the failed node.

[12] The vehicle control system according to [1] above, wherein: a network is configured such that each node will transmit data periodically by repeating communication cycles composed of a series of predetermined transmit/receive patters; the node status determination section in the network performs a node status determination process in each node in a communication cycle; decisions obtained as a result of the node status determination process in the communication cycle are exchanged among nodes by the node status evaluation result transmitting/receiving section during the next communication cycle; and the failed-node identification section identifies any failed node.

[13] The vehicle control system according to any of items [1] to [12] above, wherein the vehicle control logic execution section is implemented as control application software while the node failure check code appending section, the other-node status determination section, and the failed-node identification section are implemented as middleware equipped with an application program interface (API) which provides node status information to the control application software.

[14] The vehicle control system according to [13] above, wherein the control application software performs vehicle control according to any failed node and fault factor based on the node status information acquired via the API.

[15] The vehicle control system according to any of items [1] to [14] above, wherein the plurality of nodes are sensors, actuators, or electronic control devices.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electronic control unit connected to other electronic control units via a communication network, wherein the electronic control unit comprises:
    a node status determination section which receives node status data from the other electronic control units via the communication network and determines node statuses which indicate one or more failed states and non-failed states of the other electronic control units and an own electronic control unit;
    a status evaluation result transmitting/receiving section having a storage section which stores node status data including node statuses of the own electronic control unit and the other electronic control units determined by the node status determination section, for transmitting the node status data of the own electronic control unit to the other electronic control units, and receiving the node status data from the other electronic control units via the communication network;
    a failed-node judging section which identifies a failed electronic control unit connected to the communication network based on the node status data including node statuses of the other electronic control units determined by the node status determination section and transmitted from the other electronic control units;
    wherein operations in the node status determination section, the status evaluation result transmitting/receiving section and the failed-node judging section are executed in synchronization with communications between the own electronic control unit and other electronic control units via the communication network; and
    each of the node statuses of the own electronic control unit and the other electronic control units is transmitted in a communication cycle that is used by the own electronic control unit and the other electronic control units.

2. The electronic control unit according to claim 1, wherein the node status determination section, the status evaluation result transmitting/receiving section, and the failed-node judging section are implemented with a middleware including an application program interface which provides the identified result of the failed electronic control unit to application programs.

3. The electronic control unit according to claim 1, wherein the failed-node judging section further comprises a failure counter, and each of the own electronic control unit and the other electronic control units executes failure counter synchronization by transmitting and receiving a message including a failure counter synchronization flag.

4. The electronic control unit according to claim 3, wherein the failure counter synchronization flag is set when a failure counter value reaches a predetermined value of the failure counter.

5. The electronic control unit according to claim 1, further comprising:

a control data storage section which stores a control data for controlling a vehicle; and a transmission section which transmits the control data to the other electronic control units;

wherein the transmission section transmits the control data and the node status data including node statuses of the own electronic control unit determined by the node status determination section as a set of data or an individual data.

6. The electronic control unit according to claim 1, wherein the failed-node judging section transmits the identified result of the failed electronic control unit to the other electronic control units via the communication network.

7. The electronic control unit according to claim 1, wherein the failed-node judging section receives an identified result of the failed electronic control unit identified by the other electronic control units from the other electronic control units via the communication network, and uses the received result of the failed electronic control unit for identifying the failed electronic control unit connected to the communication network.

8. An electronic control unit connected to other electronic control units via a communication network, wherein the electronic control unit comprises:

a node status determination section which receives node status data from the other electronic control units via the communication network and determines node statuses which indicate one or more failed states and non-failed states of the other electronic control units and an own electronic control unit;

a status evaluation result transmitting/receiving section having a storage section which stores node status data including node statuses of the own electronic control unit and the other electronic control units determined by the node status determination section, for transmitting the node status data of the own electronic control unit to the other electronic control units, and receiving the node status data from the other electronic control units via the communication network;

a failed-node judging section which identifies a failed electronic control unit connected to the communication network based on the node status data including node statuses of the other electronic control units determined by the node status determination section and transmitted from the other electronic control units;

wherein there are provided a plurality of successive communication cycles in the communications between the own electronic control unit and the other electronic control units via the communication network, and in a current communication cycle, the status evaluation result transmitting/receiving section of the other electronic control units executes node status data exchange operations to exchange the own electronic control unit's status evaluation result held in one communication cycle, while the node status determination section of the other electronic control units executes node status determination to determine the node status which indicate one or more failed states and non-failed states of the other electronic control units in the one communication cycle, and then the failed-node judging section identifies the failed electronic control unit in the current communication cycle.

9. An electronic control unit connected to other electronic control units via a communication network, wherein the electronic control unit comprises:

a node status determination section which receives node status data from the other electronic control units via the communication network and determines node statuses which indicate one or more failed states and non-failed states of the other electronic control units and an own electronic control unit;

a status evaluation result transmitting/receiving section having a storage section which stores node status data including node statuses of the own electronic control unit and the other electronic control units determined by the node status determination section, for transmitting the node status data of the own electronic control unit to the other electronic control units, and receiving the node status data from the other electronic control units via the communication network;

a failed-node judging section which identifies a failed electronic control unit connected to the communication network based on the node status data including node statuses of the other electronic control units determined by the node status determination section and transmitted from the other electronic control units; and wherein the own electronic control unit executes a judging operation of identifying the failed electronic control unit for a portion of the electronic control units assigned to the own electronic control unit among the other electronic control units.

* * * * *